(12) United States Patent
Kozicki

(10) Patent No.: US 9,773,141 B2
(45) Date of Patent: Sep. 26, 2017

(54) DENDRITIC STRUCTURES AND TAGS

(71) Applicant: ARIZONA BOARD OF REGENTS, a body corporate of the state of Arizona acting for and on behalf of ARIZONA STATE UNIVERSITY, Scottsdale, AZ (US)

(72) Inventor: Michael N. Kozicki, Phoenix, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 14/775,413

(22) PCT Filed: Mar. 12, 2014

(86) PCT No.: PCT/US2014/024557
§ 371 (c)(1),
(2) Date: Sep. 11, 2015

(87) PCT Pub. No.: WO2014/165148
PCT Pub. Date: Oct. 9, 2014

(65) Prior Publication Data
US 2016/0086001 A1 Mar. 24, 2016

Related U.S. Application Data

(60) Provisional application No. 61/777,616, filed on Mar. 12, 2013, provisional application No. 61/908,509, filed on Nov. 25, 2013.

(51) Int. Cl.
*G06K 7/06* (2006.01)
*G06K 7/08* (2006.01)
(Continued)

(52) U.S. Cl.
CPC .......... *G06K 7/1099* (2013.01); *G02B 21/06* (2013.01); *G02B 21/365* (2013.01);
(Continued)

(58) Field of Classification Search
CPC ...... G06K 19/067; G06K 1/121; G06K 7/081; G06K 7/1099; G06K 9/00577;
(Continued)

(56) References Cited

U.S. PATENT DOCUMENTS

| 4,038,158 A | 7/1977 | Bursey et al. |
| 4,158,807 A | 6/1979 | Senturia |
| 4,586,988 A | 5/1986 | Nath et al. |
| 5,477,088 A | 12/1995 | Rockett et al. |
| 5,761,115 A | 6/1998 | Kozicki et al. |

(Continued)

FOREIGN PATENT DOCUMENTS

| EP | 2237183 | 10/2010 |
| EP | 2973209 | 1/2016 |

(Continued)

OTHER PUBLICATIONS

Heer et al, Single-chip Microelectronic System to Interface with Living Cells, Biosensors and Bioelectronics, vol. 22, No. 11, pp. 2546-3553 (2007).

(Continued)

*Primary Examiner* — Claude J Brown
(74) *Attorney, Agent, or Firm* — Fish & Richardson P.C.

(57) ABSTRACT

The disclosure features methods for generating a unique identifier, the methods including providing a dendritic structure, reading the dendritic structure to provide a signal, and generating a unique identifier from the signal.

20 Claims, 23 Drawing Sheets

(51) Int. Cl.
| | | |
|---|---|---|
| *G06K 7/10* | (2006.01) | |
| *G06K 9/00* | (2006.01) | |
| *G06K 19/06* | (2006.01) | |
| *G06K 19/08* | (2006.01) | |
| *G06K 9/20* | (2006.01) | |
| *G06K 9/62* | (2006.01) | |
| *G06F 17/30* | (2006.01) | |
| *H04L 9/32* | (2006.01) | |
| *G02B 21/06* | (2006.01) | |
| *G02B 21/36* | (2006.01) | |
| *G02B 27/28* | (2006.01) | |
| *G09C 5/00* | (2006.01) | |
| *G06T 7/00* | (2017.01) | |
| *G06K 19/077* | (2006.01) | |
| *G06T 7/12* | (2017.01) | |
| *G06K 9/46* | (2006.01) | |

(52) U.S. Cl.
CPC ...... *G02B 27/286* (2013.01); *G06F 17/3028* (2013.01); *G06F 17/30879* (2013.01); *G06K 9/00147* (2013.01); *G06K 9/00577* (2013.01); *G06K 9/2027* (2013.01); *G06K 9/46* (2013.01); *G06K 9/6202* (2013.01); *G06K 19/06046* (2013.01); *G06K 19/07749* (2013.01); *G06K 19/086* (2013.01); *G06T 7/0012* (2013.01); *G06T 7/12* (2017.01); *G09C 5/00* (2013.01); *H04L 9/3278* (2013.01); *G06K 9/4671* (2013.01); *G06T 2207/10056* (2013.01); *G06T 2207/30024* (2013.01); *H04L 2209/12* (2013.01)

(58) Field of Classification Search
CPC ...... G06K 9/2027; G06K 9/6202; G06K 9/46; G06K 9/00147; G06K 19/06046; G06K 19/086; G06K 19/07749; G06T 7/0083; G06T 7/0012; G06T 2207/10056; G06T 2207/30024; G06F 17/3028; G06F 17/30879; H04L 9/3278; G02B 21/06; G02B 21/365; G02B 27/286; G09C 5/00
USPC ........................................................ 235/441
See application file for complete search history.

(56) References Cited

U.S. PATENT DOCUMENTS

| | | | |
|---|---|---|---|
| 5,896,312 A | 4/1999 | Kozicki et al. | |
| 5,914,893 A | 6/1999 | Kozicki et al. | |
| 6,184,456 B1 | 2/2001 | Matsuyama et al. | |
| 6,388,324 B2 | 5/2002 | Kozicki | |
| 6,418,049 B1 | 7/2002 | Kozicki et al. | |
| 6,469,364 B1 | 10/2002 | Kozicki | |
| 6,487,106 B1 | 11/2002 | Kozicki | |
| 6,635,914 B2 | 10/2003 | Kozicki et al. | |
| 6,798,692 B2 | 9/2004 | Kozicki et al. | |
| 6,825,489 B2 | 11/2004 | Kozicki | |
| 6,865,117 B2 | 3/2005 | Kozicki | |
| 6,914,802 B2 | 7/2005 | Kozicki | |
| 6,927,411 B2 | 8/2005 | Kozicki | |
| 6,940,745 B2 | 9/2005 | Kozicki | |
| 6,985,378 B2 | 1/2006 | Kozicki | |
| 6,998,312 B2 | 2/2006 | Kozicki et al. | |
| 7,006,376 B2 | 2/2006 | Kozicki | |
| 7,101,728 B2 | 9/2006 | Kozicki et al. | |
| 7,142,450 B2 | 11/2006 | Kozicki et al. | |
| 7,145,794 B2 | 12/2006 | Kozicki | |
| 7,169,635 B2 | 1/2007 | Kozicki | |
| 7,180,104 B2 | 2/2007 | Kozicki | |
| 7,227,169 B2 | 6/2007 | Kozicki | |
| 7,288,781 B2 | 10/2007 | Kozicki | |
| 7,294,875 B2 | 11/2007 | Kozicki | |
| 7,372,065 B2 | 5/2008 | Kozicki et al. | |
| 7,385,219 B2 | 6/2008 | Kozicki et al. | |
| 7,402,847 B2 | 7/2008 | Kozicki et al. | |
| 7,405,967 B2 | 7/2008 | Kozicki et al. | |
| 7,560,722 B2 | 7/2009 | Kozicki | |
| 7,675,766 B2 | 3/2010 | Kozicki | |
| 7,728,322 B2 | 6/2010 | Kozicki | |
| 7,763,158 B2 | 7/2010 | Kozicki | |
| 7,783,081 B2 | 8/2010 | Roques et al. | |
| 7,815,117 B2 | 10/2010 | Tuschel et al. | |
| 7,852,451 B2 | 12/2010 | Kim et al. | |
| 8,039,870 B2 | 10/2011 | Burke et al. | |
| 8,345,910 B2 | 1/2013 | Chae et al. | |
| 8,396,265 B1 | 3/2013 | Ross | |
| 8,742,531 B2 | 6/2014 | Kozicki | |
| 8,999,819 B2 | 4/2015 | Kozicki et al. | |
| 2001/0027922 A1 | 10/2001 | Chen et al. | |
| 2002/0055239 A1 | 5/2002 | Tuominen et al. | |
| 2002/0168820 A1 | 11/2002 | Kozicki et al. | |
| 2004/0104802 A1 | 6/2004 | Becker et al. | |
| 2004/0104807 A1 | 6/2004 | Ko | |
| 2006/0086901 A1* | 4/2006 | Price | G01N 21/31 356/63 |
| 2007/0090918 A1 | 4/2007 | Engstrom et al. | |
| 2007/0275230 A1 | 11/2007 | Murphy et al. | |
| 2008/0219503 A1* | 9/2008 | Di Venuto | G06K 9/00577 382/103 |
| 2008/0260941 A1 | 10/2008 | Jin | |
| 2009/0186756 A1 | 7/2009 | Cheng et al. | |
| 2009/0242416 A1 | 10/2009 | Yun et al. | |
| 2010/0193365 A1 | 8/2010 | Lopatin et al. | |
| 2010/0216026 A1 | 8/2010 | Lopatin et al. | |
| 2011/0205542 A1 | 8/2011 | Pendell Jones et al. | |
| 2011/0253789 A1* | 10/2011 | Thiele | G06K 7/081 235/441 |
| 2011/0254117 A1* | 10/2011 | Kozicki | C25D 7/08 257/461 |
| 2012/0080528 A1* | 4/2012 | Crowley | G02F 1/37 235/492 |
| 2013/0022238 A1 | 1/2013 | Wood | |
| 2013/0026645 A1 | 1/2013 | Mohammed et al. | |
| 2013/0127959 A1* | 5/2013 | Hanina | G06K 9/527 347/101 |
| 2013/0220413 A1 | 8/2013 | Kozicki et al. | |
| 2014/0086474 A1* | 3/2014 | Le | G06K 9/00577 382/141 |
| 2014/0105449 A1 | 4/2014 | Caton | |
| 2016/0012310 A1 | 1/2016 | Kozicki | |
| 2016/0034758 A1 | 2/2016 | Kozicki | |
| 2016/0078617 A1 | 3/2016 | Kozicki | |
| 2016/0086001 A1 | 3/2016 | Kozicki | |

FOREIGN PATENT DOCUMENTS

| | | | |
|---|---|---|---|
| EP | 2973234 | 1/2016 | |
| EP | 2998949 | 3/2016 | |
| EP | 2998950 | 3/2016 | |
| EP | 3002744 | 4/2016 | |
| EP | 3007155 | 4/2016 | |
| FR | 2890666 | 3/2007 | |
| WO | WO09848319 | 10/1998 | |
| WO | WO2007102988 | 9/2007 | |
| WO | WO2010008567 | 1/2010 | |
| WO | WO 2010008567 A1 * | 1/2010 | ......... G06K 9/00577 |
| WO | WO2010077622 | 7/2010 | |
| WO | WO2012065076 | 5/2012 | |
| WO | WO2012065083 | 5/2012 | |
| WO | WO2012177845 | 12/2012 | |
| WO | WO2014165047 | 10/2014 | |
| WO | WO2014165148 | 10/2014 | |

OTHER PUBLICATIONS

Kozicki et al., Nanostrcuture of solid electrolytes and surface electrodeposits, Physica E, vol. 19, No. 1-2, pp. 161-166 (2003).

(56) References Cited

OTHER PUBLICATIONS

Kozicki et al., Electrodeposit formation in solid electrolytes, 7th Annual Non-Volatile Memory Technology Symposium, pp. 111-115 (2006).
Balakrishnan et al., A low power non-volatile memory element based on copper in deposited silicon oxide, 7th Annual Non-Volatile Memory Technology Symposium, pp. 104-110 (2006).
Authorized Officer Sung Chul Kang, International Search Report and Written Opinion for PCT/US2014/024557, dated Jul. 11, 2014, 13 pages.
Authorized Officer Sung Chul Kang, International Search Report and Written Opinion for PCT/US2014/024233, dated Jul. 11, 2014, 12 pages.
Mitkova et al., Morphology of electrochemically grown silver deposits on silver-saturated Ge—Se thin films, Journal of Non-Crystalline Solids 326&327 pp. 425-429 (2003).
Kozicki et al., Nanoscale effects in devices based on chalcogenide solid solutions, Superlattices and Microstructures, vol. 27, No. 5/6, pp. 485-488 (2000).
P. Butera, Fractal Electrodes, 2012 NNIN Reu Research Accomplishments, pp. 176-177 (2012).
Je et al., In situ tuning of a MEMS microphone using electrodeposited nanostructures, J. Micromech. Microeng. 19 035015, 8 pages (2009).
Lee, Micro-Technology for Anti-Counterfeiting, Microelectronic Engineering 53, pp. 513-516 (2000).
Authorized Officer Mineko Mohri, International Preliminary Report on Patentability for PCT/US2014/024557, dated 24 Sep. 2015, 9 pages.
Authorized Officer Mineko Mohri, International Preliminary Report on Patentability for PCT/US2014/024233, dated Sep. 24, 2015, 9 pages.
T. A. Witten, Jr. and L. M. Sander, Diffusion-Limited Aggregation, a Kinetic Critical Phenomenon, Phys. Rev. Lett, vol. 47, No. 19, dated Nov. 9, 1981, pp. 1400-1403.
Yasuji Sawada, A. Dougherty, and J. P. Gollub, Dendritic and Fractal Patterns in Electrolytic Metal Deposits, Phys. Rev. Lett., vol. 56, No. 12, dated Mar. 24, 1986, pp. 1260-1263.
Lowe, Object recognition from local scale-invariant features, Proceedings of the International Conference on Computer Vision 2, dated Sep. 1999, pp. 1150-1157.
T. Serre et al., A Theory of Object Recognition: Computations and Circuits in the Feedforward Path of the Ventral Stream in Primate Visual Cortex, Computer Science and Artificial Intelligence Laboratory Technical Report, MIT-CSAIL-TR-2005-082, dated Dec. 19, 2005, 131 pages.
Examiner Thierry Bec, European Search Report for Application No. 15188964.9, dated Feb. 17, 2016, 8 pages.
Dr. Fred Jordan et al., Identifying Counterfeit Medicines with Industry-Suitable Technologies, Pharmaceutical Engineering, The Official Magazine of ISPE, Anti-Counterfeiting Technologies, May/Jun. 2012, vol. 32, No. 3, dated Jun. 30, 2012, 7 pages.
Srinivas Devadas et al., Design and Implementation of PUF-Based "Unclonable" RFID ICs for Anti-Counterfeiting and Security Applications, 2008 IEEE International Conference on RFID, dated Apr. 16-17, 2008, pp. 58-64.
Bo Yan et al., Application of RFID and Internet of Things in Monitoring and Anti-Counterfeiting for Products, 2008 International Seminar on Business and Information Management, IEEE Computer Society, dated Dec. 19, 2008, pp. 392-395.
Boris Skoric et al., Experimental Hardware for Coating PUFs and Optical PUFs, In: "Security with Noisy data" by Pim Tuyls et al., dated Jan. 1, 2007, pp. 256-268.
A. Ilic et al., Synchronized Secrets Approach for RFID-enabled Anti-Counterfeiting, Internet of Things Conference 2008, dated Jan. 1, 2008, Zurich, CH, retrieved from the Internet: URL:http;//www.stop-project.eu/Portals/1/publi cati ons/080128_Demo_loT_v07.pdf [retrieved on May 15, 2013], 4 pages.
H. H. Cheung et al., Implementation issues in RFID-based anti-counterfeiting systems, Computers in Industry, vol. 62., No. 7, dated Apr. 7, 2011, pp. 708-718.
Pim Tuyls et al., Anti-Counterfeiting, In: "Security with Noisy data", dated Jan. 1, 2007, pp. 290-312.
U. Russo et al., Study of Multilevel Programming in Programmable Metallization Cell (PMC) Memory, IEEE Transactions on Electron Devices, vol. 56, No. 5, dated May 1, 2009, pp. 1040-1047.
Farinaz Koushanfar, Provably Secure Active IC Metering Techniques for Piracy Avoidance and Digital Rights Management, IEEE Transactions on Information Forensics and Security, vol. 7, No. 1, dated Feb. 1, 2012, pp. 51-63.
M. N. Kozicki et al., Information storage using nanoscale electrodeposition of metal in solid electrolytes, Superlattices and Microstructures, vol. 34, Nos. 3-6, dated Sep. 1, 2003, pp. 459-465.
M. N. Kozicki et al., Flow regulation in microchannels via electrical alteration of surface properties, Superlattices and Microstructures, vol. 34, Nos. 3-6, dated Sep. 1, 2003, pp. 467-473.
Examiner Thierry Bec, European Search Report for Application No. 15188965.6, dated Feb. 24, 2016, 7 pages.
Arthur H. Edwards et al., Reconfigurable Memristive Device Technologies, Proceedings of the IEEE, vol. 103, No. 7, dated Jul. 2015, pp. 1004-1033.
Ying Hui Ngo et al., Paper surfaces functionalized by nanoparticles, Advances in Colloid and Interface Science, vol. 163, No. 1, 2011, pp. 23-38.
Andreas Nocke et al., Dielectrophoretic alignment of polymer compounds for thermal sensing, Sensors and Actuators A: Physical, vol. 156, No. 1, Nov. 1, 2009, pp. 164-170.
Examiner Thierry Bec, European Examination Report for Application No. 15188964.9, dated Mar. 8, 2016, 7 pages.
Examiner Thierry Bec, European Examination Report for Application No. 15188965.6, dated Jul. 12, 2016, 6 pages.
Examiner Thierry Bec, European Search Report for Application No. 15188967.2, dated Mar. 8, 2016, 6 pages.
Timothy Smafield et al., "Automatic Dendritic Length Quantification for High Throughput Screening of Mature Neurons", Neuroinformatics, Humana Press Inc, vol. 13, No. 4, dated Apr. 9, 2015, pp. 443-458.
Henri Nguyen-Thi et al: "On the interest of synchrotron X-ray imaging for the study of solidification in metallic alloys", Comptes Rendus—Physique, vol. 13, No. 3, dated Jan. 20, 2012, pp. 237-245.
Badrinath Roysam et al: "Farsight: A Divide and Conquer Methodology for Analyzing Complex and Dynamic Biological Microenvironments", Jan. 1, 2008, Microscopic Image Analysis for Life Science Applications; [Artech House Series Bioinformatics & Biomedical Imaging], pp. 115 -152.
R W H Verwer et al: "Descriptive and comparative analysis of geometrical properties of neuronal tree structures", Journal of Neuroscience Methods, Elsevier Science Publisher B. V., Amsterdam, NL, vol. 18, No. 1-2, dated Oct. 1, 1986, pp. 179-206.
Examiner Thierry Bec, European Examination Report for Application No. 15188967.2, dated Jul. 28, 2016, 12 pages.
Examiner Thierry Bec, European Search Report for Application No. 15188968.0, dated Mar. 8, 2016, 9 pages.
131 Examiner Thierry Bec, European Examination Report for Application No. 15188968.0, dated Jul. 28, 2016, 12 pages.
Examiner Thierry Bec, European Search Report for Application No. 14779748.4, dated Dec. 12, 2016, 10 pages.
Examiner Thierry Bec, European Search Report for Application No. 14778653.7, dated Oct. 21, 2016, 10 pages.
Examiner Thierry Bec, European Examination Report for Application No. 14778653.7, dated Nov. 11, 2016, 8 pages.
Examiner Thierry Bec, European Search Report for Application No. 14779748A, dated Dec. 23, 2016, 8 pages.

\* cited by examiner

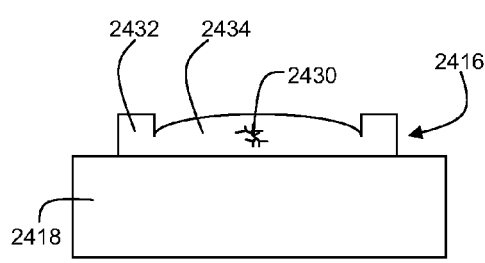
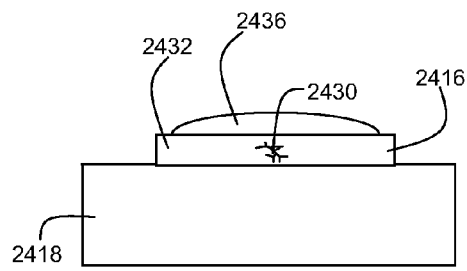
FIG. 31A            FIG. 31B
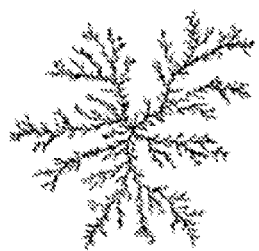
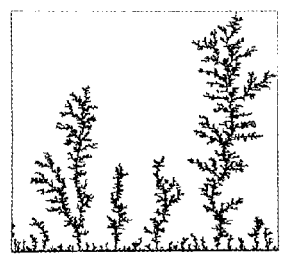
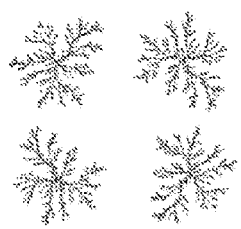
FIG. 32A     FIG. 32B     FIG. 32C
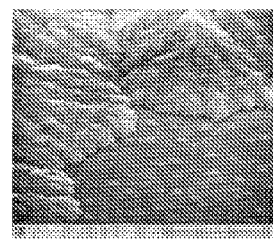
FIG. 33A           FIG. 33B

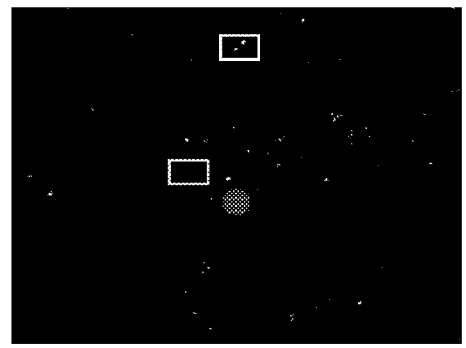
FIG. 46A
FIG. 46B
FIG. 46C
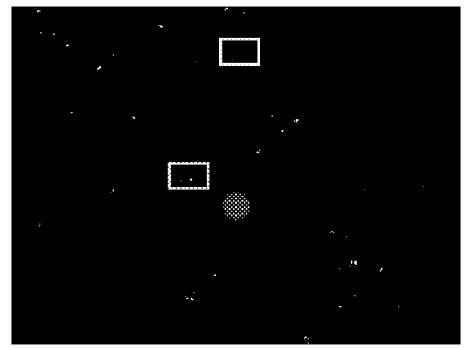
FIG. 46D

DENDRITIC STRUCTURES AND TAGS

CROSS-REFERENCE TO RELATED APPLICATIONS

This application is a U.S. National Phase Application of International Patent Application No. PCT/US2014/024557, filed Mar. 12, 2014, which claims priority to U.S. Provisional Patent Application No. 61/777,616, filed on Mar. 12, 2013, and to U.S. Provisional Patent Application No. 61/908,509, filed on Nov. 25, 2013, the entire contents of each of which are incorporated herein by reference.

TECHNICAL FIELD

This disclosure relates to dendritic structures, methods for making dendritic structures, and applications of dendritic structures.

BACKGROUND

The present disclosure relates generally to the formation and use of dendritic structures. A dendritic structure is a structure that develops with a typical multi-branching, tree-like form. Dendritic patterns are very common in nature and are illustrated by diverse phenomena such as snowflake formation and lightning. Dendritic crystallization forms a natural fractal pattern. A fractal is generally defined as a rough or fragmented geometric shape that can be subdivided into parts, each of which is (at least stochastically) a reduced-size copy of the whole, a property called self-similarity. This self-similarity leads to a fine structure at arbitrarily small scales. Because they appear similar (but not identical) at all levels of magnification, fractals are often considered to be infinitely complex. In practice, however, the finest observable levels of structure will be limited by physical and/or chemical constraints.

SUMMARY

This disclosure features methods for the fabrication of dendritic structures. In general, a dendritic metal structure can be formed by the electrodeposition of ions on or in an ion conductor. There are several viable options for the composition of the ion conductor, which can exist as a liquid, solid, or gel. Metals such as silver and copper are particularly appropriate as they are highly mobile in a variety of materials and are readily reduced and oxidized, which makes the electrochemical aspects of the process relatively straightforward.

This disclosure also features dendritic structures that are used for a wide variety of applications. For example, the dendritic structures disclosed herein are used as identification tags for a variety of commercial transactions and security applications. Due to their complex nature, dendritic structures are unique and therefore function as "fingerprints," enabling unique tagging and later identification of a wide variety of articles. To permit wide-scale use in commercial environments, the disclosure also features methods for implementing large-volume fabrication of dendritic structures. Further, the disclosure features methods and systems for protecting dendritic structures from tampering once the structures are applied to various articles.

Use of dendritic structures for identification and authentication applications entails robust analysis and recognition of the structures. Accordingly, the disclosure features methods and systems for acquiring and analyzing images of dendritic structures that rely on the unique properties of the structures to achieve accurate and reproducible analysis results.

In general, in a first aspect, the disclosure features methods that include methods that include obtaining at least one image of a dendritic tag attached to an article, analyzing the at least one image to identify a set of features associated with the dendritic tag, and comparing the set of features to stored information to identify the article.

Embodiments of the methods can include any one or more of the following features.

The set of features can include a center or origin of a dendritic structure in the tag. The set of features can include branch points of a dendritic structure in the tag. The set of features can include end points of branches of a dendritic structure in the tag. The set of features comprises a binary grid-based or spatial representation of a dendritic structure in the tag.

The stored information can include records stored in a database. The methods can include transmitting the set of features to a remote computing device, and using the remote computing device to perform the comparison. The methods can include transmitting the at least one image to a remote computing device, and using the remote computing device to analyze the at least one image and to perform the comparison.

The methods can include obtaining information about a date of manufacture of the article from the stored information. The methods can include obtaining information about a place of manufacture of the article from the stored information. The methods can include obtaining information about transportation of the article from the stored information. The information about transportation can include information about handlers of the article at points along a supply chain. The methods can include obtaining information about an expiration date of the article from the stored information. The methods can include obtaining information about recall notices for the article from the stored information. The methods can include obtaining health or safety information related to the article from the stored information.

The article can include a food item. The article can include a pharmaceutical product. The article can include a medical device.

The methods can include using a mobile telephone to obtain the at least one image of the dendritic tag. The methods can include authenticating the dendritic tag prior to analyzing the at least one image. Authenticating the dendritic tag can include: obtaining a first image and a second image of the dendritic tag, where the first image corresponds to illumination of the tag from a first direction and the second image corresponds to illumination of the tag from a second direction different from the first direction; and comparing the first and second images to determine whether a dendritic structure in the tag has a three-dimensional shape. The methods can include determining whether the dendritic structure in the tag has a three-dimensional shape based on patterns of reflected light from the dendritic structure in the first and second images. The set of features can include the patterns of reflected light from the dendritic structure.

Embodiments of the methods can also include any of the other steps or features disclosed herein, including steps or features recited in any of the claims, in any combination, as appropriate.

In another aspect, the disclosure features methods that include applying a dendritic tag to an article or to a container that includes an article, obtaining at least one image of the dendritic tag, analyzing the at least one image to identify a set of features associated with the dendritic tag, and creating a database record that includes information about an identity of the article and the set of features associated with the dendritic tag.

Embodiments of the methods can include any one or more of the following features.

Applying the dendritic tag can include applying the dendritic tag as a seal over an opening of the container. Applying the dendritic tag can include applying the dendritic tag to a product label. Applying the dendritic tag can include applying the dendritic tag over a fastener in the article or in the container. Applying the dendritic tag can include applying the dendritic tag over a seam in the article or in the container. Applying the dendritic tag can include applying the dendritic tag over a socket in the article or in the container. Applying the dendritic tag can include applying the dendritic tag to an interior of the article or the container, where the dendritic tag is configured to degrade when exposed to light. The dendritic tag can be heat sensitive so that a dendritic structure in the tag deforms when the tag is heated.

The methods can include obtaining the at least one image using a mobile telephone.

The article can be a food item. The article can be a pharmaceutical product. The article can be a medical device.

The set of features can include at least one of a center or origin of a dendritic structure in the tag, branch points of a dendritic structure in the tag, and end points of branches of a dendritic structure in the tag. The set of features can include a binary grid-based or spatial representation of a dendritic structure in the tag.

The methods can include transmitting the database record to a remote computing device that hosts the database. The methods can include transmitting the set of features to a remote computing device that hosts the database, and using the remote computing device to create the database record. The methods can include transmitting the at least one image to a remote computing device, and using the remote computing device to analyze the at least one image and to create the database record.

The methods can include storing additional information about the article in the database record. The additional information can include a date of manufacture of the article. The additional information can include a place of manufacture of the article. The additional information can include information about transportation of the article. The additional information can include an expiration date of the article. The additional information can include health or safety information related to the article.

The at least one image can include a first image corresponding to illumination of the tag from a first direction, and a second image corresponding to illumination of the tag from a second direction different from the first direction. The methods can include storing information about patterns of reflected light from a dendritic structure in the tag derived from the first and second images in the database record.

Embodiments of the methods can also include any of the other steps or features disclosed herein, including steps or features recited in any of the claims, in any combination, as appropriate.

In a further aspect, the disclosure features methods that include scanning a dendritic tag attached to an article, where the article includes an identification card or document, authenticating the dendritic tag based on information derived from the scan, determining a set of features associated with the dendritic tag based on information derived from the scan, and identifying the article based on the set of features.

Embodiments of the methods can include any one or more of the following features.

Identifying the article can include comparing the set of features to stored information to identify the article. Scanning the dendritic tag can include obtaining at least two images of the dendritic tag. A first image of the at least two images can correspond to illumination of the dendritic tag from a first direction, and a second image of the at least two images can correspond to illumination of the dendritic tag from a second direction different from the first direction. Scanning the dendritic tag can include scanning the dendritic tag using a capacitive detector.

The identification card or document can include a passport. The identification card or document can include a driver's license. The identification card or document can include a security access card.

Authenticating the dendritic tag can include determining whether the dendritic tag includes a three-dimensional dendritic structure. The methods can include determining whether the dendritic tag includes a three-dimensional dendritic structure based on patterns of reflected light from the dendritic structure.

The security access card can be configured for access to a restricted area, and the methods can include, following identification of the security access card, transmitting an electronic signal to open the restricted area. The electronic signal can be configured (e.g., can include a set of encoded instructions) to open a locked door to the restricted area.

The security access card can be configured for access to a device, and the methods can include, following identification of the security access card, transmitting an electronic signal to grant access to the device.

The security access card can be configured for access to a software application on a computing device, and the methods can include, following identification of the security access card, transmitting an electronic signal to grant access to the software application.

The set of features can include at least one of a center or origin of a dendritic structure in the tag, branch points of a dendritic structure in the tag, and end points of branches of a dendritic structure in the tag. The set of features can include a binary grid-based or spatial representation of a dendritic structure in the tag.

Identifying the article based on the set of features can include comparing the set of features to stored information. The stored information can include records stored in a database. The methods can include transmitting the set of features to a remote computing device, and using the remote computing device to perform the comparison.

The identification card or document can include a security access card for accessing secured locations, and the methods can include: obtaining information about a location at which the dendritic tag was scanned; obtaining information from the stored information about access permissions associated with the security access card at the location; and determining whether the access permissions are sufficient to allow access to the location.

The identification card or document can include a security access card for accessing secured devices, and scanning the dendritic tag can correspond to a request for access to a device. The methods can include: obtaining information from the stored information about access permissions associated with the security access card for the device; and determining whether the access permissions are sufficient to allow access to the device.

The identification card or document can include a security access card for accessing software applications, and scanning the dendritic tag can correspond to a request for access to a software application. The methods can include: obtaining information from the stored information about access permissions associated with the security access card for the software application; and determining whether the access permissions are sufficient to allow access to the software application.

Embodiments of the methods can also include any of the other steps or features disclosed herein, including steps or features recited in any of the claims, in any combination, as appropriate.

In another aspect, the disclosure features product identification tags that include a dendritic structure featuring at least one metallic material, a substrate supporting the dendritic structure, and a protective layer that contacts the dendritic structure and the substrate and is positioned to enclose at least a portion of the dendritic structure.

Embodiments of the tags can include any one or more of the following features.

The at least one metallic material can include at least one material selected from the group consisting of silver, copper, zinc, gold, iron, and tin. The protective layer can include at least one material selected from the group consisting of cyanoacrylate, polymethylmethacrylate, polysiloxane, silicon dioxide, and silicon nitride. The protective layer can encapsulate the dendritic structure. The tags can include an adhesive material extending through an aperture in the substrate to contact the dendritic structure so that when the tag is applied to an article, a portion of the dendritic structure is bonded to the article using the adhesive material.

The substrate can include a first surface that contacts the dendritic structure, and a second surface opposite the first surface, where the second surface features a plurality of depressions. The depressions can correspond to grooves formed in the second surface. The tags can include an adhesive layer that contacts the second surface and features a plurality of extensions that conform to the depressions formed in the second surface.

The substrate can include a plurality of cuts extending through at least a portion of a thickness of the substrate. At least some of the plurality of cuts can extend entirely through the thickness of the substrate. At least some of the plurality of cuts can extend through at least a portion of a thickness of the protective layer.

The tags can include at least one reactive material that reacts chemically when exposed to air or water. The at least one reactive material can be deposited on portions of the substrate and encapsulated by the protective layer. The at least one reactive material can include at least one material selected from the group consisting of acids, oxidizers, and sulfidizing agents. The at least one reactive material can be dispersed within the protective layer. The at least one reactive material can be contained within one or more blisters encapsulated by the protective layer. At least one of the one or more blisters can be positioned between the dendritic structure and the substrate.

The substrate can include at least one material selected from the group consisting of polyethylenes, polypropylenes, polyesters, polystyrenes, polyamides, polyolefins, acetates, vinyls, and fluorinated hydrocarbons. The substrate can include paper.

The tags can include an electrolyte layer positioned between the substrate and the dendritic structure. The electrolyte layer can include the at least one metallic material and a solid support material. The electrolyte layer can be a gel-based layer featuring the at least one metallic material. The paper substrate can include ions of the at least one metallic material. The paper substrate include at least one of currency, a negotiable instrument, an identification document, and a controlled document.

The tags can include a fluorescent agent attached to the dendritic structure.

Embodiments of the tags can also include any of the other features disclosed herein, including features recited in any of the claims, in any combination, as appropriate.

In a further aspect, the disclosure features methods for fabricating a product identification tag, the methods including applying an electrolyte material to a substrate material, contacting a surface of the substrate material with a plurality of first electrodes, contacting the electrolyte material with a second electrode, applying an electrical potential difference between the first plurality of electrodes and the second electrode to form a plurality of dendritic structures on the surface of the substrate material, and applying a protective layer that contacts the plurality of dendritic structures and the substrate, and encloses at least a portion of each of the dendritic structures.

Embodiments of the methods can include any one or more of the following features.

Applying the electrolyte material to the substrate material can include contacting at least one surface of the substrate material with a bath of the electrolyte material. Applying the electrolyte material to the substrate can include applying a gel-based electrolyte layer to a surface of the substrate material. Applying the electrolyte material to the substrate can include immersing the substrate material in a solution of the electrolyte material. The methods can include drying the substrate after formation of the plurality of dendritic structures. The dendritic structure can include at least one metallic material and the electrolyte material can include ions of the at least one metallic material.

Each of the plurality of first electrodes can be a cathode, and the second electrode can be an anode. The first plurality of electrodes can be arranged in an array pattern on a common electrode base. Each of the first plurality of electrodes can include a tapered tip.

Each of the first plurality of electrodes can be positioned radially on a surface of a roller with a central axis, and contacting the surface of the substrate material with the plurality of first electrodes can include rotating the roller about its central axis to selectively contact the surface with a subset of the plurality of first electrodes.

The second electrode can include a plate. The plate can include a plurality of openings, and the second electrode can be positioned with respect to the first plurality of electrodes so that each of the first plurality of electrodes is positioned within a different one of the openings.

The second electrode can include a plurality of tubes that are positioned with respect to the first plurality of electrodes so that each of the first plurality of electrodes is positioned within a different one of the tubes. The second electrode can include a plurality of rings that are positioned with respect to the first plurality of electrodes so that each of the first plurality of electrodes is positioned within a different one of the rings.

The first plurality of electrodes and the second electrode can be positioned on opposite sides of the substrate material. The first plurality of electrodes can pierce the substrate material so that the first plurality of electrodes extend at least partially through a thickness of the substrate material. The first plurality of electrodes can extend fully through the thickness of the substrate material.

The plate can include a fluid conduit connected to at least some of the openings, and the methods can include applying electrolyte material to the substrate material by directing the electrolyte material through the fluid conduit and into the at least some of the openings. At least some of the plurality of tubes can include apertures, and the methods can include applying electrolyte material to the substrate material by introducing the electrolyte material into an interior region of the at least some of the plurality of tubes through the apertures. At least some of the plurality of rings can include apertures, and the methods can include applying electrolyte material to the substrate material by introducing the electrolyte material into an interior region of the at least some of the plurality of rings through the apertures.

The methods can include, during formation of the plurality of dendritic structures, applying an electric field oriented in a direction perpendicular to the surface of the substrate material. A magnitude of the electric field can be between 10,000 V/cm and 1,000,000 V/cm.

The methods can include, after formation of the plurality of the dendritic structures and before applying the protective layer, applying one or more ionized fluorophores to the dendritic structures by applying an electrical potential to the dendritic structures, and exposing the dendritic structures to the ionized fluorophores during application of the electrical potential to attach the fluorophores to the dendritic structures.

The protective layer can encapsulate at least a portion of each of the dendritic structures. Applying the protective layer can include enclosing one or more voids in a region between the substrate material and the protective layer. Applying the protective layer can include depositing the protective layer in a physical vapor deposition process or a chemical vapor deposition process. Applying the protective layer can include depositing the protective layer as a liquid on the plurality of dendritic structures. Applying the protective layer can include depositing the protective layer as a conformal layer over each of the plurality of dendritic structures.

The protective layer can have a Mohs hardness number of 4 or more. The protective layer can include at least one material selected from the group consisting of polyacrylates, polymethylmethacrylates, polysiloxanes, silicon dioxide, and silicon nitride.

The methods can include, prior to applying the protective layer, depositing at least one reactive material in regions adjacent to the plurality of dendritic structures on the surface of the substrate material. The methods can include applying the protective layer so that the reactive materials are enclosed within the protective layer.

The methods can include separating the substrate material into a plurality of portions, where each portion supports one of the plurality of dendritic structures. The methods can include bonding at least one of the portions to an article using an adhesive material. The at least one portion can include an opening extending through the portion of the substrate material and exposing a region of the dendritic structure supported by the portion, and the methods can include applying the adhesive material to the exposed region of the dendritic structure so that the exposed region of the dendritic structure is bonded directly to the article with the adhesive material.

The methods can include introducing one or more cuts that extend at least partially through a thickness of the substrate material. The methods can include introducing one or more cuts that extend completely through the thickness of the substrate material and that extend partially through a thickness of the protective layer.

The methods can include bonding the at least one of the portions to a recess formed in the article. The methods can include contacting at least one lens to the protective layer. The methods can include forming at least one lens in the protective layer. The methods can include forming the at least one lens by molding the protective layer on the plurality of dendritic structures and the substrate. The methods can include forming the at least one lens by mechanically cutting the protective layer, or by chemically etching the protective layer.

The methods can include applying one or more fiducial marks to the substrate material. Applying the fiducial marks can include exposing the electrolyte material on the substrate material to spatially patterned illumination light, where the spatial pattern of the illumination light corresponds to positions of the fiducial marks.

Embodiments of the methods can also include any of the other steps or features disclosed herein, including steps or features recited in any of the claims, in any combination, as appropriate.

In another aspect, the disclosure features dendritic tags that include a dendritic structure featuring at least one metallic material, and a paper substrate supporting the dendritic structure.

Embodiments of the tags can include any one or more of the following features.

The tags can include a protective layer that contacts at least a portion of the dendritic structure, where the protective layer includes at least one material selected from the group consisting of cyanoacrylate, polymethylmethacrylate, polysiloxane, silicon dioxide, and silicon nitride. The at least one metallic material includes at least one material selected from the group consisting of silver, copper, zinc, gold, iron, and tin.

The tags can include an adhesive material extending through an aperture in the substrate to contact the dendritic structure so that when the tag is applied to an article, a portion of the dendritic structure is bonded to the article using the adhesive material.

The paper substrate can include ions of the at least one metallic material. The paper substrate can be formed from a plasticized paper material. The paper substrate can be a unit of currency. The paper substrate can be a negotiable financial instrument. The paper substrate can be a contract. The paper substrate can be an identification document. The paper substrate can be a product label. The paper substrate can be a controlled document.

Embodiments of the tags can also include any of the other features disclosed herein, including features recited in any of the claims, in any combination, as appropriate.

In a further aspect, the disclosure features methods for fabricating a dendritic tag that include applying an electrolyte material to a paper substrate, contacting a surface of the substrate with an electrode, and applying an electrical potential to the electrode to form a dendritic structure on the surface of the substrate.

Embodiments of the methods can include any one or more of the following features.

Applying the electrolyte material to the paper substrate can include soaking at least a portion of the paper substrate in the electrolyte material. The dendritic structure can include at least one metallic material, and the electrolyte material can include ions of the at least one metallic material. The methods can include drying the paper substrate following formation of the dendritic structure. The methods can include applying a protective layer that contacts the dendritic structure and the paper substrate, and encloses at least a portion of the dendritic structure.

The electrode can be a cathode, and the methods can include contacting a surface of the substrate with an anode. The anode can contact the substrate at a location that is different from a position opposite to the cathode. The electrode can be a cathode, and the methods can include contacting the surface of the substrate with one or more additional cathodes and applying the electrical potential to each of the cathodes to form a plurality of dendritic structures on the surface of the substrate.

Embodiments of the methods can also include any of the other steps or features disclosed herein, including steps or features recited in any of the claims, in any combination, as appropriate.

In another aspect, the disclosure features methods that include obtaining an image of a dendritic structure in a tag attached to an article or to a container that includes the article, analyzing the image to identify a set of features associated with the dendritic structure, where the set of features includes an origin of the dendritic structure, branch points of the dendritic structure, and termination points of branches of the dendritic structure, and comparing the set of features to reference information for a plurality of dendritic structures to determine information about the article.

Embodiments of the methods can include any one or more of the following features.

The comparing can include: (a) selecting a first one of the set of features, and identifying reference information corresponding to a first subset of the plurality of dendritic structures that include the selected first feature; and (b) selecting a second one of the set of features, and identifying reference information corresponding to second subset of the plurality of dendritic structures that include the selected second feature, where the second subset is selected from among the first subset. The methods can include repeating (b) until the identified reference information corresponds to a single dendritic structure from among the plurality of dendritic structures. The methods can include repeating (b) until the identified reference information corresponds to no dendritic structure from among the plurality of dendritic structures.

Obtaining the image can include illuminating the dendritic structure with incident light, and measuring reflected light from the dendritic structure to form the image. The methods can include adjusting at least one of a contrast and a brightness of the image to highlight edges of portions of the dendritic structure. The methods can include constructing a second image based on the adjusted image by replacing portions of the dendritic structure with line segments. The methods can include positioning each of the line segments between corresponding edges of the portions of the dendritic structure. A thickness of each line segment can be proportional to a distance between the corresponding edges. The methods can include analyzing the second image rather than the image formed from measured reflected light to identify the set of features.

The methods can include obtaining an additional image of the dendritic structure, analyzing the additional image to identify a set of features associated with the dendritic structure, where the set of features includes an origin of the dendritic structure, branch points of the dendritic structure, and termination points of branches of the dendritic structure in the additional image, and comparing the set of features derived from the additional image to reference information for the plurality of dendritic structures to determine information about the article. The methods can include providing a warning signal if the set of features derived from the additional image does not correspond to a single dendritic structure from among the plurality of dendritic structures. The warning signal can include at least one of a visual signal and an auditory signal.

The methods can include repeating (b) until no change occurs in the identified reference information. If the identified reference information corresponds to more than one dendritic structure from among the plurality of dendritic structures, the methods can include identifying a dendritic structure from among the more than one dendritic structure that corresponds to the dendritic structure in the tag based on the identified reference information. Identifying a dendritic structure from among the more than one dendritic structure that corresponds to the dendritic structure in the tag based on the identified reference information can include: for each of the more than one dendritic structure, extracting information about an article to which each of the more than one dendritic structure is applied from the identified reference information; and identifying a dendritic structure from among the more than one dendritic structure based on the information about the articles to which each of the more than one dendritic structure is applied.

The methods can include obtaining multiple images of the dendritic structure, where each one of the multiple images is obtained by illuminating the dendritic structure from a different direction and detecting light reflected from the dendritic structure, analyzing the multiple images to identify patterns of reflected light from the dendritic structure corresponding to each of the different directions, and comparing the patterns of reflected light to the reference information for a plurality of dendritic structures to determine the information about the article.

The methods can include obtaining multiple images of the dendritic structure, where each one of the multiple images can be obtained by illuminating the dendritic structure from a different direction and detecting light reflected from the dendritic structure. The methods can include authenticating the dendritic structure in the tag based on information derived from the multiple images. Authenticating the dendritic structure can include determining an authenticity of the dendritic structure based on changes in light reflected from the dendritic structure along the different illumination directions. The methods can include illuminating the dendritic structure along different directions that correspond to fiducial marks on the tag.

The methods can include obtaining the image of the dendritic structure using a mobile telephone. The methods can include obtaining the image of the dendritic structure using an imaging apparatus connected to the mobile telephone. The imaging apparatus can include a waveguide positioned to direct illumination light to the dendritic structure, and a lens positioned to direct reflected light from the dendritic structure to an image sensor of the mobile telephone.

The information about the article can include an identity of the article. The methods can include determining whether the article is genuine based on the identity information. The methods can include: if the article is determined to be genuine, providing a first indicator, where the first indicator includes at least one of an audio signal and a visual signal; and if the article is determined to not be genuine, providing a second indicator different from the first indicator, where the second indicator includes at least one of an audio signal and a visual signal.

The information about the article can include information about an origin of the article. The information about the origin of the article can include at least one of information about a date of manufacture or harvesting of the article, information about a place of manufacture or harvesting of the article, and information about a manufacturer or harvester of the article. The methods can include determining whether the article has reached an expiration date based on the information about the origin of the article.

The information about the article can include transit information about the article. The transit information can include information about locations through which the article has passed. The methods can include determining whether the article is genuine based on the information about locations through which the article has passed.

The information about the article can include security information about the article. The security information can include information about access permissions to a secure location for a bearer of the article. The methods can include determining whether to grant access to a secured location based on the security information.

The reference information can be stored in a database, and the methods can include: attaching the tag to the article or to the container that includes the article; obtaining an initial image of the dendritic structure in the tag; analyzing the initial image to identify a set of features associated with the dendritic structure, where the set of features includes an origin of the dendritic structure, branch points of the dendritic structure, and termination points of branches of the dendritic structure; and storing the set of features as the reference information in a database record associated with the article.

The article can include a food product. The article can include a pharmaceutical product. The article can include at least one of a security access card, a negotiable financial instrument, and an identification document.

Embodiments of the methods can also include any of the other steps or features disclosed herein, including steps or features recited in any of the claims, in any combination, as appropriate.

In a further aspect, the disclosure features methods that include obtaining an image of a dendritic structure in a tag attached to an article or to a container that includes the article, segmenting the image into a plurality of regions and assigning a binary value to each region based on the portion of the dendritic structure in each region, constructing a binary spatial representation of the dendritic structure based on the plurality of regions, and comparing the binary spatial representation to reference information for a plurality of dendritic structures to determine information about the article.

Embodiments of the methods can include any one or more of the following features.

The comparing can include: (a) segmenting the image into a first plurality of regions, assigning a binary value to each one of the first plurality of regions, constructing a first binary spatial representation of the dendritic structure based on the first plurality of regions, and identifying reference information corresponding to a first subset of the plurality of dendritic structures that correspond to the first binary spatial representation; and (b) segmenting the image into a second plurality of regions, assigning a binary value to each one of the second plurality of regions, constructing a second binary spatial representation of the dendritic structure based on the second plurality of regions, and identifying reference information corresponding to a second subset of the plurality of dendritic structures that correspond to the second binary spatial representation, where members of the second plurality of regions are smaller than members of the first plurality of regions, and wherein the second subset is selected from among the first subset. The methods can include repeating (b) until the identified reference information corresponds to a single dendritic structure from among the plurality of dendritic structures. The methods can include repeating (b) until the identified reference information corresponds to no dendritic structure from among the plurality of dendritic structures.

The methods can include: obtaining an additional image of the dendritic structure; segmenting the additional image into a plurality of regions, assigning a binary value to each region in the additional image based on the portion of the dendritic structure in each region, and constructing a binary spatial representation of the dendritic structure based on the plurality of regions in the additional image; and comparing the binary spatial representation from the additional image to reference information for a plurality of dendritic structures to determine information about the article. The methods can include providing a warning signal if the binary spatial representation derived from the additional image does not correspond to a single dendritic structure from among the plurality of dendritic structures. The warning signal can include at least one of a visual signal and an auditory signal.

The methods can include repeating (b) until no change occurs in the identified reference information. If the identified reference information corresponds to more than one dendritic structure from among the plurality of dendritic structures, the methods can include identifying a dendritic structure from among the more than one dendritic structure that corresponds to the dendritic structure in the tag, based on the identified reference information. Identifying a dendritic structure from among the more than one dendritic structure that corresponds to the dendritic structure in the tag based on the identified reference information can include: for each of the more than one dendritic structure, extracting information about an article to which each of the more than one dendritic structure is applied from the identified reference information; and identifying a dendritic structure from among the more than one dendritic structure based on the information about the articles to which each of the more than one dendritic structure is applied.

The methods can include obtaining multiple images of the dendritic structure, where each one of the multiple images can be obtained by illuminating the dendritic structure from a different direction and detecting light reflected from the dendritic structure. The methods can include authenticating the dendritic structure in the tag based on information derived from the multiple images. Authenticating the dendritic structure can include determining an authenticity of the dendritic structure based on changes in light reflected from the dendritic structure along the different illumination directions. The methods can include illuminating the dendritic structure along different directions that correspond to fiducial marks on the tag.

The methods can include obtaining the image of the dendritic structure using a mobile telephone. The methods can include obtaining the image of the dendritic structure using an imaging apparatus connected to the mobile telephone. The imaging apparatus can include a waveguide positioned to direct illumination light to the dendritic structure, and a lens positioned to direct reflected light from the dendritic structure to an image sensor of the mobile telephone.

The information about the article can include an identity of the article. The methods can include determining whether the article is genuine based on the identity information. The methods can include: if the article is determined to be genuine, providing a first indicator, where the first indicator includes at least one of an audio signal and a visual signal; and if the article is determined to not be genuine, providing a second indicator different from the first indicator, where the second indicator includes at least one of an audio signal and a visual signal.

The information about the article can include information about an origin of the article. The information about the origin of the article can include at least one of information about a date of manufacture or harvesting of the article, information about a place of manufacture or harvesting of the article, and information about a manufacturer or harvester of the article. The methods can include determining whether the article has reached an expiration date based on the information about the origin of the article.

The information about the article can include transit information about the article. The transit information can include information about locations through which the article has passed. The methods can include determining whether the article is genuine based on the information about locations through which the article has passed.

The information about the article can include security information about the article. The security information can include information about access permissions to a secure location for a bearer of the article. The methods can include determining whether to grant access to a secured location based on the security information.

The reference information can be stored in a database, and the methods can include: attaching the tag to the article or to the container that includes the article; obtaining an initial image of the dendritic structure in the tag; segmenting the initial image into a plurality of regions and assigning a binary value to each region based on the portion of the dendritic structure in each region of the initial image; constructing a binary spatial representation of the dendritic structure based on the plurality of regions of the initial image; and storing the binary spatial representation as the reference information in a database record associated with the article.

The article can include a food product. The article can include a pharmaceutical product. The article can include at least one of a security access card, a negotiable financial instrument, and an identification document.

Embodiments of the methods can also include any of the other steps or features disclosed herein, including steps or features recited in any of the claims, in any combination, as appropriate.

In another aspect, the disclosure features systems that include an illumination source configured to direct incident light to a dendritic structure in a tag attached to an article or to a container that includes the article, a detector configured to obtain an image by measuring incident light reflected from the dendritic structure, and at least one electronic processor configured to: analyze the image to identify a set of features associated with the dendritic structure, where the set of features includes an origin of the dendritic structure, branch points of the dendritic structure, and termination points of branches of the dendritic structure; and compare the set of features to reference information for a plurality of dendritic structures to determine information about the article.

Embodiments of the systems can include any one or more of the following features.

The illumination source and the detector can be enclosed within a common housing. The at least one electronic processor can be enclosed within the common housing. The at least one electronic processor may not be enclosed within the common housing.

The at least one electronic processor can include a first electronic processor enclosed within the common housing and configured to analyze the image, and a second electronic processor not enclosed within the common housing and configured to compare the set of features to reference information. The second electronic processor can be connected to a computing device that includes a database that includes the reference information.

The illumination source can include a flash unit of a mobile telephone, the detector can include a camera of the mobile telephone, and the at least one electronic processor can include an electronic processor of the mobile telephone. The illumination source can include a flash unit of a mobile telephone, the detector can include a camera of the mobile telephone, and the first electronic processor can include an electronic processor of the mobile telephone. The systems can include an auxiliary imaging unit connected to the common housing of the mobile telephone and featuring a waveguide positioned to direct the incident light to the dendritic structure, and a lens positioned to direct reflected light to the camera of the mobile telephone.

The at least one electronic processor can be configured to: (a) select a first one of the set of features, and identify reference information corresponding to a first subset of the plurality of dendritic structures that include the selected first feature; and (b) select a second one of the set of features, and identify reference information corresponding to second subset of the plurality of dendritic structures that include the selected second feature, where the second subset is selected from among the first subset. The at least one electronic processor can be configured to repeat (b) until the identified reference information corresponds to a single dendritic structure from among the plurality of dendritic structures. The at least one electronic processor can be configured to repeat (b) until the identified reference information corresponds to no dendritic structure from among the plurality of dendritic structures.

The at least one electronic processor can be configured to adjust at least one of a contrast and a brightness of the image to highlight edges of portions of the dendritic structure. The at least one electronic processor can be configured to construct a second image based on the adjusted image by replacing portions of the dendritic structure with line segments. The at least one electronic processor can be configured to position each of the line segments between corresponding edges of the portions of the dendritic structure. The at least one electronic processor can be configured to analyze the second image rather than the image formed from measured reflected light to identify the set of features.

The detector can be configured to obtain an additional image of the dendritic structure, and the at least one electronic processor can be configured to analyze the additional image to identify a set of features associated with the dendritic structure, where the set of features includes an origin of the dendritic structure, branch points of the dendritic structure, and termination points of branches of the dendritic structure in the additional image, and compare the set of features derived from the additional image to reference information for the plurality of dendritic structures to determine information about the article. The at least one electronic processor can be configured to provide a warning signal if the set of features derived from the additional image does not correspond to a single dendritic structure from among the plurality of dendritic structures. The warning signal can include an auditory signal, and the at least one electronic processor can be configured to activate a sound generator to provide the auditory signal. The warning signal can include a visual signal, the systems can include a display, and the at least one electronic processor can be configured to generate the visual signal using the display.

The at least one electronic processor can be configured to repeat (b) until no change occurs in the identified reference information. The at least one electronic processor can be configured so that if the identified reference information corresponds to more than one dendritic structure from among the plurality of dendritic structures, the at least one electronic processor identifies a dendritic structure from among the more than one dendritic structure that corresponds to the dendritic structure in the tag based on the identified reference information. The at least one electronic processor can be configured to identify a dendritic structure from among the more than one dendritic structure that corresponds to the dendritic structure in the tag based on the identified reference information by: for each of the more than one dendritic structure, extracting information about an article to which each of the more than one dendritic structure is applied from the identified reference information; and identifying a dendritic structure from among the more than one dendritic structure based on the information about the articles to which each of the more than one dendritic structure is applied.

The detector can be configured to obtain multiple images of the dendritic structure, each one of the multiple images corresponding to illumination of the dendritic structure from a different direction, and the at least one electronic processor can be configured to analyze the multiple images to identify patterns of reflected light from the dendritic structure corresponding to each of the different illumination directions, and compare the patterns of reflected light to the reference information for a plurality of dendritic structures to determine the information about the article.

The at least one electronic processor can be configured to authenticate the dendritic structure in the tag. The detector can be configured to obtain multiple images of the dendritic structure, where each one of the multiple images corresponds to illumination of the dendritic structure with incident light from the illumination source along a different direction, and the at least one electronic processor can be configured to determine the authenticity of the dendritic structure based on changes in light reflected from the dendritic structure along the different illumination directions.

The information about the article can include an identity of the article. The at least one electronic processor can be configured to determine whether the article is genuine based on the identity information. The at least one electronic processor can be configured so that: if the article is determined to be genuine, the at least one electronic processor provides a first indicator, where the first indicator includes at least one of an audio signal and a visual signal; and if the article is determined to not be genuine, the at least one electronic processor provides a second indicator different from the first indicator, where the second indicator includes at least one of an audio signal and a visual signal.

The information about the article can include information about an origin of the article. The information about the origin of the article can include at least one of information about a date of manufacture or harvesting of the article, information about a place of manufacture or harvesting of the article, and information about a manufacturer or harvester of the article. The at least one electronic processor can be configured to determine whether the article has reached an expiration date based on the information about the origin of the article.

The information about the article can include transit information about the article. The transit information can include information about locations through which the article has passed. The at least one electronic processor can be configured to determine whether the article is genuine based on the information about locations through which the article has passed.

The information about the article can include security information about the article. The security information can include information about access permissions to a secure location for a bearer of the article. The at least one electronic processor can be configured to determine whether to grant access to a secured location based on the security information.

The reference information can be stored in a database, the detector can be configured to obtain an initial image of the dendritic structure in the tag, and the at least one electronic processor can be configured to analyze the initial image to identify a set of features associated with the dendritic structure, where the set of features includes an origin of the dendritic structure, branch points of the dendritic structure, and termination points of branches of the dendritic structure, and store the set of features as the reference information in a database record associated with the article.

The article can include a food product. The article can include a pharmaceutical product. The article can include at least one of a security access card, a negotiable financial instrument, and an identification document.

Embodiments of the systems can also include any of the other features disclosed herein, including features recited in any of the claims, in any combination, as appropriate.

In a further aspect, the disclosure features systems that include an illumination source configured to direct incident light to a dendritic structure in a tag attached to an article or to a container that includes the article, a detector configured to obtain an image by measuring incident light reflected from the dendritic structure, and at least one electronic processor configured to: segment the image into a plurality of regions and assign a binary value to each region based on the portion of the dendritic structure in each region; construct a binary spatial representation of the dendritic structure based on the plurality of regions; and compare the binary spatial representation to reference information for a plurality of dendritic structures to determine information about the article.

Embodiments of the systems can include any one or more of the following features.

The illumination source and the detector can be enclosed within a common housing. The at least one electronic processor can be enclosed within the common housing. The at least one electronic processor may not be enclosed within the common housing.

The at least one electronic processor can include a first electronic processor enclosed within the common housing and configured to segment the image and construct the binary spatial representation, and a second electronic processor not enclosed within the common housing and configured to compare the binary spatial representation to reference information. The second electronic processor can be connected to a computing device that includes a database that includes the reference information.

The illumination source can include a flash unit of a mobile telephone, the detector can include a camera of the mobile telephone, and the at least one electronic processor can include an electronic processor of the mobile telephone. The illumination source can include a flash unit of a mobile telephone, the detector can include a camera of the mobile telephone, and the first electronic processor can include an electronic processor of the mobile telephone.

The systems can include an auxiliary imaging unit connected to the common housing of the mobile telephone and including a waveguide positioned to direct the incident light to the dendritic structure, and a lens positioned to direct reflected light to the camera of the mobile telephone.

The at least one electronic processor can be configured to: (a) segment the image into a first plurality of regions, assign a binary value to each one of the first plurality of regions, construct a first binary spatial representation of the dendritic structure based on the first plurality of regions, and identify reference information corresponding to a first subset of the plurality of dendritic structures that correspond to the first binary spatial representation; and (b) segment the image into a second plurality of regions, assign a binary value to each one of the second plurality of regions, construct a second binary spatial representation of the dendritic structure based on the second plurality of regions, and identify reference information corresponding to a second subset of the plurality of dendritic structures that correspond to the second binary spatial representation, where members of the second plurality of regions are smaller than members of the first plurality of regions, and where the second subset is selected from among the first subset. The at least one electronic processor can be configured to repeat (b) until the identified reference information corresponds to a single dendritic structure from among the plurality of dendritic structures. The at least one electronic processor can be configured to repeat (b) until the identified reference information corresponds to no dendritic structure from among the plurality of dendritic structures.

The detector can be configured to obtain an additional image of the dendritic structure, and the at least one electronic processor can be configured to: segment the additional image into a plurality of regions, assign a binary value to each region in the additional image based on the portion of the dendritic structure in each region, and construct a binary spatial representation of the dendritic structure based on the plurality of regions in the additional image; and compare the binary spatial representation from the additional image to reference information for a plurality of dendritic structures to determine information about the article. The at least one electronic processor can be configured to provide a warning signal if the binary spatial representation derived from the additional image does not correspond to a single dendritic structure from among the plurality of dendritic structures. The warning signal can include an auditory signal, and the at least one electronic processor can be configured to activate a sound generator to provide the auditory signal. The warning signal can include a visual signal, the system can include a display, and the at least one electronic processor can be configured to generate the visual signal using the display.

The at least one electronic processor can be configured to repeat (b) until no change occurs in the identified reference information. The at least one electronic processor can be configured so that if the identified reference information corresponds to more than one dendritic structure from among the plurality of dendritic structures, the at least one electronic processor identifies a dendritic structure from among the more than one dendritic structure that correspond to the dendritic structure in the tag, based on the identified reference information. The at least one electronic processor can be configured to identify a dendritic structure from among the more than one dendritic structure that corresponds to the dendritic structure in the tag based on the identified reference information by: for each of the more than one dendritic structure, extracting information about an article to which each of the more than one dendritic structure is applied from the identified reference information; and identifying a dendritic structure from among the more than one dendritic structure based on the information about the articles to which each of the more than one dendritic structure is applied.

The detector can be configured to obtain multiple images of the dendritic structure, each one of the multiple images corresponding to illumination of the dendritic structure from a different direction, and the at least one electronic processor can be configured to analyze the multiple images to identify patterns of reflected light from the dendritic structure corresponding to each of the different illumination directions, and compare the patterns of reflected light to the reference information for a plurality of dendritic structures to determine the information about the article.

The at least one electronic processor can be configured to authenticate the dendritic structure in the tag. The detector can be configured to obtain multiple images of the dendritic structure, where each one of the multiple images corresponds to illumination of the dendritic structure with incident light from the illumination source along a different direction, and the at least one electronic processor can be configured to determine the authenticity of the dendritic structure based on changes in light reflected from the dendritic structure along the different illumination directions.

The information about the article can include an identity of the article. The at least one electronic processor can be configured to determine whether the article is genuine based on the identity information. The at least one electronic processor can be configured so that: if the article is determined to be genuine, the at least one electronic processor provides a first indicator, where the first indicator includes at least one of an audio signal and a visual signal; and if the article is determined to not be genuine, the at least one electronic processor provides a second indicator different from the first indicator, where the second indicator includes at least one of an audio signal and a visual signal.

The information about the article can include information about an origin of the article. The information about the origin of the article can include at least one of information about a date of manufacture or harvesting of the article, information about a place of manufacture or harvesting of the article, and information about a manufacturer or harvester of the article. The at least one electronic processor can be configured to determine whether the article has reached an expiration date based on the information about the origin of the article.

The information about the article can include transit information about the article. The transit information can include information about locations through which the article has passed. The at least one electronic processor can be configured to determine whether the article is genuine based on the information about locations through which the article has passed.

The information about the article can include security information about the article. The security information can include information about access permissions to a secure location for a bearer of the article. The at least one electronic processor can be configured to determine whether to grant access to a secured location based on the security information.

The reference information can be stored in a database, the detector can be configured to obtain an initial image of the dendritic structure in the tag, and the at least one electronic processor can be configured to segment the initial image into a plurality of regions and assign a binary value to each region based on the portion of the dendritic structure in each region of the initial image, construct a binary spatial representation of the dendritic structure based on the plurality of regions of the initial image, and store the binary spatial representation as the reference information in a database record associated with the article.

The article can include a food product. The article can include a pharmaceutical product. The article can include at least one of a security access card, a negotiable financial instrument, and an identification document.

Embodiments of the systems can also include any of the other features disclosed herein, including features recited in any of the claims, in any combination, as appropriate.

In another aspect, the disclosure features methods for generating a unique identifier, the methods including providing a dendritic structure, reading the dendritic structure to provide a signal, and generating a unique identifier from the signal.

Embodiments of the methods can include any one or more of the following features.

The dendritic structure can include a dendritic metal structure. The dendritic metal can have an average thickness of no more than about 200 nm. The dendritic metal structure can have an average individual segment width of no more than about 100 μm.

The dendritic metal structure can be formed by a method that includes providing an ion conductor and two or more electrodes in contact with the ion conductor, and applying a bias voltage across the electrodes sufficient to grow the dendritic metal structure in or on the ion conductor extending from the cathode. The ion conductor can be a solid. Alternatively, the ion conductor can be a liquid or gel. The ion conductor can include copper ions or silver ions. The dendritic metal structure can incorporate the metal of the anode.

At least one of the two or more electrodes and the ion conductor can be in contact with a substrate. The ion conductor can be in contact with the substrate. Both the anode and the ion conductor can be in contact with the substrate.

The dendritic structure can be disposed on a substrate. The substrate can include at least one of glass, plastic, metal, paper, fabric, insulator, semiconductor, or a combination thereof. The substrate can include a flexible material. A barrier layer can be disposed between the dendritic structure and the substrate.

The dendritic structure can be in contact with an ion conductor during the reading of the dendritic structure. The dendritic structure may not be in contact with an ion conductor during the reading of the dendritic structure.

Reading the dendritic structure can include optically reading the dendritic structure. Optically reading the dendritic structure can include using a camera or array of photodetectors to detect light reflected from the dendritic structure.

Reading the dendritic structure can include electrically reading the dendritic structure. Electrically reading the dendritic structure can include reading the dendritic structure based on its capacitance, the methods including electrically contacting the dendritic structure with a plurality of sensors, and measuring a capacitance at each sensor. Electrically reading the dendritic structure can include reading the dendritic structure based on its resistance, the methods including electrically contacting the dendritic structure with a plurality of sensors, and measuring a resistance at each sensor.

Reading the dendritic structure can include determining x-ray fluorescence information about the dendritic structure. Reading the dendritic structure can include determining reflectance information for the dendritic structure at radio-frequency wavelengths or measuring an electromagnetic signal from the dendritic structure at radio-frequency wavelengths. Reading the dendritic structure can include directing radio waves of different frequencies to the dendritic structure, and detecting at least one of frequencies of radio waves reflected from the dendritic structure and an electromagnetic response of the dendritic structure. The dendritic structure can be operatively coupled to a radio frequency antenna or other source of radio frequency waves.

Generating the unique identifier can include applying a numerical method to the signal provided by the reading of the dendritic structure to generate the unique identifier. The unique identifier can include at least one of a number, a binary number, a text string, a set of analog values, and an image of the dendritic structure.

The unique identifier can be used to mark an object. The methods can include using the unique identifier to track a location of the object. The methods can include destroying the dendritic structure by applying a burst of electrical energy.

Embodiments of the methods can also include any of the other steps or features disclosed herein, including steps or features recited in any of the claims, in any combination, as appropriate.

In a further aspect, the disclosure features methods for identifying an object featuring a dendritic structure, the methods including reading the dendritic structure to provide a signal, generating a unique identifier from the signal, and identifying the object using the unique identifier.

Embodiments of the methods can include any of the steps or features disclosed herein, including steps or features recited in any of the claims, in any combination, as appropriate.

In another aspect, the disclosure features methods for authenticating an object featuring a dendritic structure, the methods including reading the dendritic structure to provide a signal, generating a unique identifier from the signal, and authenticating the object using the unique identifier.

Embodiments of the methods can include any of the steps or features disclosed herein, including steps or features recited in any of the claims, in any combination, as appropriate.

In a further aspect, the disclosure features methods for encrypting data using a dendritic structure, the methods including reading the dendritic structure to provide a signal, generating a unique identifier from the signal, and using the unique identifier as a key to encrypt the data.

Embodiments of the methods can include any of the steps or features disclosed herein, including steps or features recited in any of the claims, in any combination, as appropriate.

In another aspect, the disclosure features methods for accessing encrypted data using a dendritic structure, the methods including reading the dendritic structure to provide a signal, generating a unique identifier from the signal, and using the unique identifier as a key to access the encrypted data.

Embodiments of the methods can include any of the steps or features disclosed herein, including steps or features recited in any of the claims, in any combination, as appropriate.

Certain features, aspects, and steps are disclosed herein in connection with particular embodiments. In general, however, those features, aspects, and steps are not particular to those embodiments, and can be combined with other embodiments and other features, aspects, and steps as desired. Accordingly, while particular embodiments have been described herein for purposes of illustration, it should be appreciated that other combinations of the features, aspects, and steps disclosed herein are also within the scope of the disclosure, and that particular embodiments described herein can also include features, aspects, and steps disclosed in connection with other embodiments.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 31A is a schematic diagram of a dendritic tag applied to an article and featuring an integrally formed lens.

FIG. 31B is a schematic diagram of a dendritic tag applied to an article and featuring a lens applied to the tag.

FIGS. 32A-32C are schematic diagrams of radial, parallel, and multiple dendritic structures, respectively.

FIGS. 33A-33B are scanning electron micrographs of dendritic structures with tree-like and terrain-like fractal structure in the perpendicular direction, respectively.

FIGS. 46A-46D are contrast-adjusted images that correspond to the images of FIGS. 45A-45D, respectively.

Like reference symbols in the various drawings indicate like elements.

DETAILED DESCRIPTION

Dendritic structures appear in a wide variety of natural forms, including, for example, lightning, dielectric breakdown, the flow of rivers, mechanical fractures, and blood vessels. Typically, the particular forms of these dendritic structures are a product of the physical processes that give rise to them and a component of randomness inherent to flow processes. This disclosure introduces dendritic structures by describing certain features thereof and methods for making such structures, including methods for fabricating dendritic structures that are suitable for large-scale manufacturing. Subsequent sections of this disclosure discuss a variety of applications for dendritic structures, including the use of dendritic structures in commercial transactions.

Fabrication of Dendritic Structures

Figure 1:
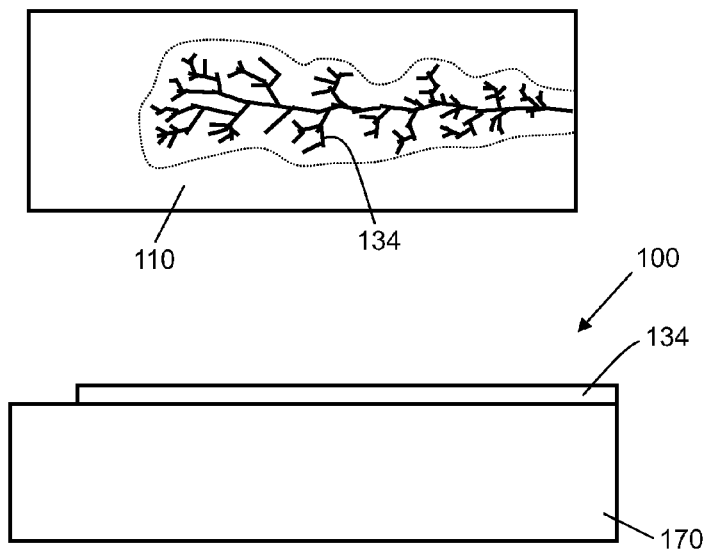
FIG. 1 is a schematic diagram of a dendritic structure formed on a substrate.

One example of a dendritic structure assembly 100 is shown in schematic top view in FIG. 1. Dendritic structure 134 is disposed on a substrate 170. Although dendritic structures in nature form by a wide range of physical and chemical processes, metallic dendritic structures have a number of properties that are advantageous for various applications. For example, metallic dendritic structures can be simply formed and "read" electrically and/or optically and/or using other non-destructive measurement methods (for example, using X-ray fluorescence (XRF) methods). Accordingly, dendritic metal structures are useful in many of the applications disclosed herein.

Due to their multi-branched, stochastically grown structure (as will be described further herein), dendritic metal structures can provide an effectively unique, randomly generated identifier. Moreover, dendritic metal structures can also be made to have "nanoscale" features in their individual conducting elements, which allows them to contain or represent a great deal of information in a relatively small area. Moreover, as will be described in more detail below, because dendritic metal structures can be formed using deposition from a solid electrolyte, the fabrication of such devices can be relatively simple and therefore of low cost. Dendritic metal structures suitable for use in the methods described herein are described generally in U.S. Pat. No. 8,345,910, U.S. Patent Application Publication No. US 2011/0254117, and International Patent Application Publications Nos. WO 2012/065076 and WO 2012/065083, the entire contents of each of which are incorporated by reference herein.

Figure 2:
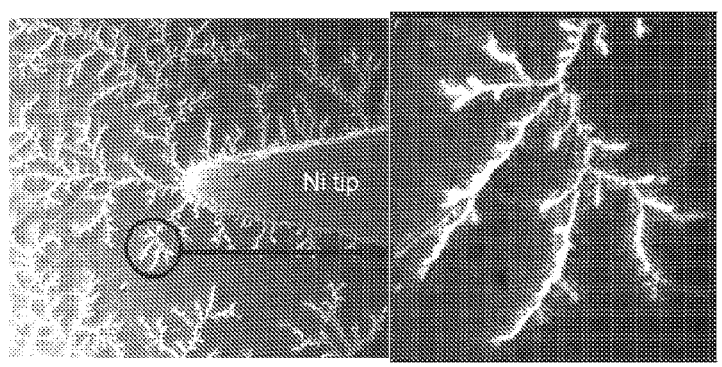
FIG. 2 is a photomicrograph of a silver dendritic structure formed on a nickel cathode.
Figure 3:
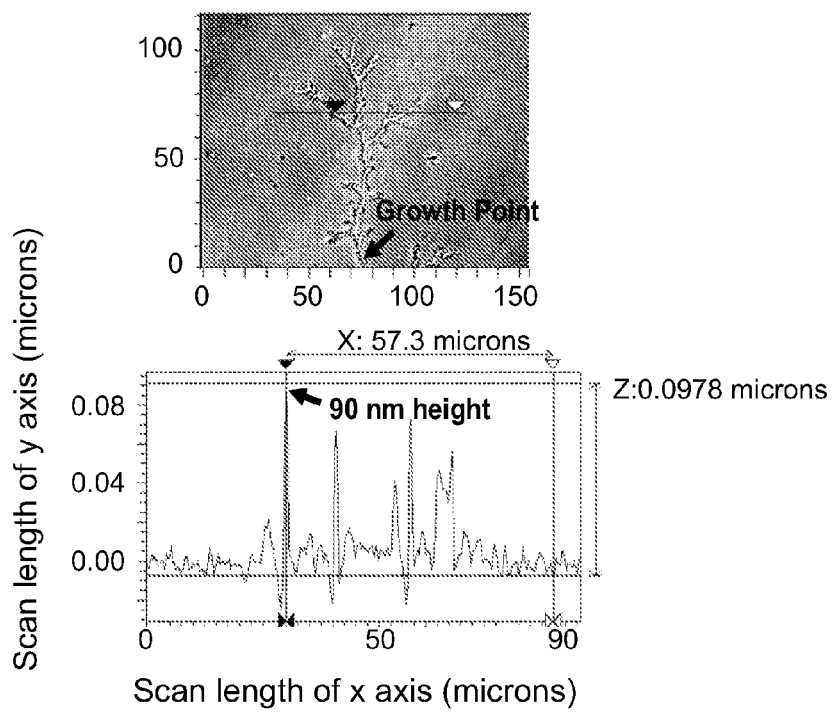
FIG. 3 is a plot showing a profilometry measurement of a dendritic structure.

A photomicrograph of an example of a dendritic metal structure is shown in FIG. 2, in which dendritic silver structures are grown from a nickel cathode. FIG. 3 is a profilometry measurement of another example of a dendritic metal structure. In general, a dendritic metal structure has a multi-branched structure formed of segments of reduced metallic material. In certain embodiments, dendritic metal structures have an average individual segment width (i.e., in the plane of the dendritic metal structure) of no more than about 300 µm (e.g., no more than about 100 µm, no more than about 10 µm, no more than about 1 µm, or even no more than about 200 nm). In certain embodiments, dendritic metal structures have an average individual segment width of at least about 20 nm.

In some embodiments, dendritic metal structures have an average thickness (i.e., normal to the plane of the dendritic metal structures) of no more than about 100 µm (e.g., no more than about 10 µm, no more than about 5 µm, no more than about 500 nm, no more than about 200 nm, or even no more than about 50 nm). In certain such embodiments, dendritic metal structures have an average thickness of at least about 10 nm.

The areas of dendritic metal structures can range from several mm$^2$ to micro- or even nano-scale dimensions, depending on the method of fabrication and the application for which the structures are used. Dendritic metal structures can include one or a plurality of separately-nucleated branched structures, as described in more detail below.

Dendritic metal structures can be formed from a variety of metallic materials. Metals such as silver and copper can be particularly useful as they are highly mobile in a variety of materials and are readily reduced and oxidized so the electrochemical aspects of the fabrication process are relatively straightforward. Silver is especially appropriate for dendritic structure growth applications due to its nobility and ease of both reduction and oxidation. Accordingly, in certain embodiments, dendritic metal structures are formed from silver. Dendritic metal structures can also be formed, for example, from copper, from zinc, and/or from iron.

Dendritic metal structures can also be formed from multiple metals to make duplication of such structures more difficult.

Dendritic metal structures can be formed by electrodeposition in an ion conductor (i.e., an electrolyte) by generating an ion current in the ion conductor and using the flow of ions to build up the dendritic structure in or on the ion conductor via electrochemical processes. The ion conductor can be liquid, gel, or solid, or a combination thereof.

A sustained ion current will only flow through the ion conductor if there is a source of ions at one point and a sink of ions at another. The process of electrodeposition, in which metal cations in the electrolyte are reduced by electrons from a negative electrode (e.g., a cathode), is essentially an ion sink as ions are removed from the electrolyte to become atoms. However, in the absence of an ion source, the reduction of the ions at the cathode occurs at the expense of the electrolyte. The concentration of ions in the solid electrolyte therefore decreases during electrodeposition until the electrode potential equals the applied potential and reduction will cease.

It is therefore desirable in certain embodiments to have an oxidizable positive electrode (e.g., anode)—one which can supply ions into the electrolyte to maintain ion concentration and overall charge neutrality. In the case of a silver (or copper) ion-containing electrolyte, the oxidizable anode can be implemented merely as a solid silver (or copper) member, or a member formed from a compound or alloy containing free metal.

The anode will oxidize when a bias is applied if the oxidation potential of the metal is greater than that of the solid solution. Under steady state conditions, as current flows in the solution, the metal ions will be reduced at the cathode. For the case of silver, the electrode reactions are:

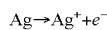  Anode:

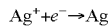  Cathode:

with the bias being supplied by an external power source.

The deposition of Ag metal at the cathode and partial dissolution of the Ag at the anode indicates that fabrication of the dendritic structure is analogous to the reduction-oxidation electrolysis of metal from an aqueous solution, except that when a solid electrolyte is used in fabrication (e.g., rather than a solution of ions), the anions are fixed in position. Accordingly, when a bias is applied across the electrodes, silver ions migrate toward the cathode under the driving force of the applied field and the concentration gradient. At the boundary layer between the electrolyte and the electrodes, a potential difference exists due to the transfer of charge and change of state associated with the electrode reactions. This potential difference, typically in the order of a few hundred millivolts, leads to polarization in the region close to the phase boundary, known as the double layer. Even though the voltage associated with the polarization is small, structures with a long, thin region of solid electrolyte between the electrodes typically require higher voltages to initiate electrodeposition as most of the applied voltage will be dropped across the high resistance electrolyte. For example, the polarization-resistance of a 10 μm$^2$ electrode will be around 10$^9$Ω, but if a 50 nm thick 100 Ω·cm Ag—Ge—Se electrolyte between anode and cathode is 10 μm wide and 100 μm long, the series resistance will be twice this value and so at least 0.75 V is typically used to generate a 0.25 V drop at the cathode to cause electrodeposition.

As in any plating operation, the ions nearest the electron-supplying cathode will theoretically be reduced first. However, in real-world fabrication processes in which the nanoscale roughness of the electrodes is significant and the fields are relatively high, statistical non-uniformities in the ion concentration and in the electrode topography can promote localized deposition or nucleation rather than blanket plating. Even if multiple nuclei are formed, the nuclei with the highest field and best ion supply will be favored for subsequent growth, extending out from the cathode as individual elongated metallic features. The deposition interface continually moves toward the anode, increasing the field and thereby speeding the overall growth rate of the electrodeposit. Without wishing to be bound by theory, it is believed that the addition of new atoms to the growing electrodeposit occurs through a diffusion-limited aggregation mechanism.

The electrodeposition of metal on the cathode does not mean that ions entering from the oxidizable anode have to travel the entire length of the structure to replace those that are reduced. For example, in solids, the ions move through the electrolyte by a coordinated motion in which the ion closest to the reduced ion will move to the vacated negative site on the hosting material and those upstream will do likewise, each filling the vacated site of the one downstream, until the last vacated space closest to the anode is filled by the incoming ion. So, in the initial stages of deposition, the electrodeposit is actually made up of reduced ions from the electrolyte itself but since each ion deposited on the growing electrodeposit corresponds to one that has been removed from the metal source, the net effect is a shift of mass from the anode toward the cathode. In general, the growth process in these structures is more complex than a simple plating operation as the deposition interface is moving toward the source of the ions. Since the electrodeposit is physically connected to the cathode, it can supply electrons for subsequent ion reduction, so the growing electrodeposit will harvest ions from the electrolyte, plating them onto its surface to extend itself outwards from the cathode. This has two consequences: the growth interface continually moves out to meet the ions, and the growth closes the gap between the electrodes thereby increasing the field. Both of these help to speed the overall growth rate of the deposit.

Without wishing to be bound by theory, in the most general case, it is believed that the process of deposit formation starts with the nucleation of the new metal atom phase on the cathode and the deposits develop with a structure that generally follows a Volmer-Weber 3-D island growth mechanism. The addition of new atoms to the growing deposit occurs due to a diffusion-limited aggregation (DLA) mechanism, as described for example in T. A. Witten and L. M. Sander, *Phys. Rev. Lett.* 47: 1400 (1981). In this growth process, an immobile "seed" is fixed on a plane in which particles are randomly moving. Particles that move close enough to the seed in order to be attracted to it attach and form the aggregate. When the aggregate consists of multiple particles, growth proceeds outwards and with greater speed as the new deposits extend to capture more moving particles. Thus, the branches of the core clusters grow faster than the interior regions. The precise morphology depends on parameter such as the potential difference and the concentration of ions in the electrolyte, as described for example in Y. Sawada, A. Dougherty, and J. P. Gollub, *Phys. Rev. Lett.* 56: 1260 (1986).

At low ion concentrations and low fields, the deposition process is determined by the (non-directional) diffusion of metal ions in the electrolyte and the resulting pattern is fractal in nature. For high ion concentrations and high fields as are common in the methods described herein, the moving ions have a strong directional component, and dendritic structure formation occurs. The dendritic structures have a branched morphology, but grow along a preferred axis largely defined by the applied electric field. As an example, FIG. 7 shows dendritic metal structures grown between parallel electrodes (i.e., an anode at the top of the figure and a cathode at the bottom of the figure).

Figure 4:
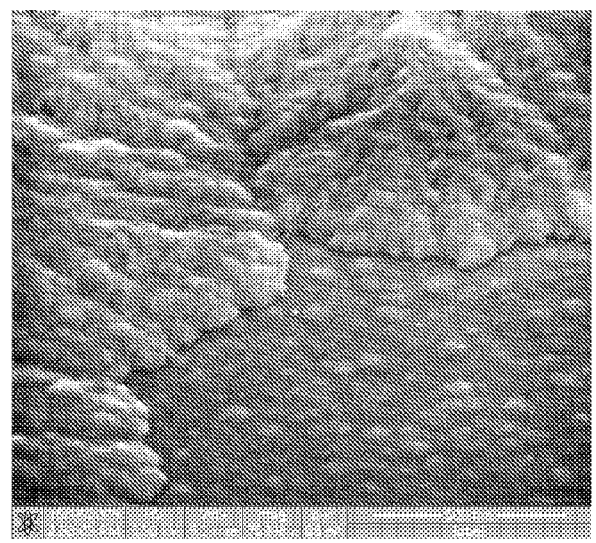
FIG. 4 is a scanning electron micrograph of the edge of a silver dendritic structure on a silver-doped chalcogenide glass.
Figure 7:
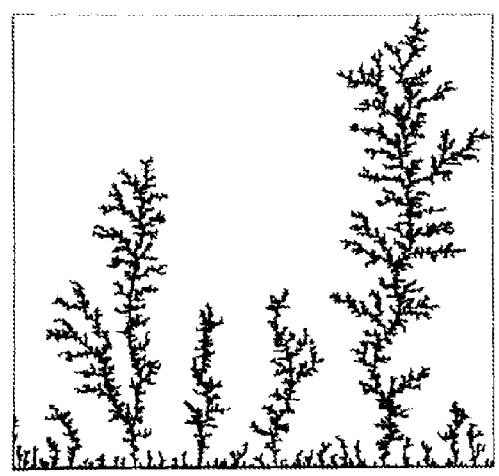
FIG. 7 is an image of dendritic metal structures grown between parallel electrodes.

The complexity of the dendritic form in two dimensions is evident from images such as shown in FIG. 7. The stochastic growth process ensures that the shape of every newly-grown dendritic structure is truly unique. It should be noted, however, that the growth process is generally three dimensional. When a dendritic structure forms inside a solid electrolyte, there are no restrictions on growth direction and the structure will typically branch out like a tree to fill a volume, but even when electrodeposition occurs on the surface of a solid ion conductor, there is still an "upward" component of growth, i.e., in a direction normal to the surface. This occurs because, in addition to the lateral growth across the surface, there is electrodeposition at the interface between the ion conductor and the metal dendrite. This basal deposition pushes the earlier-deposited material upwards, resulting in a nanoscale "mountainous" three-dimensional form. This form is shown in FIG. 4, which is a scanning electron micrograph of the edge of a silver dendritic structure on a silver-doped chalcogenide glass. The micro- and nano-scale facets of such 3-D features are once again formed via stochastic processes and introduce yet another layer of complexity (and randomness) to the overall structure.

In some embodiments, dendritic metal structures are formed by methods that include providing an ion conductor and two or more electrodes in contact with the ion conductor, and applying a bias voltage across the electrodes sufficient to grow the dendritic metal structure in or on the ion conductor. Methods for growing dendritic metal structures are described generally in U.S. Pat. No. 8,345,910, U.S. Patent Application Publication No. US 2011/0254117, and International Patent Application Publications Nos. WO 2012/065076 and WO 2012/065083.

The stochastic nature of the electrodeposition process leads to randomly-branched and randomly-faceted patterns each time a dendritic structure is grown on a new region of an ion conducting medium. As will be discussed subsequently, as a result of their random and unique nature, these dendritic structures can be used to generate unique identifiers that are useful in a variety of applications, including object identification and tracking, and data encryption. The methods and apparatus used to create these patterns is straightforward and the materials involved can be placed on a variety of substrates, including pliable and/or flexible materials. Examples of device formats and methods for generating dendritic structures are described subsequently in greater detail.

A wide variety of ion conductors can be used, for example, including solid films (e.g., oxides/chalcogenides), gels, and liquids. For certain applications, it can be desirable to use a solid ion conductor. Solid ion conductors are useful due to their mechanical and chemical stability which allows them to be used in the field with minimal encapsulation. Examples of solid ion conductors suitable for use in certain embodiments include "superionic" solid electrolytes (fast ion conductors) and/or other materials such as oxides which have suitable ion mobility.

Dendritic metal structures can be formed by deposition from a solid electrolyte. In certain embodiments, the solid electrolyte includes silver or copper ions, as such materials tend to have high ion mobility and can be less difficult to make than alkali metal solid electrolytes. Silver is also well-suited for electrode growth applications due to its mobility and ease of both reduction and oxidation. In some embodiments, copper-containing solid electrolytes can be used to form dendritic copper structures. For example, crystalline Ag halides, principally AgI, and silver chalcogenides, e.g., $Ag_2S$, $Ag_2Se$, and $Ag_2Te$, and their copper counterparts, can be used as solid electrolytes.

The layer of solid electrolyte can be, for example, a metal-containing chalcogenide glass (i.e., containing oxygen, sulfur, selenium and/or tellurium, although oxide glasses are often treated separately from the others in the literature). Chalcogenide glasses can be formed with a wide range of physical characteristics and can be made using a variety of techniques, such as physical vapor deposition, chemical vapor deposition, spin casting and melt quenching. The tellurides exhibit the most metallic character in their bonding and are the "weakest" glasses as they can crystallize very readily (hence their use in so-called phase change technologies such as re-writable CDs and DVDs) and the others exhibit an increasing glass transition temperature going further up Group VI of the periodic table, with oxides having the highest thermal stability. Stable binary glasses can, for example, include a Group IV or Group V element, such as germanium or arsenic, with a wide range of atomic ratios possible. The bandgaps of the chalcogenide glasses range from about 1-3 eV for telluride, selenide and sulfide glasses, to 5-10 eV for the oxide glasses. The non-oxide glasses are typically more flexible than oxide glasses, but more rigid than organic polymers; other physical properties follow the same trend. Such structural flexibility can result in the formation of voids through which ions can readily move from one equilibrium position to another. It can also allow chalcogenides glasses to be used with flexible substrates.

In some embodiments, a solid electrolyte formed of Ag-doped $Ge_{30}S_{70}$ is used for dendritic structure fabrication. In other embodiments, different materials can be used as the solid electrolyte. For example, silver- or copper-doped oxide glasses such as $SiO_2$ or transition metal oxides can be used in harsher operating environments. Such glasses can withstand higher processing temperatures, are more resistant to mechanical abrasion and chemical damage, and can provide higher transmission over the visible wavelength range than the higher chalcogenide glasses, but may provide slower dendritic structure growth due to lower ion mobility.

In certain embodiments, the chalcogenide glass is a germanium chalcogenide glass. Germanium chalcogenides have relatively low coulombic energies and relatively low activation energies for ion transport. Germanium chalcogenides are desirably glassy in nature; ion conductivity can often be greater in glassy materials than in the corresponding crystalline materials. Of course, crystalline or semi-crystalline materials can also be used. Germanium chalcogenides also tend to be relatively soft materials, making them suitable for use in certain methods in which the dendritic metal structure is formed, annealed or otherwise moved to the interface between the solid electrolyte and the electrically active structure, as described in more detail below. Germanium chalcogenides are also relatively flexible, and can be used on flexible devices. Accordingly, in some embodiments, devices that include the fabricated dendritic structure(s) are flexible. These mechanical properties of the germanium chalcogenides also help avoid cracking during thermal expansion and mechanical stress during use.

In certain embodiments, the solid electrolyte includes a solid solution of $As_xS_{1-x}$—Ag, $Ge_xSe_{1-x}$—Ag, $Ge_xS_{1-x}$—Ag, $As_xS_{1-x}$—Cu, $Ge_xSe_{1-x}$—Cu, $Ge_xS_{1-x}$—Cu, where x ranges from about 0.1 to about 0.5, other chalcogenide materials incorporating silver, copper, zinc, iron, combinations of these materials, Ag- and Cu-doped transition metal oxides, Ag- and Cu-doped silicon or germanium oxides, and the like. Photodissolution techniques can be used to load metal and/or metal ions into the solid electrolyte.

In some embodiments, the solid electrolyte includes a germanium-selenide glass with about 10 to about 50 atomic percent silver diffused in the glass (e.g., $Ag_{33}Ge_{20}Se_{47}$). Such materials can be formed using evaporation. Additional solid electrolyte materials and methods of forming them are discussed in U.S. Pat. No. 6,635,914, the entire contents of which are incorporated herein by reference.

As one example of the fabrication of the solid electrolyte, a 50 nm layer of $Ge_{0.20-0.40}Se_{0.80-0.60}$ is first deposited onto the surface of an electrically active structure, and the Ge—Se layer is covered with about 20 nm of silver. The silver is dissolved into the Ge—Se glass by exposing the silver to a light source having a wavelength of about 405 nm and a power density of about 5 mW/cm² for about ten minutes. Any excess silver is then removed using a $Fe(NO_3)_3$ solution. The solid electrolyte material is then patterned and etched using reactive ion etching (RIE) (e.g., $CF_4+O_2$) or wet etching (e.g., using NaOH:IPA:DI).

The addition of metallic elements such as silver or copper to a chalcogenide glass transforms it into an electrolyte, as silver and copper atoms can form mobile cations within the chalcogenide glass material. The ions are associated with the non-bridging chalcogen atoms but the bonds formed are relatively long. As with any coulombic attraction, the coulombic energy is proportional to the inverse of the cation-anion distance, so long bonds lead to reduced attractive forces between the charged species. The Ge-chalcogenide glasses are therefore among the electrolytes with the lowest coulombic energies. Thermal vibrations will allow partial dissociation, which results in a two-step process of defect formation followed by ion migration. The activation energy for this process strongly depends on the distance between the hopping cation and the anion located at the next nearest neighbor as well as the height of the intervening barrier. In addition to having low coulombic energies, the Ge-chalcogenides also have relatively low activation energies for ion transport. In this respect, the existence of channels due to the structure of the electrolyte is critical in the ion transport process. As an example of this effect, the $Ag^+$ conductivity in glassy $AgAsS_2$ is a factor of 100 larger than that in the crystalline counterpart due to the more "open" structure of the non-crystalline material.

The rigidity and bonding character of the oxide electrolytes means that their ion mobility is typically orders of magnitude lower than that of the Ge-chalcogenides but this also results in higher thermal, chemical, and mechanical stability. Increased stability suggests that Ag- or Cu-doped oxide glasses, such as $SiO_2$ or many of the transition metal oxides (e.g., $WO_3$), may be more suitable for harsher operating environments.

Other electrolyte materials can also be used in the fabrication methods disclosed herein. As suggested above, tellurides (e.g., doped germanium tellurides) can also be used in certain embodiments. In some embodiments, the solid electrolyte is a metal (e.g., copper) doped transition metal oxide.

The solid electrolyte material can have a thickness, for example, in a range of about 1 nm to about 1 μm. In certain embodiments, the layer of solid electrolyte has a thickness in the range of about 5 nm to about 100 nm. In some embodiments, the solid electrolyte has a thickness less than about 10 nm. For example, the solid electrolyte can have a thickness in the range of about 1 nm to about 10 nm. Where the solid electrolyte has low transmissivity at desired wavelengths, use of thinner solid electrolyte layers can improve overall transmission to the electrically-active layer. Such solid electrolyte layers need not be completely continuous on the micro- or nano-scale, as reduced sheet resistance can be achieved even with discontinuous dendritic structures. Moreover, thinner solid electrolyte layers can be more flexible, allowing for increased process and device flexibility. The sold ion conductor may be deposited on the substrate and retained after growth but may also be removed (i.e., before use) to ensure that the dendritic pattern cannot be altered unintentionally after fabrication.

Figure 9:
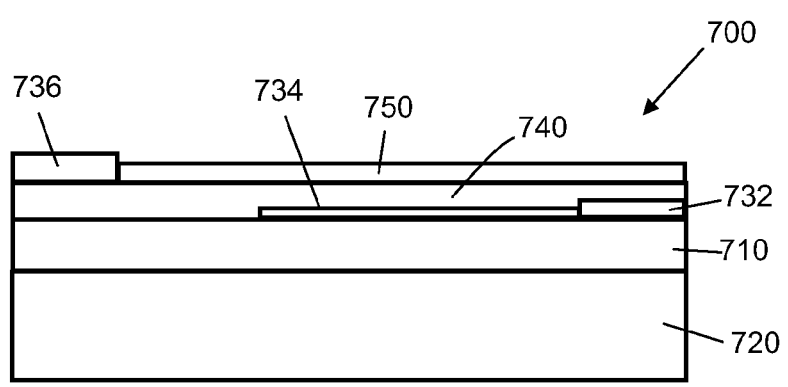
FIG. 9 is a schematic cross-sectional view of an electrical device that includes a dendritic metal structure.

In certain embodiments, the dendritic metal structure is disposed at the interface between a substrate and the electrolyte. For example, in the embodiment shown in the schematic side cross-sectional view of FIG. 9, electrical device 700 includes a cathode 732 disposed at the interface between the substrate 710 (on second substrate 720) and a solid electrolyte 740. A sacrificial anode 736 is positioned, for example, on top of the solid electrolyte. To prevent deposition on top of the solid electrolyte, a growth retarding layer 750 (e.g., a hard oxide layer chemically bound to or oxidatively grown from the top of the electrolyte layer) can be formed thereon. A dendritic metal structure 734 can be formed at the interface between the solid electrolyte and the electrically active structure by the application of a bias. In certain embodiments, the solid electrolyte is a relatively soft glass (e.g., a germanium chalcogenide glass such as silver-doped germanium arsenide or selenide), which can deform slightly to allow the dendritic metal structure to grow at the interface. In such embodiments, the dendritic metal structure can have good electrical contact with the electrically active structure, as there is substantially no solid electrolyte disposed therebetween.

In some embodiments, a liquid or gel electrolyte is used for dendritic structure fabrication. Liquid or gel electrolytes are easier to remove after growth and so may be more suitable for tags which only contain the dendritic structure but not the ion conductor in the field. If a liquids or gel electrolyte is to be a permanent (or semi-permanent) part of a fabricated device, the device may include additional layers to contain and protect the electrolyte, as will be discussed in greater detail subsequently.

Figure 5:
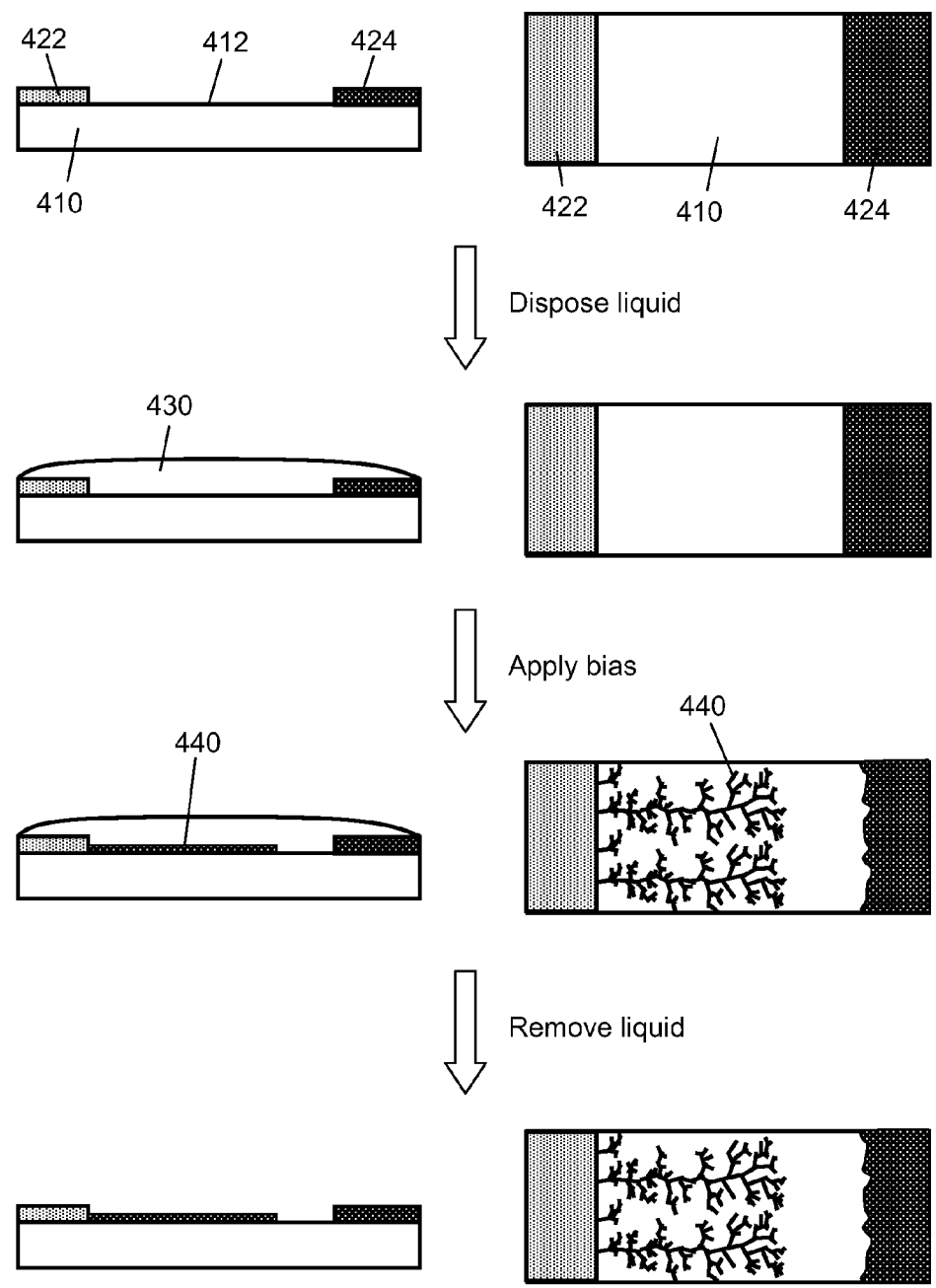
FIG. 5 is a schematic diagram showing one embodiment of a method for fabricating dendritic structures using a liquid or gel electrolyte.

FIG. 5 is a schematic diagram showing one embodiment of a method for fabricating dendritic structures using a liquid or gel electrolyte. The method is described herein with respect to a liquid electrolyte, but it should be appreciated that similar steps can be performed in conjunction with the use of a gel electrolyte. A substrate 410 having a surface 412 and a cathode 422 disposed thereon is provided. Also provided is an anode 424 formed from a metal; in this embodiment, the anode is also disposed on surface 412 of the substrate 410. A liquid 430 in which the metal of the anode is at least partially soluble (i.e., in some cationic form) is then disposed on the surface of the substrate. As shown in FIG. 5, in this embodiment, the liquid is simply disposed as a relatively thin film on the surface of the substrate, held in place by surface tension. The liquid is in electrical contact with both the anode 424 and the cathode 422. A bias voltage is applied across the cathode and the anode sufficient to grow the dendritic metal structure 440 extending from the cathode.

Anode 424 and cathode 422 are positioned relative to substrate 410 so that the dendritic metal structure can be electrodeposited. As the dendritic metal structure grows from the cathode, it is disposed on the on the surface of the substrate. The anode can be, for example, also disposed on the surface of the substrate. In such embodiments, the anode can help to direct the growth of the dendrite.

Figure 6:
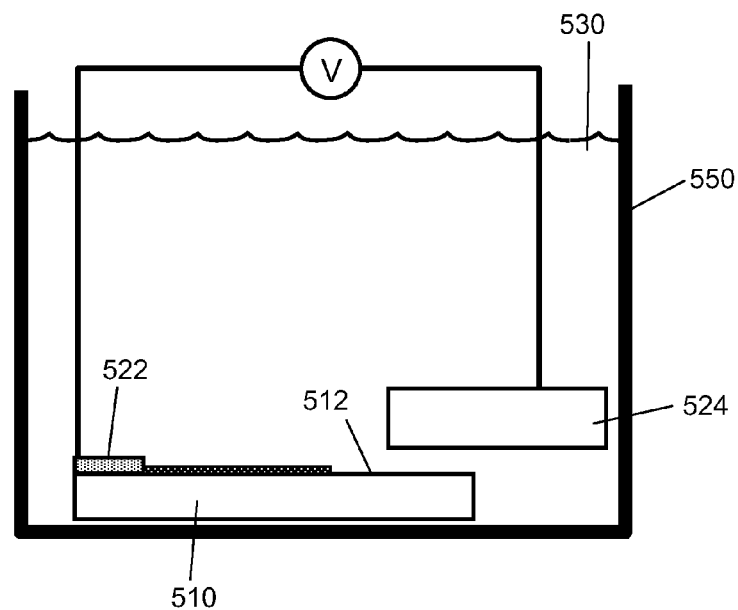
FIG. 6 is a schematic diagram showing another embodiment of a method for fabricating dendritic structures in which the anode is suspended above the surface of the substrate.

In other embodiments, the anode is not disposed on the substrate, but rather is in contact with the liquid. In such embodiments, the anode can, for example, be positioned within 1 cm, or even 5 mm of the surface. For example, FIG. 6 shows an embodiment in which the anode 524 is not disposed on the surface 512 of the substrate 510, but rather is suspended slightly above it. In this example, the liquid 530 is provided in a relatively large volume (i.e., in tank 550, in which the substrate bearing the cathode 522 and the anode are also disposed).

In certain embodiments, the anode can be placed (i.e., not deposited, such as in the form of a separate piece of metal) on the surface, then removed from the surface after deposition. In such embodiments, the anode can help to direct the directionality of growth, as described above, but can easily be removed.

In some embodiments, the anode and/or the cathode are placed on the surface of the substrate, but are not deposited thereon. For example, either the anode or the cathode or both can be placed or held in contact with the surface, so as to provide directionality to the growth of the dendritic metal structure, but can be easily removed once growth is complete.

In the process of electrodeposition, metal cations in the liquid are reduced at the cathode. To replace the metal cations in the liquid and allow for continued growth of the dendritic metal structure, the anode can include the same metal as the metal of the dendritic metal structure. As the dendritic metal structure grows by reduction at the cathode, the anode is concomitantly oxidized and dissolved into the liquid, resulting in a net mass transfer from the anode to the growing dendritic metal structure. For example, the anode can be formed of silver, a silver alloy, copper or a copper alloy. When the metal is provided by the anode, the liquid need not have any metal ions dissolved in it when it is disposed on the surface of the substrate. By physically changing the anode material during growth, or by providing an electrical bias in sequence to anodes of differing composition, it is possible to grow a dendritic structure that includes multiple metals either as a mixture or as segments in the structure. Fabricating dendritic structures in this manner makes subsequent replication of the structures (i.e., in a separate growth process) very difficult.

In some embodiments, the anode need not dissolve into the liquid, and the dendritic metal structures can be grown only from the metal initially dissolved into the liquid. For example, the anode can be relatively inert, as described below with respect to the cathode. In such embodiments, a relatively large volume of liquid can be provided in order to supply the desired amount of metal cations.

In certain embodiments, it is possible that the ion conductor is not actually a part of the device structure but is instead incorporated in a "writing" apparatus. In such embodiments, the dendritic structure can be physically transferred to the substrate or otherwise retained on the substrate after growth at the electrolyte-substrate interface. Similarly, in some embodiments, the electrodes are not part of the device and are instead mounted on the apparatus that applies the voltage to the ion conductor, thereby simplifying the device structure.

A transparent layer can be disposed over the dendritic metal structure to protect the electrodeposit from damage and help to prevent duplication of the structure by the use of impression/molding techniques. This layer can be engineered to allow the growth of the dendritic metal structure at the interface between the ion conductor and the protective film or it may be applied after growth. The transparent layer can be, for example, a layer of transparent polymer, or a layer of deposited material such as an oxide or nitride of silicon, titanium or germanium.

In general, substrates used to support the dendritic structure can be rigid or flexible, and a wide range of different materials having different mechanical properties can be used as substrates. Typically, appropriate ion conductors and electrode materials are selected based on the type of substrate that is used.

While a wide range of substrate materials, from insulators to conductors, may be used, in some embodiments an additional barrier layer may be used to prevent interaction between certain substrates and the ion conductor. Thus, the barrier layer is disposed between the substrate and the dendritic metal structure. Accordingly, the barrier layer can be between the ion conductor and the substrate during the electrodeposition operation.

Examples of suitable rigid (or semi-rigid) substrates include glass, hard plastic, metals, and semiconductors. Dendritic structures and devices that include such structures can be formed on integrated circuits (either on the chip itself or outside the package). Examples of flexible substrates include plastic sheets, metal foils, smooth paper, and coated close-weave fabrics.

Electrodes allow the voltage to be applied to the ion conductor to induce the flow of ions and activate the redox processes necessary for electrodeposition. The electrode materials may be deposited and patterned using a variety of methods including sputtering/etching, lift-off, shadow masking, screen printing, and standard (roll-to-roll) printing using conductive inks A wide range of viable electrode patterns is possible, including parallel, concentric, and multi-contact configurations.

In some embodiments, an anode and a cathode can be formed in contact with a solid electrolyte so that the dendritic metal structure can be electrodeposited. In the process of electrodeposition, metal cations in the electrolyte are reduced at the cathode. To replace the metal cations in the electrolyte and allow for continued growth of the dendritic metal structure, the anode can include the same metal as the metal of the dendritic metal structure and the solid electrolyte. As the dendritic metal structure grows by reduction at the cathode, the anode is concomitantly oxidized and dissolved into the solid electrolyte, resulting in a net mass transfer from the anode to the growing dendritic metal structure. For example, the anode can be formed of silver, a silver alloy, copper or a copper alloy. In other embodiments, the anode need not dissolve into the solid electrolyte, and the dendritic metal structures can be grown only from the metal initially dissolved into the solid electrolyte. For example, the anode can be relatively inert, as described below with respect to the cathode.

In certain embodiments, the cathode can be relatively inert and generally does not dissolve during the electrodeposition operation. For example, the cathode can be formed from an inert material such as aluminum, tungsten, nickel, molybdenum, platinum, gold, chromium, palladium, metal silicides, metal nitrides, and doped silicon. Of course, in other embodiments, the cathode need not be formed from an inert material. Indeed, when both electrodes are formed from the metal of the dendritic metal structures, either electrode can act as the anode from which the dendritic metal structures grow, providing additional process flexibility. Appropriate cathode materials can be selected based on the desired electrodeposition conditions. Various configurations of solid electrolyte and electrodes suitable for use in the methods disclosed herein are discussed, for example, in U.S. Pat. No. 6,635,914.

Contacts may be electrically coupled to the anode and/or cathode to facilitate forming electrical contact to the respective electrodes. Contacts can be formed of any conductive material and are preferably formed of a metal such as aluminum, aluminum alloys, tungsten, or copper. Generating the dendritic pattern typically involves the application of a small voltage (e.g., 0.1 to 10 V) to the electrodes in contact with the ion conducting film.

In some embodiments, the fractal dimension of the dendritic structure (i.e., its effective density) can be controlled via the magnitude of the applied voltage; however, the specific shape of the structure is typically random. In certain embodiments, multiple electrodes can be used to generate multiple dendritic forms to fabricate more complex shapes and produce large area dendritic structures. Use of a plurality of dendritic structures in various applications can provide for information redundancy, e.g., in the event that one of the dendritic structures is damaged.

Fabrication of dendritic structures can occur in a variety of contexts and applications. In some embodiments, dendritic structure growth can be performed during manufacture of a tag or device that uses or includes the dendritic structure. In certain embodiments, dendritic structure growth can be performed by user, e.g., during implementation of an application of dendritic structure. In this scenario, the ion conductor can be retained within the device. Conversely, when the dendritic structure is grown during device manufacturing, the fabrication process can be performed with a removable ion conductor. Moreover, provided the electrodes and the ion remain in place, additional growth of the dendritic structure can be performed following manufacture (e.g., during implementation of an application) to deliberately alter an existing dendritic structure.

In some embodiments, when a sufficient bias (e.g., a hundred mV or more) is applied across the anode and the cathode, metallic ions (e.g., $Ag^+$) to move from the anode (in this example, made of silver) and/or from metal dissolved in the solid electrolyte toward the cathode. Metallic ions at the cathode are reduced to form the dendritic metal structure, which grows and extends from the cathode out onto the solid electrolyte. The amount of electrodeposited material is determined by factors such as the applied voltage, the nature of the metal, the ion current magnitude and the time during which the current is allowed to flow. The dendritic metal structure can be deposited within or on the layer of solid electrolyte as an increased concentration of reduced metal compared to the concentration of such material in the bulk solid electrolyte material. Electrodeposits can have significant growth parallel to as well as normal to the solid electrolyte surface. The applied bias voltage can typically be, for example, in the range of 200 mV to 20 V, but other bias voltages can also be used.

Dendritic structure growth causes a mass transfer of metal from the solid electrolyte to the growing dendritic structure. For example, when the solid electrolyte has a metallic sheen due to excess metal, the growth process can transfer that metal to the dendritic structure, thereby increasing the apparent transmission of the solid electrolyte. When the solid electrolyte is not replenished with metal (e.g., by a sacrificial electrode), dendritic structure growth can significantly deplete the solid electrolyte of metal. Depletion of metal in the solid electrolyte can also occur when metal dissolves into the solid electrolyte from the anode much more slowly than it is plated onto the dendritic metal structures. In general, the bias voltage applied between the anode and cathode can be reversed to redissolve metal from the dendritic structures, thereby providing a method to more precisely tune the extent of dendritic structure growth.

In certain embodiments, the metal ions can, for example, be provided by the anode. For example, the anode can be formed from the metal dissolved in the solid electrolyte, and the metal of the anode dissolves into the solid electrolyte as the dendritic metal structure is grown.

Reading Dendritic Structures

Dendritic structures fabricated according to the methods disclosed herein can be used for a variety of applications. Many such applications involve "reading" the structures, which refers to a process of identifying features of the structures which uniquely identify the structures. In this manner, particular dendritic structures can be distinguished from other dendritic structures, allowing dendritic structures to be used in a variety of identification, tagging, tracking, and encoding applications. Because electrodeposited dendritic structures are fractal in nature and possess increasing complexity as the scale is decreased, the complexity of specific identifiers (e.g., numbers or codes) generated from dendritic structures depends on the resolution of the reading techniques.

This section of the disclosure will describe a variety of methods for reading dendritic structures. Certain methods will also be described in more detail later in the disclosure, in some cases in the context of specific applications.

In some embodiments, dendritic structures can be read optically. To implement optical reading, the pattern of the dendritic structure is interrogated using light, which can include wavelengths within and/or outside the visible spectrum, to produce a unique signal. For example, camera imaging may be used to obtain a detailed picture of the dendritic pattern. The acquired pattern can then be algorithmically analyzed to produce a unique code or identifier associated with the dendritic structure that acts as a type of "fingerprint". CCD (charge-coupled device) or CMOS (complementary metal-oxide semiconductor) cameras can be used to capture images that are analyzed to identify the dendritic structure.

Various levels of detail may result from optical imaging, depending on the magnification and numerical aperture of the lenses used. For example, using a lens with a high numerical aperture, the focal plane may be swept along the z-axis (i.e., the axis normal to the main surface over which the dendritic structure extends) to reveal fine topographical details of the dendritic pattern.

The nature of the light used also affects the type of information that is obtained from the reading process. Laser or bright incoherent illumination light typically produces a particular light scattering (diffuse) pattern via reflections from the various facets of the electrodeposit that can be analyzed either by a camera or an array of photodetectors. Infrared and ultraviolet illumination (down to the x-ray regime) can also be employed along with detector arrays that are sensitive to these wavelengths.

In certain embodiments, reading the dendritic structure is performed using X-ray fluorescence spectroscopy. X-ray fluorescence (XRF) is a non-destructive measurement method that can be used to characterize the composition of materials, based on the emission of characteristic "secondary" (or fluorescent) x-rays from a material that has been excited by bombardment with high-energy x-rays or gamma rays.

In some embodiments, dendritic structures can be read electrically. For example, electrical reading can be used when optical reading is impractical due to the structure being embedded within an object, or when a direct electrical readout is desirable (e.g., when the dendritic structure is used with an integrated circuit).

Capacitance reading can be performed using an two dimensional array of sensors which measure the local changes in electrical capacitance caused by the presence of the branches of the dendritic pattern and convert this to an electrical output (similar technology is also used for fingerprint recognition, using a capacitive "touch" sensor). The sensor array can, for example, be part of a reading device and/or can be permanently incorporated in the pattern generating device, the latter being particularly appropriate if the pattern generator is embedded in a product such as an integrated circuit. A schematic view of one embodiment of a general electrical reading apparatus is shown FIG. 8.

Figure 8:
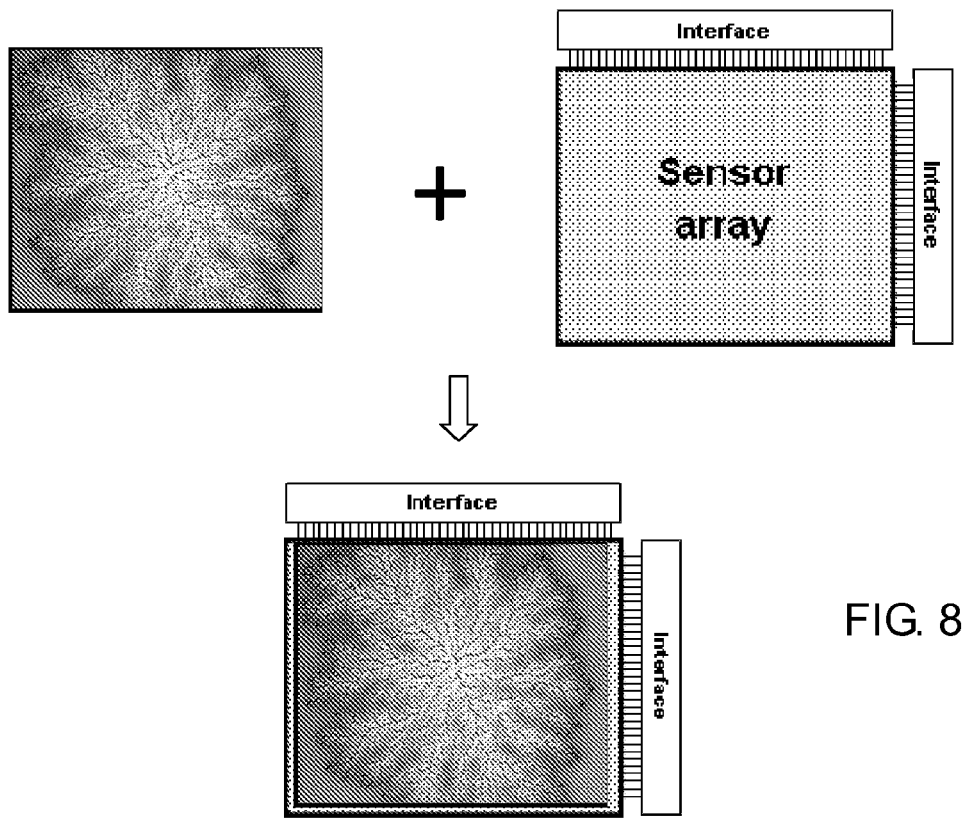
FIG. 8 is a schematic diagram of an embodiment of an electrical reading apparatus for dendritic structures.

Resistance or impedance can also be detected at points across a surface using the sensor array apparatus shown in FIG. 8. To measure resistance or impedance, an electrical contact is typically formed between the (conducting) dendritic structure and the sensor array to allow a small current to flow and thereby be detected by suitable sense amplifiers.

In some embodiments, frequency modulated radio frequency waves can also be used to read a conductive dendritic pattern. Different branch shapes will respond to different frequencies, producing distinctive peaks and troughs in the transmitted and reflected frequency spectra. Accordingly, the dendritic structure can be used in a radio frequency identification (RFID) scheme, for example, by being coupled to (e.g., directly or indirectly connected to) a suitable radio frequency antennae or other source of radio-frequency waves. Different dendritic structures will provide different resonant frequencies, and thus different reflected frequencies or electromagnetic signals. For example, methods for reading dendritic structures can include illuminating the dendritic structure with radio waves of different frequencies, and detecting one or more frequencies of the reflected radio waves. Methods for reading dendritic structures can also include, for example, direct coupling of an electromagnetic signal (e.g., at radio frequencies) into the dendritic structure, and measuring an electromagnetic signal from the dendritic structure at one or more radio frequencies to read the dendritic structure.

Other methods for reading dendritic structures can also be used. For example, ultrasonic techniques can be used to read the basic form of the dendritic structure, which may be sufficient for some applications. Moreover, a combination of multiple reading techniques (e.g., orthogonal multi-readout detection and identification) provides enhanced accuracy and additional security against the forgery of the dendritic structure.

The reading methods disclosed herein can be used in the identification and authentication of objects, the encryption of data, and to access encrypted data. For example, in some embodiments, methods for identifying an object that feature a dendritic structure include reading the dendritic structure to provide a signal, generating a unique identifier from the signal, and identifying the object using the unique identifier. The unique identifier can be, for example, a binary number, a text string, a set of analog values, or an image of the dendritic structure. In certain embodiments, the unique identifier can be generated by applying a numerical method (e.g., a mathematical algorithm) to the signal provided by the reading of the dendritic structure, and generating the unique identifier using the numerical method. The numerical method can be any suitable method that converts data from the reading process into a suitable unique identifier. In certain embodiments, the numerical method uses data from two independent reading techniques as described above. The numerical method can be performed by a computer (i.e., it can be a computer-implemented numerical method). Computer-implemented numerical methods can be performed by a suitably-programmed general purpose computer, for example, or by a microprocessor or other circuit specifically adapted to perform the method.

Currently, many objects are marked with an identifier such as a bar code, but these codes are the same for every copy of the object and so there is no way to track individual objects, unless a unique serial number is included on the object and also read. The unique dendritic structures disclosed herein can be fabricated and read using the techniques described herein, allowing the tracking of individual objects. Since there are a vast number of dendritic structures that can be produced using a few square millimeters of surface, it is feasible to inconspicuously tag every object to be tracked with its own dendritic structure-based identifier. The unique identifier generated from the dendritic structure can be stored in a database that links the information to details of the object's manufacture, specific characteristics, last known location, etc. Tracking objects in this manner is particularly important for high value/high demand items, and tracking also facilitates market analysis, servicing, recalls, etc.

In some embodiments, objects that include dendritic structures can be identified. Methods for performing such identification can include reading the dendritic structure to provide a signal, generating a unique identifier from the signal, and identifying the object using the unique identifier. Anti-counterfeiting measures for high value objects, including banknotes, high-end goods, and critical components, frequently involve the use of complex optical patterns or the addition of hard to copy images such as holograms. The main problem with these approaches is that the patterns are the same for multiple items and so there is an economic justification for the effort to reproduce them in large quantities (e.g., banknote forgery is extremely difficult and expensive but is clearly worthwhile if large numbers of counterfeit bills are involved). A unique and unobtrusive authentication code for each such item would help to prevent mass counterfeiting as not only would every item have to have a different code, making duplication more difficult, but the code could also be maintained in a database that would be used to confirm authenticity and also track the objects. For example, reading can be performed using a commonly available device such as a smartphone, connected via the Internet to a central database and having a custom attachment to allow high numerical aperture optical scanning or electric reading, so that a purchaser, retailer, or police officer could perform on-the-spot authentication.

The use of dendritic structures as unique "fingerprints" is most effective when dendritic structures are difficult to copy. As discussed previously, the dendritic structure fabrication methods disclosed herein not only produce unique, extremely small two-dimensional dendritic structures, but the structures also feature a complex surface with many facets on the electrodeposit. This 3D pattern is very difficult to reproduce accurately at reasonable cost and so the economic impetus for copying single dendritic structures is greatly reduced.

In some embodiments, a dendritic structure that includes multiple elements can be read using the above techniques and also analyzed using a materials analysis technique, such as x-ray fluorescence, to determine its composition. This "compositional coding" provides an extra layer of security as it makes counterfeiting the dendritic structure very difficult.

Anti-counterfeiting technologies in semiconductors currently involve custom silicon cores that are added to custom/application specific integrated circuits (ASICs) or placed in a system as a stand-alone chip. These cores are complicated, consume additional power, and add significant area/cost to the ASIC or circuit board. The dendritic structures described herein are simple passive devices that can be added to any circuit with little area penalty and operated at extremely low power to produce a unique digital identifier for each chip. In addition, the structures can be generated in-situ either during manufacture (testing/assembly) or by the user in the field and can also be regenerated multiple times in service. The fabrication methods also produce no external cues; embedded dendritic structures cannot be read by analyzing the chip power consumption or electromagnetic emissions. The dendritic structures can be destroyed by applying a burst of electrical energy from, for example, a battery or supercapacitor in the event that the system containing the structure is tampered with. This allows the structure and the information it represents to be kept out of the hands of those who should not have access to it.

Anti-counterfeiting measures for non-electronic objects, including banknotes and high-end goods, typically involve the use of complex optical patterns or the addition of hard to copy images such as holograms. The dendritic structure fabrication methods disclosed herein not only produce unique two-dimensional structures, but each structure also has a complex surface with many reflective facets on the electrodeposit. Fabricating a structure that would accurately reproduce the 3D light scattering pattern from a dendritic structure is very difficult, and therefore the use of dendritic structures as anti-counterfeiting measures has important advantages over conventional measures.

In some embodiments, data can be encrypted using information derived from dendritic structures. A dendritic structure can be read to provide a signal, and a unique identifier is generated from the signal and used as a key in the encryption of the data. Encryption of data for security during transmission or storage typically involves an encryption key which specifies how the message is to be encoded. An authorized party is able to decode the encrypted data using an algorithm that requires a decryption key that eavesdroppers do not have access to. Conventional encryption schemes typically use a key-generation algorithm to randomly produce keys. True random number generation is generally difficult and typically involves complex algorithms. The simplicity of the fabrication methods disclosed herein and the random resulting dendritic structures—with only voltage and time as inputs to the fabrication process—is a significant advantage over current methods of random number generation. Since the dendritic structure and therefore the numerical key can be generated inside an integrated circuit during or after manufacture, the use of dendritic structures for data encryption can be simpler and more secure than other key generation methods. In certain embodiments, the key generator can also be used to provide a digital signature for authentication of information.

Certain features and aspects of particular applications of the dendritic structures disclosed herein have been described above. These and other applications will be described in greater detail in subsequent sections of this disclosure.

The fabrication methods disclosed herein typically yield, in a straightforward manner, a random identifier (e.g., dendritic structure) via the application of a small voltage to a simple fabrication apparatus. Existing technologies typically either involve complex electronics and algorithms to produce unique and/or random numbers or patterns. Both the apparatus and the method of generating the dendritic structures are simple and can be performed at low cost. The power consumption in programming and reading the fabricated structures is also very modest.

The following describes one example of fabrication of a dendritic metal structure. On a layer of perylene, $Ge_{30}Se_{70}$ base glass (2400 Å thick) and silver layers (800 Å thick) were thermally evaporated and patterned on the diaphragm. The ratio of $Ge_{30}Se_{70}$ to Ag was approximately 3:1. Immediately after the deposition, photo-dissolution was performed using a 15 min UV exposure to diffuse silver into the $Ge_{30}Se_{70}$ layer to form the solid electrolyte. The anode (silver) and cathode (nickel) were separately evaporated and patterned on the diaphragm. A voltage bias was then applied across the anode and the cathode to grow a dendritic metal structure.

As another fabrication example, a 50 nm layer of $Ge_{0.20-0.40}Se_{0.80-060}$ was first deposited onto the surface of a polysilicon material, and the Ge—Se layer was covered with about 20 nm of silver. The silver was dissolved into the Ge—Se glass by exposing the silver to a light source having a wavelength of about 405 nm and a power density of about 5 mW/cm$^2$ for about ten minutes. Any excess silver was then removed using a $Fe(NO_3)_3$ solution. The solid electrolyte material was then patterned and etched to provide a desired shape.

A DC bias from 3 to 10 V was applied to electrochemically grow a dendritic silver structure extending out from the tip of the cathode, which is shown in FIG. 2. FIG. 3 shows a SEM micrograph of the electrodeposited dendritic silver structure. A VEECO NT9800 optical profilometer was used to measure the optical profile in FIG. 3, which shows that the dendritic silver structures had a height on the order of 90 nm.

Figure 10A:
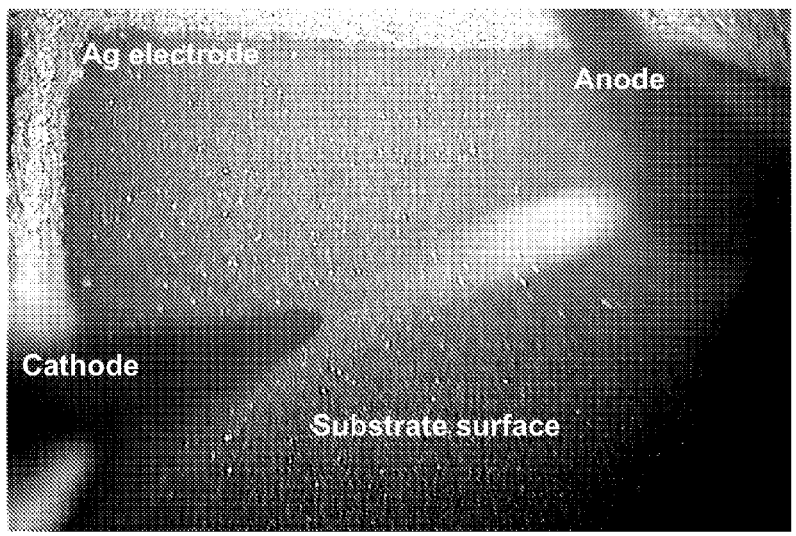
FIG. 10A is an image showing an anode and cathode disposed on the surface of a solar cell.
Figure 10B:
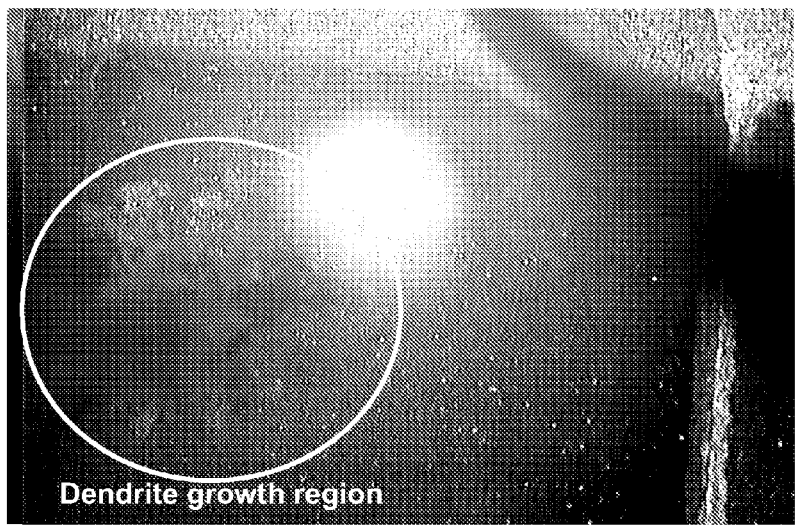
FIG. 10B is an image showing dendritic structures fabricated on the surface of the solar cell of FIG. 10A.

A further fabrication example is shown in FIGS. 10A and 10B. A cathode and a silver anode were deposited on the surface of a solar cell, and a layer of water was disposed thereon, as shown in the image of FIG. 10A. Dendritic structures were fabricated by applying a 20 V bias across the electrodes for 10 minutes. The dendritic structures are shown in the image of FIG. 10B. Dendritic structure growth was also observed on $SiO_2$ layers, at an applied bias voltage of 5 V for 10 minutes.

Volume Fabrication of Dendritic Structures

As discussed above in connection with FIG. 1, the anode(s) used in the fabrication of dendritic structures is/are typically formed from a metal such as copper, silver, or an alloy of copper and/or silver. The cathode(s) is/are typically formed from any one or more of a variety of electrically conductive materials, such as aluminum, tungsten, nickel, molybdenum, platinum, gold, chromium, palladium, metal silicides, metal nitrides, and/or doped silicon. An electrolyte in the form of a liquid can be deposited atop a substrate so that both the cathode and the anode are positioned within the volume of liquid. The liquid can include, for example, water, or another liquid in which metal cations are soluble. More generally, the electrolyte can include a variety of substances, including gels and solid films, in which metal cations are labile.

The cathode and anode are in electrical contact with the liquid by virtue of their positions within the liquid. Accordingly, when an electrical potential difference is applied between the cathode and the anode, a dendritic structure begins to grow in a general direction from the cathode to the anode. The dendritic structure is generally formed from the metal (or one of the metals) that form(s) the anode. During deposition of the dendritic structure, metal cations in the electrolyte are reduced at the cathode, and extend the dendritic structure in the direction of the anode. In some embodiments, metal atoms of the anode are oxidized to form cations during deposition of the dendritic structure. The cations dissolve in the electrolyte (e.g., a liquid) to replace the reduced cations that form the dendritic structure. In certain embodiments, the anode is not oxidized, and the dendritic structure is formed only from metal cations dissolved in the liquid when the liquid is deposited on the substrate.

The morphology of a particular dendritic structure will generally depend upon a number of factors, including the geometry of the cathode and anode, the metal cations that form the dendritic structure, the potential difference applied between the cathode and anode, the ionic current between the cathode and anode, the nature of the electrolyte acting as the ion transport medium, and the deposition time. In general, dendritic structures can be formed from a variety of metals including, but not limited to, silver, copper, zinc, gold, iron, tin, and mixtures thereof.

The fabrication methods described so far can readily be used to fabricate a variety of dendritic structures. However, use of dendritic structures for large volume commercial applications and transactions requires that the structures be fabricated in large numbers. The methods disclosed to this point are suitable for relatively low-volume fabrication of dendritic structures. In this section, additional methods are disclosed for fabricating larger numbers of dendritic structures.

Figure 11A:
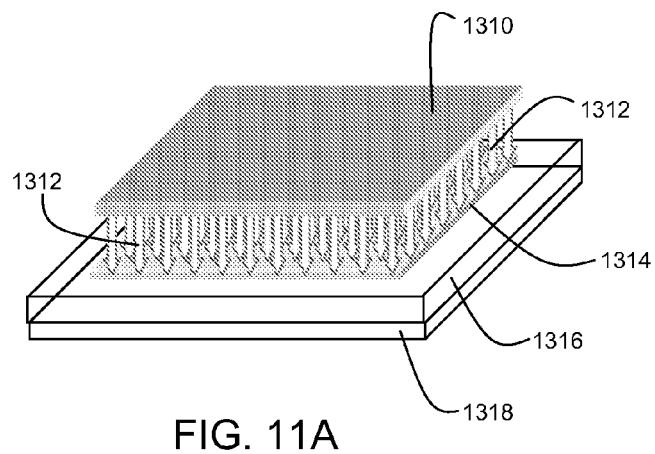
FIGS. 11A and 11B are schematic diagrams of a cathode probe array that is used to fabricate dendritic structures.
Figure 11B:
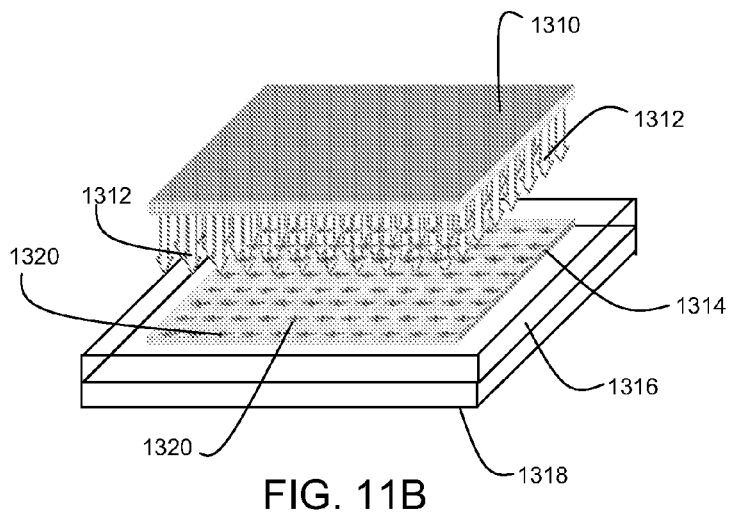

FIGS. 11A and 11B illustrate schematically a batch fabrication method for forming dendritic structures on a substrate. In FIG. 11A, a cathode 1310 that includes a plurality of cathode probes 1312 arranged in an array structure is positioned in contact with a substrate 1314 immersed in an electrolyte bath 1316. Positioned on the opposite side of substrate 1314 from cathode 1310 is an anode 1318.

With cathode 1310 and anode 1318 positioned as shown in FIG. 11A, an electrical potential difference is applied between the cathode and anode. As a result of the potential difference, metal cations dissolved in electrolyte bath 1316 are reduced at the tips of each of cathode probes 1312 where the tips contact substrate 1314. At the position of each probe tip on substrate 1314, a dendritic structure grows radially outward in the plane of substrate 1314. In this manner, an array of radial dendritic structures is formed on the surface of substrate 1314, where the positions of the dendritic structures match the positions of the tips of cathode probes 1312 in contact with substrate 1314. After a selected time interval has elapsed during which the potential difference is applied between cathode 1310 and anode 1318, the applied potential difference is removed and cathode 1310 is lifted relative to substrate 1314, yielding a substrate with an array of dendritic structures 1320 formed thereon, as shown in FIG. 11B.

In general, cathode 1310 and cathode probes 1312 are formed from a relatively inert, conductive material. In some embodiments, for example, cathode 1310 and/or cathode probes 1312 can be formed from one or more metals. In certain embodiments, cathode 1310 and/or cathode probes 1312 can be formed from one or more semiconductor or ceramic materials. Examples of materials that can be used to form cathode 1310 and/or cathode probes 1312 include, but are not limited to, aluminum, tungsten, nickel, molybdenum, platinum, gold, chromium, palladium, metal silicides, metal nitrides, and/or doped silicon.

Cathode probes 1312 are typically extended structures arrayed in a pattern in cathode 1310. In some embodiments, the shapes of cathode probes 1312 can influence the geometrical properties of dendritic structures 1320 that are deposited from the tips of the probes, due to the manner in which the geometrical shapes of cathode probes 1312 influence the rate of reduction of metal cations at the probe tips. In some embodiments, for example, cathode probes 1312 are needle-like in shape (e.g., the cross-sectional area of probes 1312 is approximately constant along their width). In certain embodiments, cathode probes 1312 are conical in shape, with a cross-sectional area that varies along their length. In general, however, cathode probes 1312 have a relatively large aspect ratio, which is defined herein the ratio of the length of a probe (e.g., measured in a direction parallel to a central axis of the probe) to its maximum cross-sectional area. For example, the average aspect ratio for cathode probes 312 in cathode 310 can be 2:1 or more (e.g., 3:1 or more, 4:1 or more, 5:1 or more, 7:1 or more, 10:1 or more, 15:1 or more).

Although cathode probes 1312 are shown as forming a square or rectangular array in cathode 1310, more generally, cathode probes 1312 can be positioned in any regular or irregular geometry in cathode 1310. In some embodiments, for example, cathode probes 1312 can be positioned to form a hexagonal array. In certain embodiments, cathode probes 1312 can be positioned to form a circular array and/or a radial array. More complex patterns of cathode probes 1312 (e.g., patterns featuring two or more different arrays, and/or patterns with different spacings between cathode probes 1312 in different rows, columns, or portions of the pattern) can also be used. In general, different patterns can be used according to the particular morphology of the dendritic structures that are deposited. For example, for dendritic structures that exhibit asymmetrical growth patterns, cathode probes 1312 arranged so that spacings between the probes are not uniform in all directions can be used.

Figure 39:
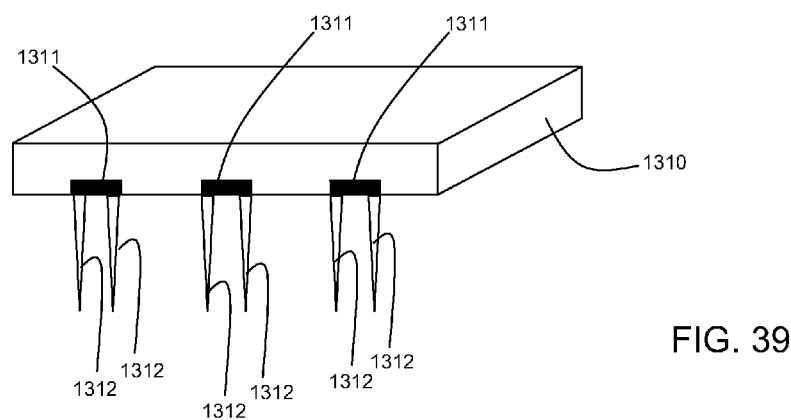
FIG. 39 is a schematic diagram of a cathode with a plurality of conducting tracks that are connected to a subset of the cathode's probes.

Various methods can be used to fabricate an array of cathode probes 1312. In some embodiments, a probe array can be formed by attaching adjustable rigid or spring-loaded probes to a rigid conducting base plate so that all of the probes are electrically connected, forming a common cathode. In certain embodiments, groups of one or more probes can be connected to individual conducting tracks on a base plate. FIG. 39 shows an embodiment of a cathode 1310 that includes a plurality of conducting tracks 1311, each of which is electrically isolated from the other conducting tracks. Conducting probes 1312 are each connected to one of the conducting tracks. Individual electrical potentials can be applied to each of the conducting tracks 1311. For example, different potentials can be applied to some of tracks 1311 to ensure that uniform growth of dendritic structures occurs across cathode 1310.

In the methods disclosed above, a variety of different materials can be used to form substrate 1314. Typically, substrate 1314 is formed of a material that is sufficiently rigid mechanically to support dendritic structures 1320, but is also sufficiently compliant so that it can be processed later to separate individual dendritic structures. In some embodiments, for example, substrate 1314 is formed of one or more plastics, such as polyethylene (e.g., polyethylene terephthalate, PET), polypropylene, polyester, polystyrene, polyamide, polyolefin, acetate, acrylate, vinyl, polyester, Mylar®, Teflon®, and/or Teslin®. In certain embodiments, substrate 1314 is formed of paper-based materials, such as plasticized paper.

Anode 1318 generally includes the material(s) from which dendritic structures 1320 are formed. For example, in some embodiments, dendritic structures 1320 are formed from (or include) silver, and anode 1318 is likewise formed from (or includes) silver. In certain embodiments, dendritic structures 1320 are formed from (or include) copper, and anode 1318 is likewise formed from (or includes) copper. More generally, dendritic structures 1320 can be formed from one or more metals, and anode 1318 can include some or all of the one or more metals, and can also include additional materials, such as additional metals, as well.

Anode 1318 can include a variety of other materials. In some embodiments, for example, anode 1318 can include one or more relatively inert materials to reduce or prevent undesirable side-reactions (e.g., sulfide formation) from occurring at the anode and/or to promote uniform erosion of anode 1318 during oxidation of the active metal in the anode. For example, metals such as palladium can be included in anode 1318.

Anode 1318 can generally have a variety of shapes. Typically, anode 1318 is shaped to ensure that the electric field across substrate 1314 is spatially uniform to ensure uniform growth of dendritic structures on the substrate.

Electrolyte bath 1316 generally includes dissolved ions of the one or more materials from which dendritic structures 1320 are formed. For example, where dendritic structures 1320 are formed from one or more metals, electrolyte bath 1316 includes dissolved cations of the one or more metals. As explained above, when a potential difference is applied between cathode 1310 and anode 1318, cations dissolved in electrolyte bath 1316 are reduced at the tips of cathode probes 1312, resulting in the growth of dendritic structures 1320 on substrate 1314 at positions where the tips of cathode probes 1312 contact substrate 1314. Atoms of anode 1318 are oxidized by the applied potential difference to form cations, which then dissolve in electrolyte bath 1316, replenishing the cations that were reduced.

In addition to cations of the materials that form dendritic structures 1320, electrolyte bath 1316 includes one or more solvents. The solvents can be in liquid form, such as water and/or other polar liquids. In some embodiments, the solvents can be in the form of gels, such as water-based gels and/or other gels. Examples of gels that can be used in electrolyte bath 1316 to solvate cations for forming dendritic structures 1320 include, but are not limited to, silver nitrate or copper sulfate in cellulose, polymethylmethacrylate, polyacrylamide, and/or polyvinylidene fluoride. Solid electrolytes that can be used in thin film form include, but are not limited to, crystalline silver halides (e.g., AgI) and silver chalcogenides (e.g., $Ag_2S$, $Ag_2Se$, and $Ag_2Te$), and their copper counterparts, and $As_xS_{1-x}$—Ag, $Ge_xSe_{1-x}$—Ag, $Ge_xS_{1-x}$—Ag, $As_xS_{1-x}$—Cu, $Ge_xSe_{1-x}$—Cu, $Ge_xS_{1-x}$—Cu, where x ranges from about 0.1 to about 0.5, other chalcogenide materials incorporating silver, copper, zinc, iron, and combinations of these materials, Ag- and Cu-doped transition metal oxides, and Ag- and Cu-doped silicon or germanium oxides.

As discussed above, an electrical potential is applied between cathode 1310 and anode 1318 to grow dendritic structures on substrate 1314. Voltages that are applied are typically 100 mV or more (e.g., 200 mV or more, 300 mV or more, 500 mV or more, 700 mV or more, 900 mV or more) and/or 100 V or less (e.g., 80 V or less, 60 V or less, 40 V or less, 30 V or less, 20 V or less, 10 V or less). The magnitude of the applied electrical potential is generally selected to control the growth rate and/or growth morphology of the dendritic structures on substrate 1314. The growth duration typically ranges from 1 s or more (e.g., 2 s or more, 4 s or more, 6 s or more, 8 s or more) to 60 s or less (e.g., 50 s or less, 40 s or less, 30 s or less, 20 s or less).

Dendritic structures 1320 used for the applications that will be discussed subsequently are typically relatively small. For example, dendritic structures 1320 can have a maximum dimension measured in the plane of substrate 1314 of about 2 mm or less. Accordingly, dendritic structures 1320 are relatively delicate. If the structures deposited adhere to the tips of cathode probes 1312 when the probes are lifted from the surface of substrate 1314, dendritic structures 1320 can be significantly disrupted, and may even be destroyed.

To avoid damaging dendritic structures 1320 in this manner, various methods can be used to reduce the likelihood that dendritic structures 1320 will adhere to the tips of cathode probes 1312. In some embodiments, for example, the surfaces of cathode probes 1312 can be coated in a material that reduces such adherence. Examples of materials that can be used for this purpose include, but are not limited to, conductive liquids such as various oils, and conducting solids such as graphite.

Figure 12:
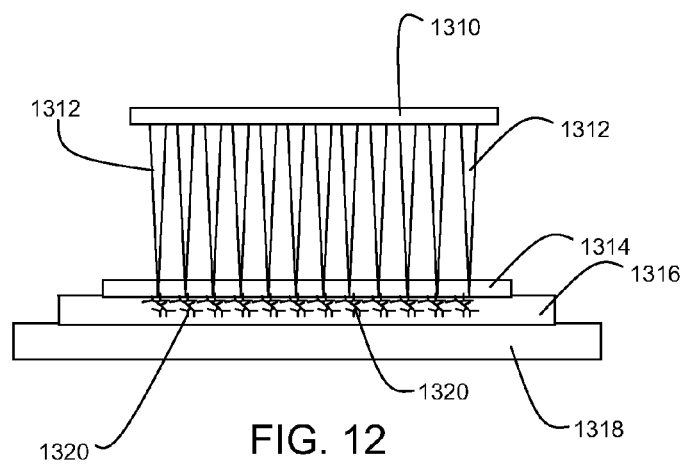
FIG. 12 is a schematic diagram of showing penetration of a cathode probe array through a substrate material.

In addition, or as an alternative, in some embodiments, dendritic structures 1320 can be deposited on the side of substrate 1314 opposite to cathode 1310. FIG. 12 shows a schematic diagram illustrating such methods. In FIG. 12, a cathode 1310 that includes a plurality of cathode probes 1312 is positioned so that the tips of cathode probes 1312 pierce substrate 1314, which is positioned in an electrolyte bath 1316 such that the upper surface of substrate 1314 (i.e., the surface closest to cathode 1310) does not contact the electrolyte bath. Anode 1318 is also in contact with electrolyte bath 1316.

As shown in FIG. 12, the tips of cathode probes 1312 extend through substrate 1314 to the underside of the substrate (i.e., the side of substrate 1314 closest to anode 1318, and opposite to the side on which cathode 1310 is nominally positioned. When a potential difference is applied between cathode 1310 and anode 1318, electrodeposition of dendritic structures 1320 occurs at the tips of cathode probes 1312, as described above. However, because the tips of cathode probes 1312 are positioned on the underside surface of substrate 1314 as shown in FIG. 12, dendritic structures 1320 are electrodeposited on the underside surface of the substrate. After deposition is complete (i.e., after the deposition time has elapsed), cathode 1310 is lifted away from substrate 1314, withdrawing cathode probes 1312 from the substrate. As cathode probes 1312 are lifted, however, dendritic structures 1320 remain positioned on the underside surface of substrate 1314. Using this technique, damage to the fragile dendritic structures can be significantly mitigated or eliminated.

In FIGS. 11A and 11B, an array of cathode probes 1312 is arranged on cathode 1310 to form a corresponding array of radial dendritic structures 1320 on the surface of substrate 1314. More generally, however, the cathode probes 1312 can be positioned to fabricate large numbers of dendritic structures 1320 with a variety of shapes.

Figure 13:
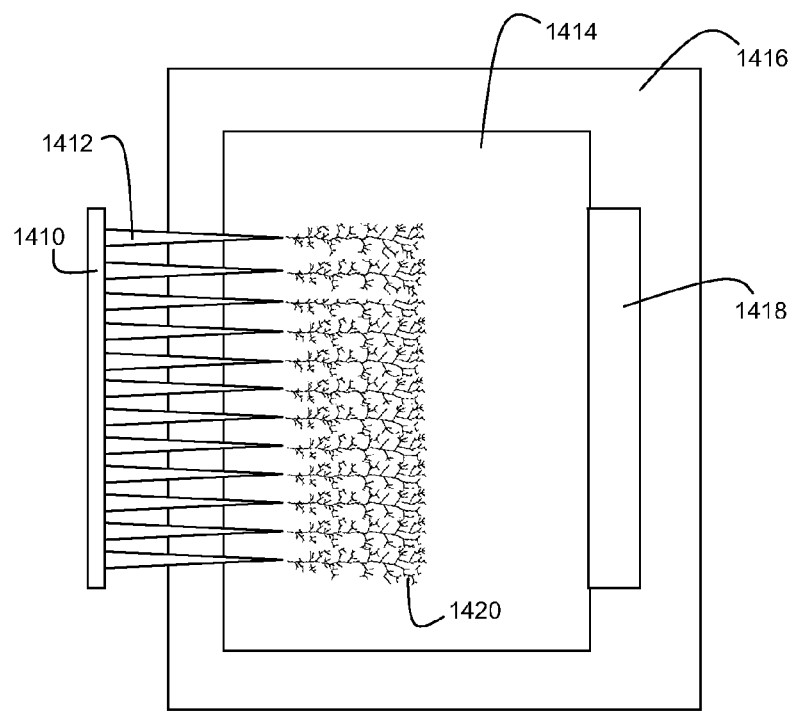
FIG. 13 is a schematic diagram of a cathode probe array that is used to fabricate a linear array of dendritic structures.

For example, in some embodiments, the cathode can include a plurality of cathode probes arranged to fabricate parallel dendritic structures. FIG. 13 is a schematic diagram illustrating a method for forming dendritic structures that extend in approximately parallel directions with respect to one another. In FIG. 13, a cathode 1410 featuring a one-dimensional array of cathode probes 1412 is positioned within an electrolyte bath 1416 so that the cathode probes are in contact with a substrate 1414. Also positioned within bath 1416 is an anode 1418. When an electrical potential difference is applied between cathode 1410 and anode 1418, dendritic structures 1420 grow approximately along the direction indicated by arrow 1422. In general, in the method shown in FIG. 13, the features of cathode 1410, cathode probes 1412, substrate 1414, electrolyte bath 1416, and anode 1418 are similar to the features disclosed in connection with the corresponding components shown in FIGS. 11A and 11B.

Figure 40:
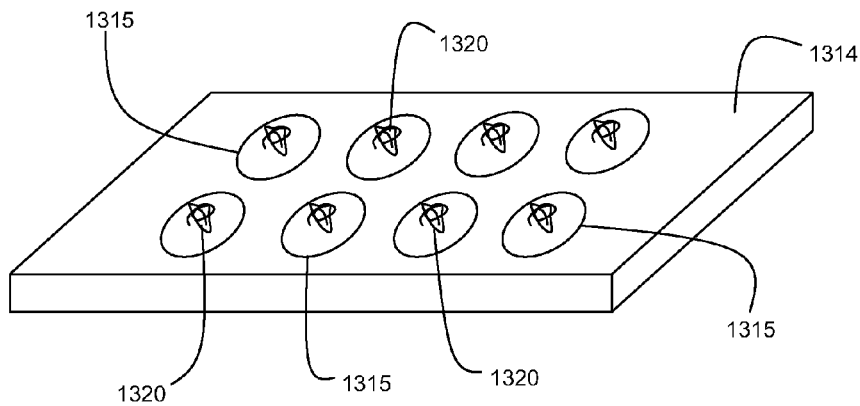
FIG. 40 is a schematic diagram of a substrate that includes a plurality of raised structures and dendritic structures grown on the raised structures.

In some embodiments, dendritic structures are fabricated on non-planar substrates using the methods discussed above. FIG. 40 shows an embodiment of a substrate 1314 that includes a plurality of raised structures 1315. Dendritic structures 1320 are grown on the surfaces of raised structures 1315. In some embodiments, a single dendritic structure 1320 is grown on each raised structure 1315. Alternatively, in certain embodiments, multiple dendritic structures 1320 can be grown on each raised structure 1315, so that the height of dendritic structures 1320 above the planar portion of substrate 1314 will, in general, vary.

A variety of different patterned substrates 1314 can be used to support dendritic structures 1320. In addition to patterns of raised structures 1315 as shown in FIG. 40, substrates having surfaces that are scored, corrugated, curved, undulating, and include various combinations of non-planar features can function as growth surfaces for dendritic structures. In addition, dendritic structures 1320 can be grown on a variety of substrates with curved surfaces. For example, dendritic structures 1320 can be grown on a cylindrical or spherical surface of a substrate 1314.

Using a non-planar substrate 1314 can provide a number of advantages. For example, when dendritic structures 1320 are grown on a non-planar substrate 1314, the dendritic structures conform—at least to some extent—to the shape of the substrate. As a result, duplicating particular dendritic structures is made more difficult. Further, certain printing methods are not capable of producing dendritic structures on a non-planar substrate, thus foreclosing these methods from replicating the dendritic structures.

Further, in some embodiments, the non-planar features of substrate 1314 (e.g., raised structures 1315 in FIG. 40) can be used to prevent tampering with the dendritic structures. For example, raised structures 1315 can be filled with a mildly corrosive material (e.g., a mild acid or base). If tampering with the fabricated dendritic structures 1320 occurs, the corrosive material is liberated from raised structures 1315 and erodes dendritic structures 1320, rendering them unsuitable for authentication or other applications. In this manner, improper transfer of the dendritic structures from one article to another can be prevented. Additional methods for preventing tampering with dendritic structures will be discussed subsequently.

In addition, in certain embodiments, raised structures 1315 filled with a mildly corrosive material can be used to fabricate time-limited (e.g., expiring) dendritic structures. In particular, raised structures 1315 can be fabricated from a material that is at least partially porous to, or eroded by, the corrosive material so that over time, the corrosive material penetrates through structures 1315 and erodes dendritic structures 1320. Once eroded, dendritic structures cannot be used for authentication or other applications. In this manner, time-limited, or expiring, dendritic structures (e.g., where the time limit is determined by the rate at which dendritic structures 1320 are eroded by the corrosive material in raised structures 1315) can be fabricated.

The foregoing methods for large-volume fabrication of dendritic structures may collectively be thought of as batch methods, as they involve forming multiple dendritic structures on a common substrate during a common growth period. Other methods can also be used for large-volume fabrication of dendritic structures. For example, a variety of continuous, roll-to-roll methods can also be used.

Figure 14:
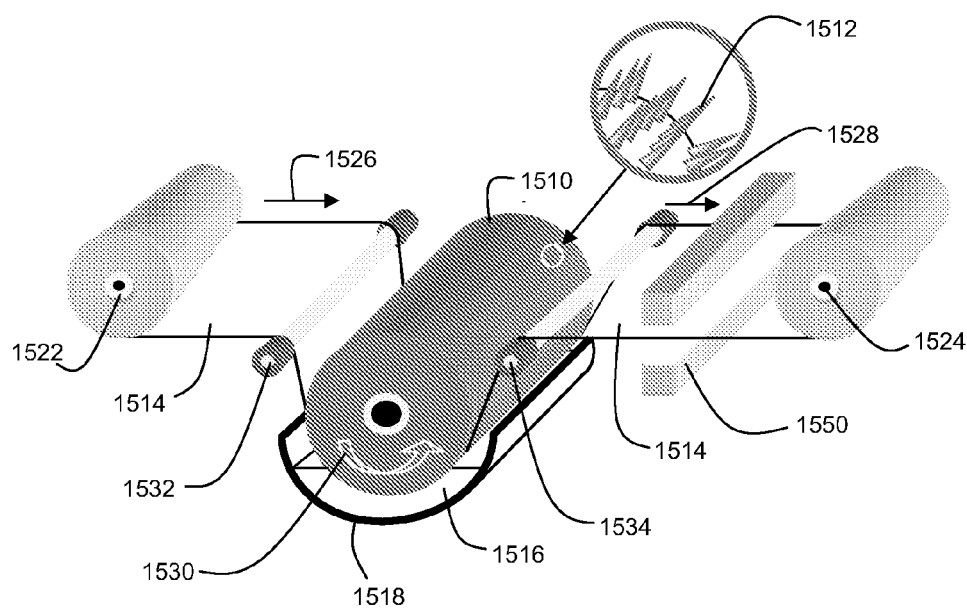
FIG. 14 is a schematic diagram of a cathode probe array that is used to fabricate dendritic structures on a continuous substrate.

FIG. 14 is a schematic diagram illustrating an example of a method for continuous fabrication of dendritic structures. In FIG. 14, substrate 1514 is provided in spool form, mounted on substrate feed roller 1522. Also shown in FIG. 14 are cathode 1510, implemented as a roller that rotates in the direction shown by arrow 1530. Cathode 1510 includes a plurality of cathode probes 1512 that extend radially outward from the cathode. Cathode 1510 is positioned partially immersed in electrolyte bath 1516. Anode 1518 forms a vessel that contacts and contains electrolyte bath 1516.

Substrate 1514 is threaded over guide roller 1532, around cathode roller 1510 and through electrolyte bath 1516, over guide roller 1534, and onto product roller 1524. To fabricate dendritic structures on substrate 1514, the substrate is translated in the direction shown by arrows 1526 and 1528, e.g., by activating product roller 1524 to draw substrate 1514 from substrate feed roller 1522 over guide roller 1532, around cathode 1510 and through electrolytic bath 1516, over guide roller 1534, and onto product roller 1524. When each portion of substrate 1514 passes through electrolyte bath 1516, a potential difference is applied between cathode 1510 and anode 1518. Cathode probes 1512 contact the surface of substrate 1514. Dendritic structures grow radially on the surface of substrate 1514 at positions where cathode probes 1512 contact the substrate. In general, the features associated with the cathodes, anodes, substrates, and electrolyte baths described above also apply to the components shown in FIG. 14.

In FIG. 14, substrate 1514 is typically fed continuously through electrolyte bath 1516. However, in some embodiments, substrate 1514 can be fed in a step-wise manner through the electrolyte bath, e.g., depending on the ease with which dendritic structures grow on a moving substrate. Typically, portions of substrate 1514 remain immersed in electrolyte bath 1516 for a period of time from a few seconds (e.g., 2 seconds or more, 5 seconds or more, 10 seconds or more, 20 seconds or more) to a few hundred seconds (e.g., 900 seconds or less, 800 seconds or less, 600 seconds or less, 400 seconds or less, 300 seconds or less, 200 seconds or less, 100 seconds or less).

In some embodiments, substrate 1514 can be co-rolled with one or more additional materials on product roller 1524 to reduce or prevent damage to the dendritic structures. Materials that are suitable for co-rolling with substrate 1514 include the various materials disclosed herein that are used for encapsulating dendritic structures.

As discussed in connection with FIG. 12, in some embodiments, the dendritic structures can be grown on the underside of substrate 1514 (e.g., the side of substrate 1514 closest to anode 1518) to make it easier to separate the delicate structures from cathode probes 1512. In the method shown in FIG. 14, the tension maintained in substrate 1514 by product roller 1524 and feed roller 1522 can be used to ensure that cathode probes 1512 penetrate through substrate 1514 and rest on the underside surface of the substrate. Once the dendritic structures are grown on the underside of substrate 1514, cathode probes 1512 are withdrawn from the substrate by the rotational motion of cathode 1510, leaving intact dendritic structures on the substrate.

The tension maintained in substrate 1514 by product roller 1524 and feed roller 1522 has the added benefit of ensuring close contact between the upper surface of substrate 1514 and cathode 1510, so that electrolyte bath 1516 does not contact the upper surface of substrate 1514. As a result, dendritic structure growth is confined to the underside surface of substrate 1514.

Figure 15:
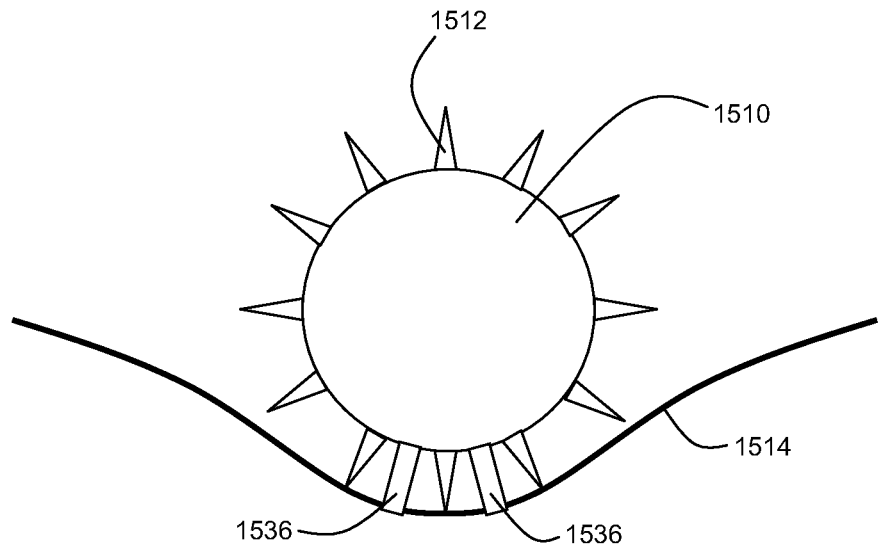
FIG. 15 is a schematic diagram showing an expanded view of the cathode probe array of FIG. 14.

In some embodiments, to grow dendritic structures on the upper surface of substrate 1514 (e.g., the surface closest to cathode 1510), spacers can be used to ensure that cathode probes 1512 contact the upper surface rather than penetrating the substrate through to the lower surface. FIG. 15 shows a schematic diagram of an embodiment of cathode 1510, in which spacers 1536 are positioned on the surface of the cathode so that cathode probes 1512 do not penetrate through substrate 1514, and instead only contact the upper surface of substrate 1514. Alternatively, or in addition, spacers can be positioned directly on cathode probes 1512 to ensure that the probes contact only the upper surface of substrate 1514. In general, spacers positioned on the surface of cathode 1510 and/or on cathode probes 1512 can be formed from a variety of materials. Examples of suitable materials include, but are not limited to, ceramics, polymers, and inert metals.

Figure 16A:
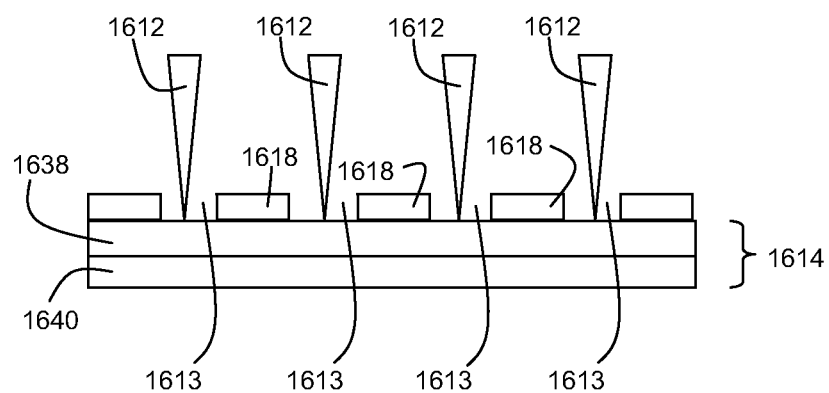
FIG. 16A is a schematic diagram showing a patterned anode that is used to fabricate dendritic structures.

The methods shown in FIGS. 11A, 11B, and 12-14 involve the growth of dendritic structures in electrolyte baths. However, large-volume fabrication methods for dendritic structures that do not involve electrolyte baths can also be used. In particular, substrates can be pre-coated or pre-immersed in an electrolyte to enable dendritic growth without using an electrolyte bath. FIG. 16A is a schematic diagram of a substrate 1614 that supports the growth of dendritic structures. Substrate 1614 includes a base layer 1640 formed from one or more of the materials disclosed previously for substrate 1314. Substrate 1614 also includes an electrolyte layer 1638. In some embodiments, electrolyte layer 1638 can include one or more thin, solid films formed on base layer 1640. Suitable materials for forming such a film include, but are not limited to, any of the materials disclosed previously in connection with solid electrolytes. In certain embodiments, electrolyte layer 1638 can include one or more gel layers applied to base layer 1640. Suitable gel materials include, but are not limited to, any of the materials disclosed previously in connection with gel-based electrolytes. In some embodiments, electrolyte layer 1638 can include a porous sheet (e.g., formed of a material such as paper) that includes (e.g., is infused with) a liquid electrolyte material. Suitable liquid electrolytes include any of the electrolyte solutions disclosed previously.

Substrate 1614 is generally compatible with the fabrication methods discussed previously. Thus, for example, substrate 1614 can be used to support the growth of dendritic structures via immersion baths, as shown in FIGS. 11A,11B, and 12, and also via continuous fabrication methods as shown in FIG. 14. Growth of the dendritic structures can occur on either the upper or lower surface of substrate 1614.

In FIG. 16A, substrate 1614 includes an electrolyte layer 1638. In some embodiments, substrate 1614 can be pre-immersed in an electrolyte solution in addition to, or as an alternative to, the inclusion of electrolyte layer 1638. Immersing the substrate in an electrolyte solution infuses the substrate with metal cations that are subsequently reduced at the cathode to grow dendritic structures. In general, a variety of different electrolyte solutions can be used for immersion of substrate 1614, including any of the solutions corresponding to the electrolyte baths discussed above. Moreover, a variety of substrate materials are effective at absorbing electrolyte solutions, including, but not limited to, a variety of porous materials such as different paper-based materials.

High quality dendritic structures have been successfully grown on a variety of paper-based materials. Various methods can be used to fabricate dendritic structures on paper. In some embodiments, for example, a paper substrate (e.g., laboratory filter paper) is soaked in an electrolyte solution. While any of the electrolyte materials disclosed herein can be used to immerse the paper substrate, silver nitrate solutions have been found to yield good results. The concentration of the solution used is typically larger than 0.01 M, e.g., between 0.1 M and 1.0 M. A silver nitrate solution at a concentration of 0.1 M has been found to yield good results.

After the paper has been soaked, a cathode is positioned on the paper where the dendritic structure will be grown. Dendritic structures can be fabricated on the paper without applying an anode, since the metal ions that form the dendritic structure are present in the electrolyte solution taken up by the paper substrate. However, in certain embodiments, an anode can be positioned at another location (e.g., different from the cathode location) on the electrolyte-soaked paper.

Next, an electrical potential difference is applied between the cathode and the electrolyte in the paper or the anode (if the anode is present). Typically, a potential difference of approximately 10 V is applied for a few tens of seconds (e.g., between 10 s and 60 s) to grow the dendritic structure at the position of the cathode on the paper substrate. Following growth of the dendritic structure, the cathode (and anode, if present) are removed from the paper substrate, and the paper is dried.

Using paper-based substrates provides a number of important advantages. Paper is a low-cost material that is available in large quantities and a variety of different forms (e.g., compositions, textures, strengths). As a result, the nature of the paper selected for the substrate can be chosen based on the intended application; for example, stronger paper substrates can be selected for applications that are anticipated to involve more frequent mechanical handling of the dendritic structures.

Dendritic structures have also been observed to adhere well to paper-based substrates. Without wishing to be bound by theory, the observed adherence may be due to the relatively rough surface of paper at the microscopic level. As papers with a wide variety of different textures can be used as substrates, adherence of the fabricated dendritic structure to the substrate can therefore be selected based on the choice of paper used for the substrate.

In addition, paper-based materials are typically porous and as a result, a variety of different electrolyte materials can be introduced into paper-based substrates using techniques such as immersion (e.g., soaking), as described above. Introducing electrolyte materials directly into the substrate significantly simplifies the growth process for the dendritic structures. Moreover, as described above, in some embodiments dendritic structures can even be grown without using an anode.

The methods disclosed herein for fabricating dendritic structures directly on paper-based substrates enable the use of dendritic structures as security-related elements in a variety of important security-related applications. Many financial, legal, and identification documents are printed on paper, and are therefore subject to possible duplication and/or forging. More generally, a wide variety of controlled documents (e.g., documents over which security access restrictions are imposed, including secret papers, plans, blueprints, etc.) are printed on paper. Using the methods disclosed herein, dendritic structures can be fabricated directly on such documents using low-cost, rapid processing techniques. Further, using methods that are described in greater detail subsequently, the dendritic structures can be authenticated, and then used to identify the documents on which they are grown. The strong adherence of the dendritic structures to paper-based substrates makes removal of the dendritic structures from the documents difficult. Mechanical and/or chemical methods for removal, for example, are likely to lead to destruction of the dendritic structures, preventing identification of the documents on which they are grown. In this manner, dendritic structures can be used to identify and secure a wide variety of documents that would otherwise be subject to counterfeiting efforts. Examples of such documents include, but are not limited to, banknotes, cheques, bearer bonds, stock certificates, wills, contracts, deeds, passports, birth certificates, and licenses of varying types (e.g., driver's licenses).

In addition to paper-based substrates, a variety of porous substrates can be used for the fabrication of dendritic structures using techniques similar to those disclosed above. In fabrication methods involving such substrates, an electrolyte (e.g., a liquid, gel, or paste electrolyte) is applied to the substrate material by immersion, spraying, contact deposition, or a direct mechanical application. A cathode is applied to the substrate surface and electrolyte and, optionally, an anode can also be applied. An electrical potential difference is applied between the cathode and the electrolyte in the porous material (or the anode, if present) to grow the dendritic structure. Using such methods, the fabricated dendritic structures adhere very strongly to the porous substrate. Without wishing to be bound by theory, it is believed that the strong adhesion occurs because the dendritic structures at least partially form in the pores or gaps of the substrate material, which physically "locks" the dendritic structures in place on the substrate surface. The foregoing fabrication methods are therefore particularly well suited to prevention of tampering with the dendritic structures, as the physical adhesion and "locking" of the structures to the porous substrate makes mechanical or chemical removal of the structures from the substrate—without damaging the structures—very difficult.

As described above, when the electrolyte material (e.g., liquid, paste, or gel) has an ionic concentration that is sufficiently large (typically, greater than 0.01 M), and the electrolyte material is "sacrificial" (e.g., it is not retained after growth for subsequent fabrication of additional dendritic structures), the dendritic structures can be grown without an oxidizable anode that includes the same material (e.g., metal atoms) from which the dendritic structures are fabricated. Instead, the material used to form the dendritic structures can be supplied by the electrolyte. Fabricating dendritic structures in this manner can be advantageous, as it permits a variety of non-reactive (e.g., non-oxidizable) anode materials to be used. Examples of such materials include tungsten, stainless steel, and platinum.

Where the electrolyte material is sacrificial, growth of the dendritic structures can occur without using an anode, as discussed above. Where the electrolyte material is not sacrificial (e.g., when the electrolyte material is used in the fabrication of multiple batches of dendritic structures), replenishment of the metal ions in the electrolyte is typically needed following a growth batch. As discussed herein, replenishment can occur from an oxidizable anode. However, the oxidizable anode does not have to be in contact with the substrate on which the dendritic structures are grown. For example, a non-reactive anode can be used to contact the growth region of the substrate, and an electrical potential difference can be applied between the cathode and the non-reactive anode to initiate growth of the dendritic structures. A sacrificial anode can be positioned away from the growth region but still in contact with the electrolyte material to replenish the ions in the electrolyte. In some embodiments, fabrication of dendritic structures and subsequent processing on the fabricated structures are performed more easily if the sacrificial anode does not contact the growth region of the substrate.

Substrate 1614 in FIG. 16A includes a plurality of anodes 1618 patterned on the substrate. In some embodiments, e.g., where electrolyte layer 1638 includes a solid electrolyte material, anodes 1618 can be deposited as a patterned film on electrolyte layer 1638 using methods such as physical and/or chemical vapor deposition. Anodes 1618 can be formed from any one or more of the materials disclosed previously in connection with anode 1318.

As shown in FIG. 16A, anodes 1618 can be deposited in a patterned film that includes a plurality of openings 1613. Contact between cathode probes 1612 and electrolyte layer 1638 occurs within openings 1613, and growth of the dendritic structures therefore occurs within the openings as well. Although anodes 1618 are patterned on the side of substrate 1614 on which contact with cathode probes 1612 occurs in FIG. 16A, anodes 1618 can also be patterned on the opposite side of substrate 1614.

Figure 16B:
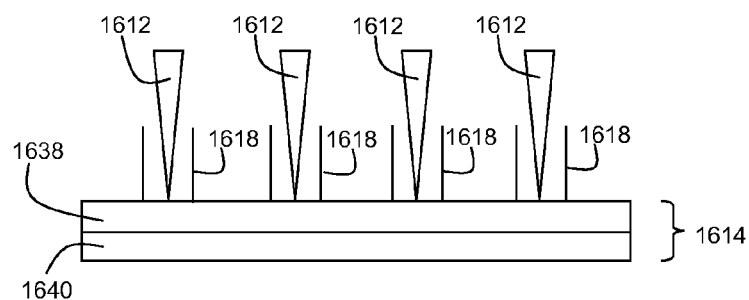
FIG. 16B is a schematic diagram showing a plurality of anode tubes that are used to fabricate dendritic structures.
Figure 16C:
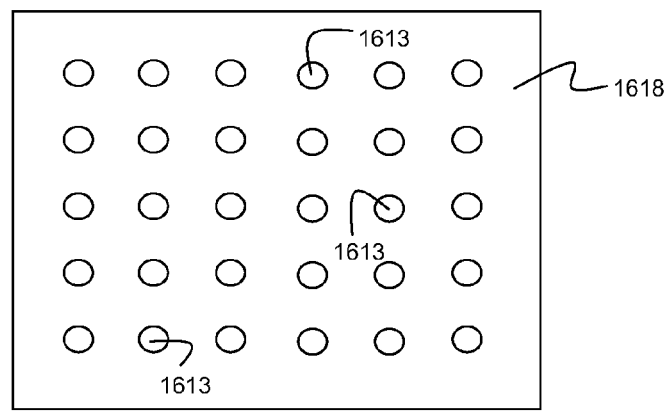
FIG. 16C is a schematic diagram of a plate anode that is used to fabricate dendritic structures.

In some embodiments, anodes 1618 can be provided in the form of a metal plate with openings to allow contact between cathode probes 1612 and the electrolyte material. Referring to FIG. 16A, anodes 1618 can be implemented in the form of a plate (e.g., formed of a metal such as copper, or any of the other anode materials disclosed herein), where openings 1613 with cross-sectional shapes that are circular, elliptical, square, rectangular, or other regular or irregular shapes allow the cathode probes access to electrolyte layer 1638. FIG. 16C shows a schematic diagram of an anode plate 1618 that includes a plurality of openings 1613. The plate can be placed in contact with electrolyte layer 1638 prior to the growth of the dendritic structures, and removed from layer 1638 when growth of the structures is complete.

In certain embodiments, substrate 1614 does not include anodes 1618. Instead, one or more anodes 1618 can be provided separately from substrate 1614 (e.g., as a separate electrode or electrodes that contacts substrate 1614 only during growth of dendritic structures). FIG. 16B shows an embodiment in which a substrate 1614 includes a base layer 1640 and an electrolyte layer 1638 as discussed above. In FIG. 16B, a plurality of cathode probes 1612 contact electrolyte layer 1638. Further, a plurality of anodes 1618, each of which is concentrically positioned relative to a corresponding cathode probe 1612, also contact electrolyte layer 1638. When an electrical potential is applied between cathode probes 1612 and their corresponding anodes, dendritic structures grow at positions where cathode probes 1612 contact electrolyte layer.

Anodes 1618 can generally be implemented in a variety of different geometries. In FIG. 16B, anodes 1618 are shown as a plurality of hollow tubes or rings that are coaxial with cathode probes 1612. Other geometries are also possible including, for example, flat rings, hollow prisms, and pluralities of needle-like probes that are arranged in circular or other regular geometries.

Coaxial ring or tube anodes, as shown in FIG. 16B, are particularly useful for simultaneously fabricating multiple radial dendritic structures. The symmetry of such anodes typically yields radial dendritic structures with a high degree of radial symmetry. Moreover, ring and/or tube anodes shield each dendritic growth point (e.g., the point where cathode probe 1612 contacts electrolyte layer 1638) from the other growth points, yielding highly uniform dendritic structure formation across the substrate.

When dendritic structures are grown on a substrate material that has been infused with the electrolyte material (e.g., a porous substrate to which electrolyte material has been applied or introduced), the one or more anodes 1618 can be on the same side of the substrate as, or opposite side from, cathode probes 1612. Where anodes 1618 are positioned on the opposite side of the substrate from cathode probes 1612, either the cathode probes 1612 or anodes 1618 can penetrate into the substrate (e.g., into electrolyte layer 1638) to enhance the growth of the dendritic structures.

Figure 16D:
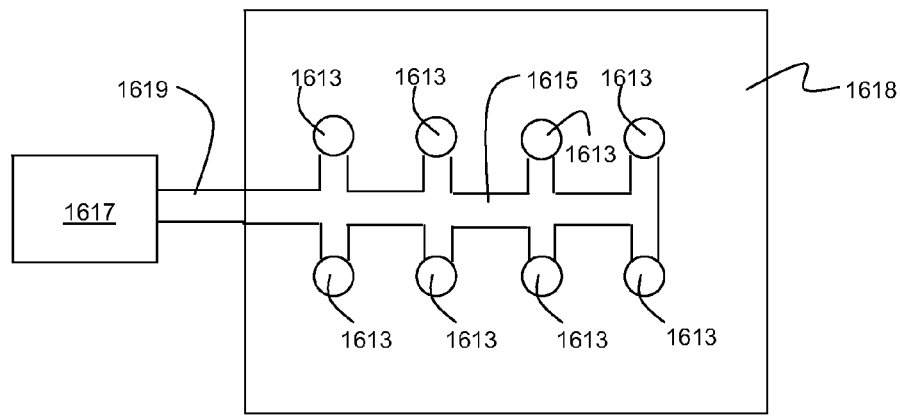
FIG. 16D is a schematic diagram of an anode that includes a plurality of fluid delivery channels.

In some embodiments, electrolyte materials can be delivered by anodes 1618, cathode probes 1612, or both the anodes and cathode probes, to the substrate during fabrication of the dendritic structures. For example, FIG. 16D shows a cross-sectional view of an anode plate 1618 that includes a plurality of openings 1613. A fluid channel 1615 is formed in plate 1618, and includes apertures in the sidewalls of each of the openings 1613. The fluidic channel is connected to an electrolyte reservoir 1617 via a tube 1619. During fabrication of dendritic structures, fluid reservoir 1617 delivers electrolyte materials (e.g., electrolyte solution) to each of the openings 1613 via fluid channel 1615.

Electrolyte delivery can also be accomplished using other anode geometries. For example, when anodes 1618 are implemented as a plurality of rings or tubes, electrolyte materials can be delivered to the substrate surface through apertures formed in the rings or tubes. The rings or tubes can be connected to an electrolyte reservoir in a manner similar to FIG. 16D.

By implementing the anodes 1618 as a plurality of tubes, rings, or similar structures, or as a plurality of openings in a metal plate, anodes 1618 form a dendritic structure "print head" that can be rapidly positioned and re-positioned on the surface of a substrate to facilitate high volume, high quality growth of dendritic structures. In some embodiments, anodes 1618 can also be used to cut substrate 1614 into individual pieces, each supporting a single fabricated dendritic structure. For purposes of cutting substrate 1614, the edges of the anodes 1618 that contact substrate 1614 can be sharpened to penetrate more easily into the substrate material. Cutting substrate 1614 in this manner can be highly advantageous, as the cutting process is automatically aligned with the sites at which dendritic structures are grown so that accurate sectioning of substrate 1614 can be achieved without performing any alignment steps.

When substrate 1614 includes an electrolyte layer or is pre-immersed in electrolyte solution, the electrolyte material remains in place following growth of the dendritic structures, unlike the methods disclosed in FIGS. 11A and 11B, for example, where the substrate is removed from the electrolyte bath following growth of the dendritic structures. In some embodiments, the composition of the electrolyte layer or electrolyte solution, the applied electrical potential difference, and/or the duration over which the potential difference is applied, are adjusted so that the dendritic structures grown on substrate 1614 remain essentially stable (e.g., electrochemically stable), even in the later presence of the electrolyte layer or electrolyte solution.

Alternatively, in certain embodiments, the composition of the electrolyte layer or electrolyte solution, the applied electrical potential difference, and/or the duration over which the potential difference is applied, are adjusted so that during growth of the dendritic structures, the electrolyte layer or solution infused in substrate 614 is starved of metal from the anode, i.e., the rate at which metal atoms from the anode are oxidized and dissolve in the electrolyte layer or solution is insufficient to replace the metal cations that are reduced at the cathode. This can be achieved by limiting the amount of metal in the anode to less than the amount in the dendritic structure so that the dendritic structure grows at the expense of the metal ions in the electrolyte. The imbalance creates a chemical gradient between the dendritic structure and the electrolyte following growth, which will cause the dendritic structure to dissolve.

Following growth of the dendritic structures, the deficit of metal cations persists in the electrolyte layer or solution. Accordingly, the electrolyte layer or solution slowly dissolves the fabricated dendritic structures over a period of time, a process that is driven thermodynamically by the electrochemical and/or ionic imbalance in the electrolyte layer or solution. Thus, by fabricating dendritic structures in this manner, the structures can be made to "self-destruct" after a period of time. For structures that are used for identification or authentication, as will be discussed later, the structures can therefore be made to expire after a period of time. By adjusting the composition of the electrolyte layer or electrolyte solution, the applied electrical potential difference, and/or the duration over which the potential difference is applied, the expiration time of the fabricated dendritic structures can be controlled. For example, by using an electrolyte layer or electrolyte solution that is closer to saturation with respect to cations from the anode, the longer it will take for the electrolyte layer or electrolyte solution to dissolve the dendritic structures. The atomic percentage of metal in the electrolyte at saturation typically ranges from 70 atomic percent to 10 atomic percent, depending in the electrolyte; concentrations of metal cations smaller than the saturated concentration will cause gradual dissolution of the metal dendritic structures.

In some embodiments, the dendritic structures can be further processed (e.g., during or after fabrication) to enhance their features, in particular for imaging and/or packaging purposes. For example, one or more additional materials can be deposited atop the dendritic structures to "smooth" the structures for packaging purposes. Examples of such materials include, but are not limited to, cyanoacrylate applied as a low viscosity (high-wicking) liquid and hardened by chemical reaction with water or UV exposure to form a hard acrylic coating, polymethylmethacrylate liquid or vapor hardened by chemical reaction with peroxide or UV exposure to form a hard Lucite® (Perspex®) coating, polyethylene terephthalate, polysiloxane liquid or condensed vapor that is thermally cured to give a silicate coating, silicon dioxide or silicon nitride deposited by the pyrolysis of vapor sources in a chemical vapor deposition reaction to create a highly conformal oxide or nitride film. Polymeric materials such as polyvinylchloride and cellulose acetate may also be applied as a tape, affixed with adhesive, to cover the dendrite.

In certain embodiments, to enhance the visibility of reflections from high points in the dendritic structures during imaging, the high points in the dendritic structures can be further "raised" above the surface of the substrate by applying an electric field during growth of the dendritic structures on the substrate. The field polarity is selected so that metal cations are drawn upward relative to the substrate surface due to the influence of the field, which yield dendritic structures that are more strongly peaked in a direction perpendicular to the substrate surface. Typical field strengths used for growing dendritic structures in this manner are in a range from 10,000 to 1,000,000 V/cm.

In some embodiments, fluorophores can be attached to the dendritic structures to produce light from the entire structure, which enhances visibility of the structures during image capture. Fluorophores can be attached over the entire dendritic structure, or attached selectively to certain regions of the structure such as high points (e.g., which appear as peaks under illumination). Fluorophore attachment can be performed by attaching an ionic group to the fluorophore and applying a voltage of the opposite polarity to the dendritic structure so that the charged fluorophores are particularly attracted to the regions of high electric field at the peaks of the dendritic structure.

The methods discussed in this section generally yield a plurality of dendritic structures fabricated in an ordered array on a substrate. Before the structures are used for various applications, however, a variety of additional processing steps can be performed. In FIG. 14, a processing station 1550 is positioned along the path of substrate 1514 between guide roller 1534 and product roller 1524. More generally processing station 1550 can be positioned at various points along the path of substrate 1514 between feed roller 1522 and product roller 1524. In addition, in some embodiments, processing station 1550 can be positioned after product roller 1524, i.e., processing station 1550 can be positioned to process substrate 1514 after it has been spooled onto roller 1524.

Processing stations can generally be present in any of the fabrication systems disclosed herein. For example, the systems shown in FIGS. 11A, 11B, and 12-16A/B can each include a processing station for post-processing of fabricated dendritic structures. Each system can also include more than one processing station. For example, in some embodiments, similar processing stations can be used to process dendritic structures in parallel, thereby increasing the overall throughput of the fabrication systems. In certain embodiments, multiple processing stations can be used to perform different post-processing steps on the dendritic structures. These steps will be discussed further below. In general, the steps can be divided among any number of post-processing stations as desired.

Figure 17:
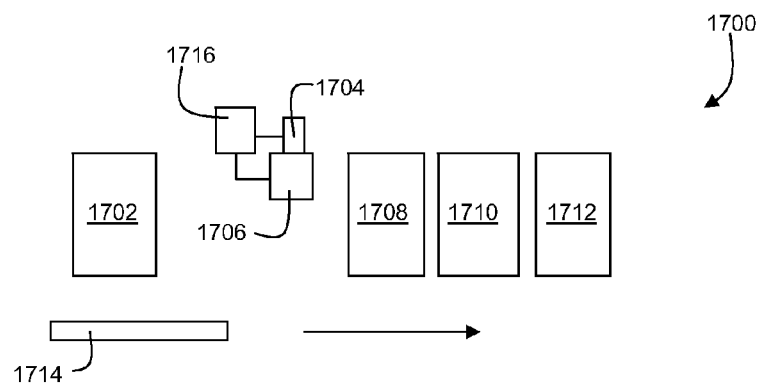
FIG. 17 is a schematic diagram showing a station for post-processing fabricated dendritic structures.

FIG. 17 shows a schematic diagram of a post-processing station 1700 that can be used in any of the methods disclosed herein. Station 1700 includes a drying module 1702, an inspection module featuring an illumination source 1704 and an imaging detector 1706, a marking module 1708, a sealing module 1710, and a dicing module 1712. Substrate 1714 with dendritic structures fabricated thereon passes through some or all of these modules.

Drying module 1702 functions to dry the fabricated dendritic structures and substrate 1714 following growth. Drying module 1702 can be implemented in a variety of ways. In some embodiments, for example, drying module 1702 features one or more sources configured to direct flows of air (e.g., heated air) across the surface of substrate 1714. In certain embodiments, drying module 1702 includes one or more radiative sources, such as infrared sources, that direct radiation onto substrate 1714. The radiation heats substrate 1714 and can evaporate water and volatile substances from the substrate. In some embodiments, conductive and/or convective heating methods can be used in addition to, or as alternatives to, radiative heating. Further, heating methods that include radio frequency waves (e.g., microwaves) can also be used. Typically, the curing temperatures for dendritic structures are between 50° C. and 250° C.

The inspection module allows a system operator to view the fabricated dendritic structures and, for example, to designate certain dendritic structures for rejection based on their morphology. In certain embodiments, an electronic processor 1716 coupled to illumination source 1704 and imaging detector 1706 directs the light source to illuminate the dendritic structures on substrate 1714, and directs the imaging detector to obtain one or more images of the illuminated structures. Electronic processor 1716 then analyzes the images to the dendritic structures and applies rejection criteria to determine whether specific structures should be rejected. Dendritic structures can be rejected according to a variety of criteria. For example, specific dendritic structures can be rejected due to partial growth, a variety of morphological defects, and/or incorrect fractal dimension. Rejection can occur immediately by ejecting specific dendritic structures from the processing sequence, or the dendritic structures can be marked for later rejection. Rejection criteria can include, for example, the presence of defects that are larger than a threshold size (e.g., 0.1 mm), the absence of particular branches in the dendritic structures, and a fractal dimension that differs by 25% or more (e.g., 35% or more, 50% or more, 75% or more) from a target value. The target value for dendritic structures grown according to the methods disclosed herein is typically approximately 1.5

Marking module 1708 applies marks, e.g., fiducial marks, to regions of the substrate. The marks can be used for subsequent processing steps, such as dicing substrate 1714. Alternatively, fiducial marks can be applied so that the dendritic structures can be aligned for imaging, e.g., relative to a common reference position. Fiducial marks can be applied using methods such as photolithography and etching of a film, laser etching, embossing, cutting, and/or drilling of the substrate.

In some embodiments, fiducial marks can be added to the substrate by taking advantage of the photosensitivity of certain electrolytes in a photolithographic process. For example, silver nitrate will darken when exposed to light. Thus, a silver nitrate solution used as an electrolyte on a substrate can be exposed through a mask which contains a negative image of the fiducial pattern to create fiducial marks on the substrate. Exposure to create the fiducial marks can occur before or after growth of the dendritic structures.

Sealing module 1710 is configured to protect the fabricated dendritic structures by applying one or more layers of protecting materials over the dendritic structures. The protecting materials ensure that the dendritic structures are not subject to mechanical or chemical degradation during use. The protecting materials also are used to ensure that the fabricated dendritic structures are not subject to tampering to alter their structure. This can be particularly important for applications that involve identification and/or authentication, where the unique morphologies of specific dendritic structures are tied to specific identity information. Methods for protecting the fabricated dendritic structures will be discussed in greater detail in a subsequent section.

Dicing module 1712 is configured to slice substrate 1714 into multiple pieces to separate the dendritic structures. Typically, for example, substrate 1714 is diced so that each of the fabricated dendritic structures is separated from the others. The dicing may be performed using methods such as cutting/guillotining by a blade, sawing, laser cutting, or punching. The separated individual structures are then used for a variety of applications, examples of which are described herein.

Although post-processing station 1700 includes a drying module 1702, an inspection module featuring an illumination source 1704 and an imaging detector 1706, a marking module 1708, a sealing module 1710, and a dicing module 1712, more generally the post-processing stations can include all or only some of these modules. Further, the modules can be arranged in any order; post-processing station 1700 in FIG. 17 is only one example of a suitable arrangement. In some embodiments, for example, the inspection module can be positioned after all of the other modules, i.e., after the dendritic structures have been dried, protected, and diced.

Inspection can then proceed as described above to accept or reject the separated dendritic structures according to their specific morphologies. In certain embodiments, drying module 1702 can be positioned after sealing module 1710, particularly where sealing module applies one or more layers to the dendritic structures that require drying following deposition.

Marking module 1708 can generally be positioned anywhere along the processing sequence. For example, in some embodiments, marking module 1708 is positioned after dicing module 1712. Further, dicing module 1712 can also typically be positioned anywhere along the processing sequence. In certain embodiments, such as the example shown in FIG. 14, substrate 1714 can be fed directly into dicing module 1712 (e.g., a cutting machine) rather than onto product roller 1524, to separate individual dendritic structures.

Figure 18:
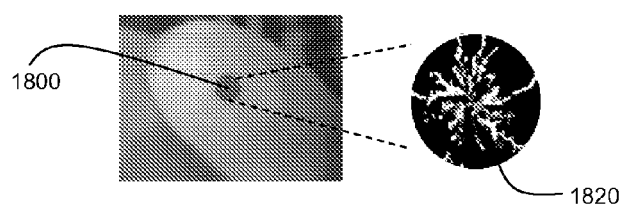
FIG. 18 is an image of a dendritic structure.

FIG. 18 shows a specific dendritic structure 1820 that has been grown and post-processed, including having been diced to separate it from other dendritic structures. Dendritic structure 1820 and the portion of substrate that supports it form a dendritic tag 1800 that is circular in shape. More generally, however, dendritic tags can have a variety of shapes, including square, rectangular, polygonal, elliptical, and various curved shapes. The maximum dimension of the dendritic tags, which is the largest distance between any two points on the dendritic tags, is typically 5 mm or less (e.g., 4 mm or less, 3 mm or less, 2 mm or less, 1 mm or less).

Securing Dendritic Tags

Dendritic tags, fabricated as described in the preceding sections, have unique morphological features that make them useful for a variety of applications, in particular, applications that involve identification and authentication of articles. To be useful as unique identifiers, however, it is advantageous if the dendritic structures supported on the tags are difficult to tamper with following fabrication, and are sufficiently robust to retain their morphologies when exposed to a variety of physical and chemical environments. By rendering the dendritic structures difficult to modify or copy and the tags difficult to remove from articles to which they are applied, duplication or reuse of the tags for counterfeiting purposes is challenging and/or economically infeasible.

To prevent alteration of dendritic structure morphologies and to protect the fabricated tags against degradation in a variety of different environments, the present section discloses various systems and methods for treating fabricated dendritic structures. As discussed above in connection with FIG. 17, these treatments can be applied to fabricated dendritic structures by sealing module 1710. Alternatively, or in addition, the treatments can be applied using other means during or following fabrication of the structures.

Figure 19:
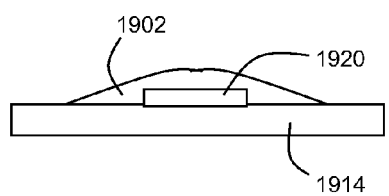
FIG. 19 is a schematic diagram of a dendritic tag with a protective layer.

To protect dendritic tags against environmental degradation, one or more layers of protective materials can be applied to encapsulate at least the tag's dendritic structure. FIG. 19 shows a schematic diagram of a dendritic tag that includes a substrate 1914 and a dendritic structure 1920 formed on the substrate. A protective layer 1902 is applied over dendritic structure 1920 to encapsulate the structure. Although protective layer 1902 in applied to only one surface of substrate 1914 in FIG. 19, more generally, protective layer 1902 can be applied to both surfaces of substrate 1914 to partially or fully encapsulate both substrate 1914 and dendritic structure 1920. Further, although a single protective layer 1902 is applied to the dendritic tag, more generally, one or more protective layers can be applied. Multiple protective layers can include different materials having different properties. For example, in some embodiments, a first protective layer can be applied to mechanical rigidity to the dendritic tag, and a second protective layer can be applied to impart water impermeability to the encapsulated dendritic tag. The following discussion will focus on properties of protective layer 1902 for clarity. However, it should be understood that a variety of different combinations of layers, each having different properties, can be used to protect dendritic tags. In particular, combinations of any number of layers of any of the different materials disclosed herein can be used.

In certain embodiments, protective layer 1902 has a relatively high Mohs hardness number to resist mechanical abrasion of the encapsulated dendritic tag. In some embodiments, for example, the Mohs hardness number of protective layer 1902 is 4 or more (e.g., 5 or more, 6 or more, 7 or more, 8 or more). Further, in some embodiments, protective layer 1902 has relatively high water impermeability and degrades relatively slowly in sunlight. These properties of protective layer 1902 protect the encapsulated dendritic tag against environmental degradation.

In addition, in some embodiments, protective layer 1902 is relatively resistant to a variety of different classes of chemical compounds, including some or all of acids, chlorine-based compounds, bleaches, and detergents. The resistance of protective layer 1902 to these materials further protects encapsulated dendritic tags.

Protective layer 1902 is generally applied to dendritic tags in a manner that preserves the delicate dendritic structure 1920 on each tag. A variety of methods can be used for application of the protective layer. In some embodiments, for example, protective layer 1902 can be vapor deposited using chemical vapor deposition or physical vapor deposition techniques. In certain embodiments, protective layer 1902 can be applied as a low viscosity liquid to dendritic structure 1920 and the upper surface of substrate 1914.

Typically, both vapor and liquid deposition techniques are performed in a reduced-pressure environment to ensure that protective layer 1902 fills small gaps between the structural features of dendritic structure 1920. In some embodiments, for example, vapor and/or liquid deposition of protective layer 1902 is performed at an ambient pressure of 100 Torr or less (e.g., 50 Torr or less, 30 Torr or less, 20 Torr or less, 10 Torr or less, 5 Torr or less, 1 Torr or less, 500 mTorr or less, 300 mTorr or less, 100 mTorr or less).

Following deposition of protective layer 1902, in certain embodiments, the protective layer is hardened. Hardening of protective layer 1902 can be performed by physical or chemical techniques. Suitable physical techniques for hardening protective layer 1902 include directing a flow of air onto protective layer 1902, heating the encapsulated dendritic tag to cure protective layer 1902, and/or photocuring protective layer 1902 by exposing protective layer 1902 to radiation, e.g., ultraviolet radiation. Suitable chemical techniques for hardening protective layer 1902 include, for example, exposing protective layer 1902 to chemical cross-linking agents such as formaldehyde.

In general, the material from which protective layer 1902 is formed is chosen for its particular physical and chemical properties to ensure that the dendritic tag it encapsulates is protected from degradation in a variety of different environments. A variety of different materials can be used singly, or in combination, to form protective layer. In some embodiments, protective layer 1902 includes cyanoacrylate, a low-viscosity liquid. A protective layer formed from cyanoacrylate can be hardened by chemical reaction with water and/or by exposure to ultraviolet radiation. Hardening yields a hard acrylic coating over dendritic structure 1920.

In certain embodiments, protective layer 1902 includes polymethylmethacrylate (PMMA), which can be deposited either as a vapor or a liquid onto the dendritic tag, and hardened by chemical reaction with a peroxide material or exposure to ultraviolet radiation. The hardened PMMA forms an acrylic layer that encapsulates dendritic structure 1920.

In some embodiments, protective layer 1902 includes polysiloxane, which can be deposited either as a vapor or a liquid onto the dendritic tag. Hardening of polysiloxane by thermal curing yields a silicate coating that encapsulates dendritic structure 1920.

In certain embodiments, protective layer 1902 includes polyethylene, e.g., polyethylene terephthalate (PET), which can be deposited either as a vapor or liquid onto the dendritic tag (e.g., as a monomer) and hardened by chemical reaction or exposure to heat or ultraviolet radiation. The hardened PET forms a layer than encapsulates dendritic structure 1920.

In some embodiments, protective layer 1902 includes silicon dioxide and/or silicon nitride. These materials can be deposited by pyrolysis of vapor sources in a chemical vapor deposition reaction, yielding a highly conformal oxide and/or nitride film that encapsulates dendritic structure 1920.

Figure 20:
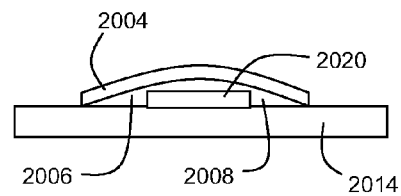
FIG. 20 is a schematic diagram of a dendritic tag with a non-conformal protective layer.

FIG. 20 shows a schematic diagram of another dendritic tag featuring a substrate 2014 and a dendritic structure 2020 formed thereon. In FIG. 20, the dendritic tag is not encapsulated by a protective layer 1902 deposited from vapor or liquid to form a conformal film on the dendritic structure. Instead, protective layer 2004 formed from a relatively soft, compliant material that is applied as a solid film over the dendritic tag. The technique shown in FIG. 20 is particularly suitable for relatively robust dendritic structures that resist deformation, as the application of protective layer 2004 exerts a downward force on dendritic structure 2020.

Dendritic structure 2020 is sandwiched between protective layer 2004 and substrate 2014 in FIG. 20, and may not be fully coated by protective layer 2004 (i.e., not all portions of dendritic structure 2020 may be in contact with protective layer 2004). Voids between protective layer 2004 and dendritic structure 2020, such as voids 2006 and 2008, may trap gases or may enclose volumes in which the pressure is reduced relative to ambient pressure. Following application of protective layer 2004 to the dendritic tag, the protective layer can be hardened using any one or more of the physical and chemical methods disclosed above.

A variety of materials can be used to form the solid protective layer 2004 that is applied to the dendritic tag. Suitable materials include, but are not limited to, acrylic, polycarbonate, PMMA, PVC, and/or glass.

Following application of one or more protective layers, the encapsulated dendritic tag is protected from physical and chemical degradation by the environment, but is accessible for optical measurements and is also electrically (e.g., capacitively) addressable. As such, the dendritic tag can function as an identifier containing information that can be "read" by optical and electrical methods.

To duplicate the morphology of a specific dendritic structure on a tag, contact molding is the process most likely to be successful, as molding can replicate complex, minute structural features. To perform contact molding of dendritic structures, which have three dimensional shapes, the protective layer(s) must be removed from the structures. Removal might be attempted by either physical or chemical methods. However, because dendritic structures typically have Mohs hardness values of less than about 2.5, the encapsulated tags are likely to be damaged by physical attempts to remove the one or more protective layers from the tags. As such, physical tampering with the structures is effectively precluded by the fragility of the structures.

Chemical attempts to remove the one or more protective layers are also likely to result in damage to the dendritic structure, as the protective layers are considerably more chemically inert than the encapsulated dendritic structure, which has a high surface area. Accordingly, chemical methods for removing the protective layers are unlikely to succeed without damaging the dendritic structures, and because both chemical and physical methods for removal are likely to fail, tampering with the encapsulated dendritic structure—including contact molding of the structure—is effectively precluded.

Figure 21A:
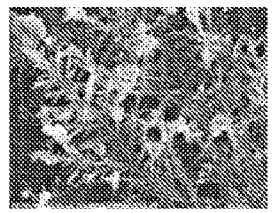
FIGS. 21A-21C are micrographs of dendritic structures grown on a substrate with an overlying liquid electrolyte.
Figure 21B:
Figure 21C:
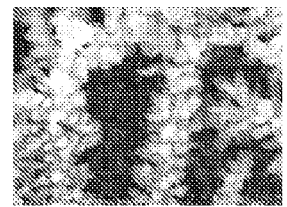
Figure 22A:
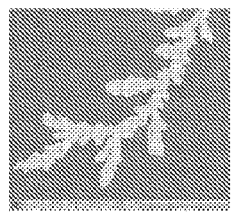
FIGS. 22A-22B are micrographs of dendritic structures grown on a solid electrolyte material.
Figure 22B:
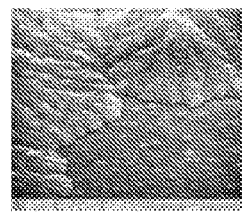

Another technique that might be attempted to duplicate dendritic tags involves optically scanning an intact tag and then duplicating the tag using methods such as printing. However, these methods are effectively precluded by the complex morphology of the dendritic structures in the tags. FIGS. 21A-C show a series of micrographs of dendritic structures grown on a substrate with an overlying liquid electrolyte. The magnification increases from FIG. 21A through FIG. 21C. As is evident from these figures, the morphology of the dendritic structures is complex and three dimensional, and extends to nanoscale dimensions. Morphologies of dendritic structures in the direction perpendicular to the substrate surface typically differ, depending upon whether the electrolyte used during fabrication was in solid form, or in liquid or gel form. Typically, liquid- or gel-based electrolytes yield dendritic structures with significant growth along the perpendicular direction, as shown in FIGS. 21A-C. In contrast dendritic structures grown using a solid electrolyte typically have a "terrain-like" or "mountainous" shape in the perpendicular direction, as shown in the examples of FIGS. 22A and 22B.

The three dimensional morphology of the dendritic structures makes replication by top-down methods very difficult. Moreover, three dimensional printers do not have resolutions sufficient to replicate nano-scale features of dendritic structures. As such, the fractal complexity of the dendritic structures effectively preclude replication of the structures using conventional methods. Further, application of one or more protective layers using the methods disclosed herein can lead to minor, but unpredictable, distortions of dendritic structures. Even if methods were developed for the duplication of such structures, the duplicate structures would not necessarily undergo similar distortions when one or more protective layers are applied. This element of unpredictability further ensures that duplication of the encapsulated dendritic tags is highly difficult.

The encapsulated dendritic tags disclosed herein can be used for identification and authentication of articles such as commercial goods. In such applications, the tags are typically bonded to an outer surface of the articles. Removal of the tags from the articles to which they are affixed for purposes of engaging in fraudulent activity is therefore an important consideration. A variety of methods might be considered to effect such removal, including mechanical (i.e., physical) methods where a dendritic tag is carefully peeled, scraped, or cut from the article, thermal methods where heat is applied to the bond between the tag and the article to weaken the bond and separate the tag from the article, and chemical methods in which a chemical agent such as a solvent or acid is used to soften or remove the bond between the tag and the article. However, each of these methods typically fails, as each method generally destroys the dendritic structure underneath the one or more protective layers.

Destruction of a dendritic tag in the event an attempt is made to remove the tag from an article to which it is affixed provides a convenient method for ensuring that tags remain associated with the articles to which they are applied, and are not applied to other articles. A variety of additional steps can also be taken to ensure that attempts to remove a tag from its associated article results in partial or complete destruction of the dendritic tag.

In some embodiments, to prevent removal of applied dendritic tags, a strong bonding agent is used to affix dendritic tags to specific articles. The bonding agent can be, for example, a chemical adhesive, a thermal bonding material, and/or an ultraviolet light-activated bonding agent.

The bonding agent used to affix dendritic tags to particular articles unites the tags and articles via bonds that are stronger than the shear strength of the tags. As a result, attempts to remove the tags from the articles to which they are bonded typically result in tearing of the tags. In the encapsulated tags, the dendritic structures are typically positioned within 50 microns (e.g., within 40 microns, within 30 microns, within 20 microns) of the adhesive layer to prevent sectioning of the tag between the adhesive layer and the dendritic structure, which might allow the dendritic structure to be removed from the article to which it is affixed in intact form.

Figure 23:
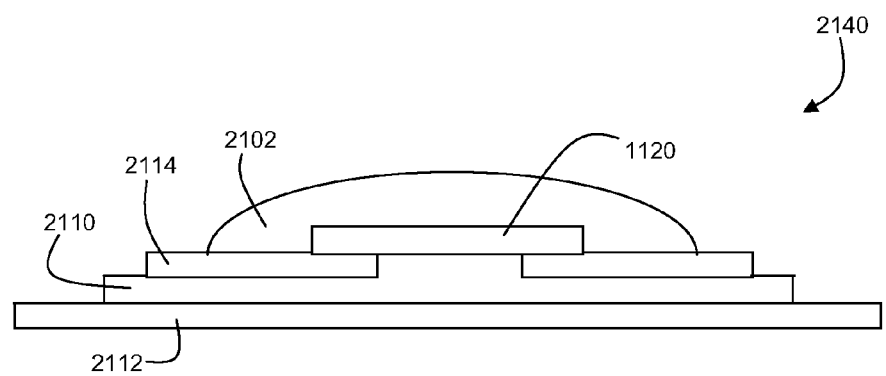
FIG. 23 is a schematic diagram of a dendritic tag bonded to an article using a layer of adhesive.

In some embodiments, a portion of the dendritic structure in a tag can be bonded directly to an article to ensure that attempts to remove the tag from the article results in destruction of the tag's dendritic structure. FIG. 23 is a schematic diagram showing a dendritic tag 2140 bonded to an article 2112 using a layer of adhesive 2110. Dendritic tag 2140 includes a substrate 2114 that supports a dendritic structure 2120, and a protective layer 2102.

As shown in FIG. 23, a portion of substrate 2114 has been removed, so that a portion of dendritic structure 2120 is bonded directly to article 2112 via adhesive 2110. As a result of the direct bond between dendritic structure 2110 and article 2112, attempts to remove dendritic tag 2140 from article 2112 are likely to result in damage to, or destruction of, dendritic structure 2120.

Although only a single portion of substrate 2114 has been removed to allowing bonding of dendritic structure 2120 to article 2112 in FIG. 23, more generally, one or more portions can be removed. The removed portions can be arranged in any desired pattern on substrate 2114. Suitable patterns can include two-dimensional array patterns (e.g., criss-crossing patterns), for example. In certain embodiments, substrate 2114 can be removed entirely and the entire dendritic structure 2120 can be bonded to substrate 2114. Portions of the substrate may be removed using techniques such as cutting, scribing, etching, and/or laser ablation.

In certain embodiments, similar (or the same) materials are used to form both protective layer 2102 and the adhesive layer that bonds dendritic tag 2140 to article 2112. By using similar or the same materials, if attempts are made to chemically dissolve or thermally soften the adhesive layer, damage will also occur to protective layer 2102, and to dendritic structure 2120. In some embodiments, for example, protective material 2102 and the adhesive layer are formed from a cyanoacrylate liquid, which is cured by a chemical reaction with water vapor in the environment. In certain embodiments, protective material 2102 and the adhesive layer are formed from a UV curable adhesive material.

In some embodiments, adhesive is applied in a patterned geometry between dendritic tag 2140 and article 2112. The adhesive pattern can include, for example, a series of dots, stripes, or another regular or irregular pattern. By applying adhesive in a pattern, certain portions of dendritic tag 2140 are bonded more firmly to article 2112 than other portions. As a result, physical removal attempts are more likely to cause distortion or breakage of dendritic tag 2140.

Figure 24:
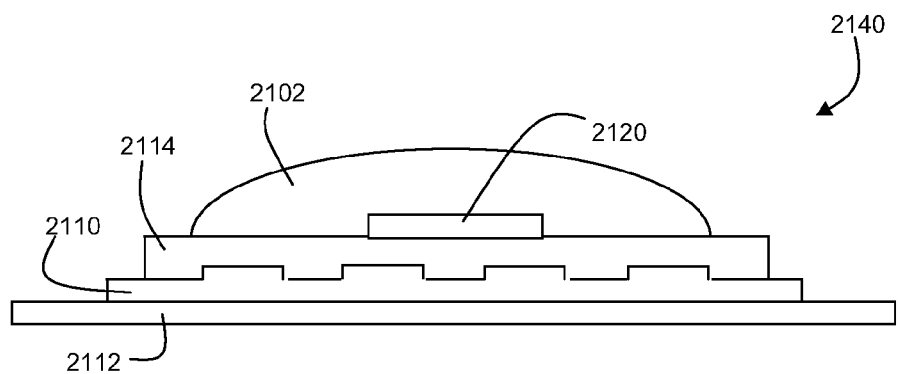
FIG. 24 is a schematic diagram of a dendritic tag bonded to an article and having a substrate surface patterned with a series of grooves.

In certain embodiments, substrate 1114 can be patterned or roughened. FIG. 24 is a schematic diagram of a dendritic tag 2140 bonded with adhesive 2110 to an article 2112. The surface of substrate 2114 that is bonded to article 2112 is patterned with a series of grooves that are not completely filled by adhesive 2110. As a result, the groove portions of substrate 2114 are not bound as firmly to article 2112 as the other portions of substrate 2114. Due to this uneven adhesion, attempts to physically remove tag 2140 from article 2112 are more likely to lead to distortion or breakage of tag 2140.

In general, a variety of different types of patterned substrates can be used in FIG. 24. For example, in some embodiments, the patterned substrate features a plurality of grooves and/or recessed circular or elliptical regions. The pattern features can generally be arranged regularly on substrate 2114 or in a random pattern.

Figure 25:
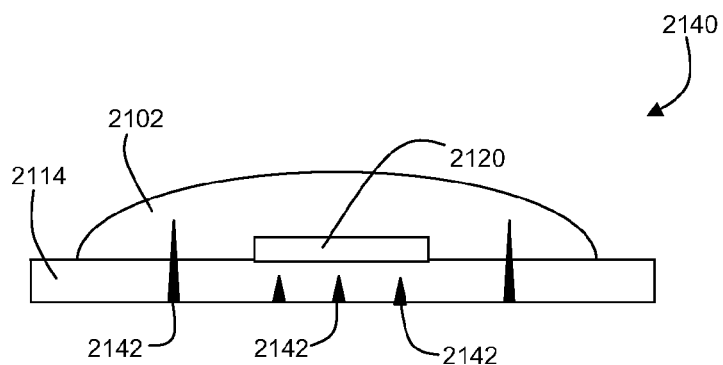
FIG. 25 is a schematic diagram of a dendritic tag that includes a plurality of cuts.

In some embodiments, dendritic tag 2140 includes one or more mechanical defects deliberately introduced into the tag during fabrication so that if an attempt is made to remove the tag from the article to which it is attached, the tag will tear. The mechanical defects can include a variety of scores, cuts, and other structural defects. FIG. 25 is a schematic diagram of a dendritic tag 2140 that includes a plurality of cuts 2142 introduced so that a force is applied to the tag (e.g., in an effort to peel it away from an article to which it is attached), the tag ruptures along one or more of the cuts.

Figure 26:
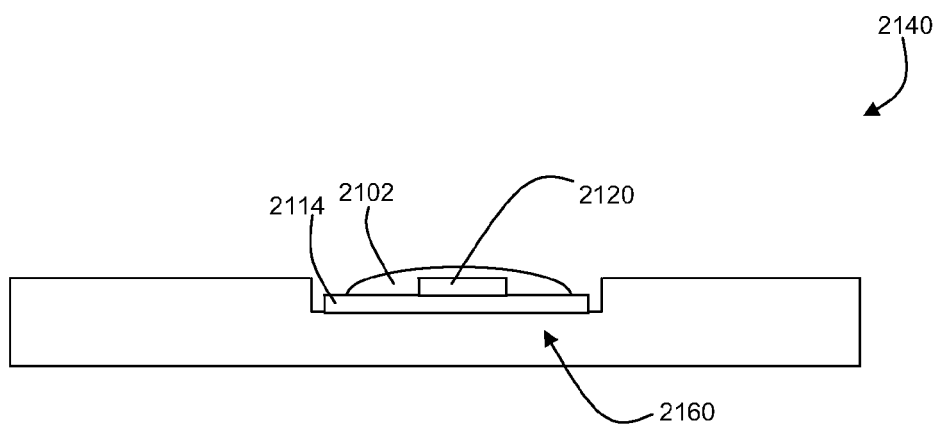
FIG. 26 is a schematic diagram of a dendritic tag bonded to a recess formed in an article.

In certain embodiments, dendritic tags can be positioned in recesses formed in articles to make removing the tags more difficult. FIG. 26 is a schematic diagram showing a dendritic tag 2140 positioned in a recess 2160 of an article 2112. By positioning tag 2140 in recess 2160, application of prying tools to peel the tag from the substrate is made more difficult. A variety of different recess cross-sectional shapes can be used, including square, circular, rectangular, elliptical, and polygonal. In some embodiments, recesses with overhanging edges can be used, as these can be particularly effective at preventing prying of the tag from the article.

Figure 27:
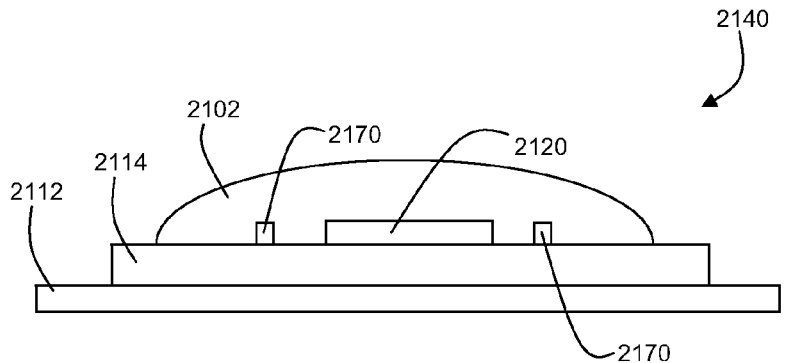
FIG. 27 is a schematic diagram of a dendritic tag that includes encapsulated reactive materials.

In some embodiments, additional materials can be included within the structure of dendritic tags to trigger destruction of the tags if tampering occurs. For example, FIG. 27 shows an embodiment of a dendritic tag 2140 bonded to an article 2112. Encapsulated by protective layer 2102 are dendritic structure 2120 and reactive materials 2170. Reactive materials 2170 can include any one or more of a variety of materials that react when exposed to the environment around tag 2140 (e.g., to air or water vapor in the environment). If an attempt is made to remove protective layer 2102 from tag 2140, reactive materials 2170 are exposed and react, destroying dendritic structure 2120 (e.g., by dissolving, discoloring, distorting, or destroying the morphology of dendritic structure 2120) so that it cannot be duplicated.

A variety of different reactive materials can be used as shown in FIG. 27, including solids, liquids, and gases. Examples of reactive materials that can be used include, but are not limited to, mild acids, oxidizers, and/or sulfidizing agents.

The reactive materials can also be arranged in a variety of ways in tag 2140. In some embodiments, for example, reactive materials 2160 are arranged in discrete regions, as shown in FIG. 27. In certain embodiments, reactive materials 2160 are dispersed within one or more components of the tag, such as within protective layer 2102. Tags with reactive materials can be fabricated using a multi-step encapsulation process following formation of the dendritic structures. First, the dendritic structure is coated to protect it, then a fragile blister that includes the reactive material is applied, and the dendritic structure on its substrate and the blister are encapsulated together. Alternatively, in some embodiments, the substrate is formed so that the reactive material is contained in a pocket or blister underneath the locations where dendritic structures are to be grown; once grown on top of the pockets or blisters, the dendritic structures and reactive materials are encapsulated together to form the tag.

Commercial Applications

The dendritic tags disclosed herein feature dendritic structures, no two of which are precisely identical. Because each dendritic structure is unique, a tag containing the structure can be affixed to an article to act as a "fingerprint" that uniquely identifies the article. Moreover, because dendritic tags can be economically fabricated in large volumes and protected against degradation, duplication, and removal, they are particularly well suited for use in commercial transactions, where identification and authentication of goods is of great importance to many commercial entities.

Figure 28:
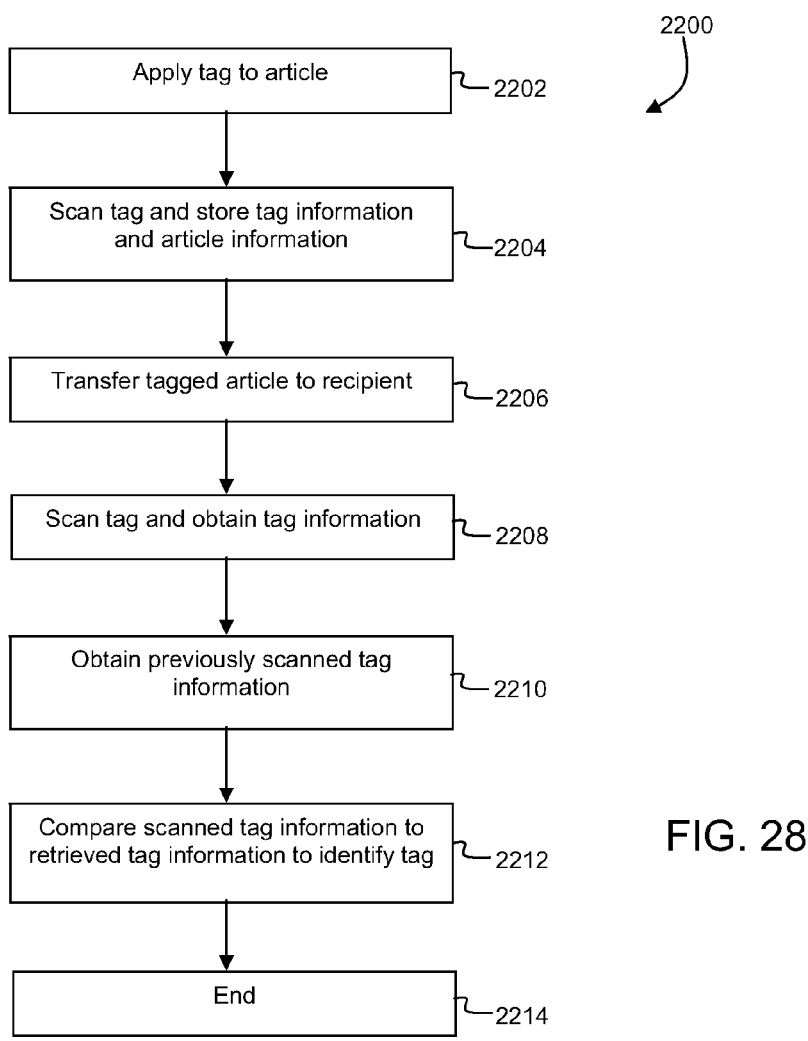
FIG. 28 is a flow chart that shows a series of steps for identifying and authenticating goods using dendritic tags.

FIG. 28 is a schematic diagram showing a flow chart 2200 that includes a series of steps for identifying and authenticating goods using dendritic tags. In a first step 2202, a dendritic tag (e.g., any of the dendritic tags disclosed herein) is applied to an article to uniquely mark the article. Any of the methods disclosed herein can be used to apply the tag to the article, including, for example, bonding the tag to the article using a layer of adhesive material.

After the tag is applied to the article, the tag is scanned in step 2204, and information about the tag that is obtained from the scan is stored, along with information about the article, in an electronic record. Methods for scanning a dendritic tag and for obtaining information about the tag from such scans are discussed in a subsequent section. Typically, the information about the tag includes information about one or more morphological features of the tag that can be used to rapidly identify the tag.

The electronic record that is created includes both the tag information and information about the article, such as the type of article, information about one or more of its properties (e.g., size, shape, color, manufacturing origin, lot or identity number), and information that is used for inventory control (e.g., an inventory control number, warehouse location, inventory check-in and/or check-out dates). Typically, the electronic records are stored in a database (e.g., a secure database) that is accessible over a network. A variety of different networks can be used to access the database, including WiFi networks, cellular data networks, wired networks, wide-area networks, and the internet.

Tracking of tagged articles can be performed for a variety of reasons. In some embodiments, for example, the tagged article is moving through a portion of a corporation's supply chain, e.g., from a storage facility to a manufacturing site, from a factory to a storage warehouse, from a factory to a retail location, from a factory or warehouse to a distribution facility, from a first factory to a second factory, or even between two locations at the same site, e.g., between two locations on a manufacturing or assembly line. In certain embodiments, the tagged article is being transferred from a seller of the article to a purchaser of the article. In some embodiments, the tagged article constitutes raw material for a manufacturing process, and is being transferred to an entity that is contracted to refine the raw material.

In the foregoing and other scenarios, the tagged article, after being scanned and the scan information stored, is transferred to the recipient of the article in step 2206. Then, in step 2208, the recipient scans the dendritic tag applied to the article in a manner similar to step 2204. The scan is analyzed to determine information about the tag, in a manner similar to the manner in which the tag information is determined in step 2204.

Next, in step 2210, the previously scanned tag information is obtained. In some embodiments, such as when the tagged article is being transferred between two points in a single entity's supply chain, both the sender and recipient of the tagged article will have access to the same secure database where the tag information is stored, and so the previously scanned tag information can simply be retrieved from the database. This scenario applies, for example, when the tagged article is transferred from an entity's manufacturing facility to a storage, distribution, or retail facility. When the tagged article is scanned upon receipt in step 2208, other information about the article, such as the article's location, condition, inventory information, and/or price, can be entered into the database to update the article's electronic record.

If the tagged article is transferred to a retail facility, the owner of the article (e.g., the seller) may allow potential buyers of the article to scan the tag applied to the article and to access the owner's database to obtain the previously-scanned information about the tag. This permits potential buyers to verify for themselves that the article is genuine.

If the tagged article is being transferred from one entity to another, separate entity (e.g., in a commercial transaction between a seller and a buyer, such as a transaction that occurs over the internet), the initial scan and determination of tag information would be performed by the seller, and the subsequent scan and determination of tag information would be performed by the buyer. In this scenario, the seller would have to be trusted to reliably provide the previously-determined tag information at a later date.

A variety of different methods can be used to ensure that the seller reliably provide this information. In some embodiments, for example, sellers can be certified by an independent monitoring authority and monitored for compliance with a business code of conduct. Buyers would therefore receive some assurance that sellers who receive this certification can be trusted to provide the previously scanned tag information.

Suppliers can also be certified by an independent authority. For example, in transactions where a buyer purchases an article from a first commercial entity (i.e., the seller) and the article is shipped directly to the buyer from a second commercial entity (i.e., the supplier), the supplier performs the initial scan of the tag applied to the article in step 2204. The buyer, who receives the article from the supplier, performs the second scan of the tag in step 2208. As described previously, the supplier is trusted to provide the previously scanned tag information on demand to verify the authenticity of the article.

Next, in step 2212, the previously scanned tag information (i.e., from step 2204, provided in step 2210) is compared to the scanned tag information determined in step 2208 to identify the tagged article. In some embodiments, the comparison can be performed by the recipient of the tagged article. For example, the same device used to scan the tag and determine the tag information in step 2208 can be used to compare the tag information to previously-determined tag information to identify the tagged article. The device can include an electronic processor executing software instructions that perform this comparison.

Alternatively, in some embodiments, the recipient of the tagged article can transfer the scanned tag information determined in step 2208 to a different device, such as a remote computer, that performs the comparison. The information can be transferred over a network, e.g., any of the previously described networks, or over a direct wired connection to the computer. The remote computer includes an electronic processor executing software instructions that perform the comparison. In certain embodiments, the remote computer is owned by the recipient of the tagged article. In some embodiments, however, the remote computer is owned by a separate entity, such as a transaction clearinghouse, that performs the comparison and reports the results to the recipient (and, optionally, to the seller or supplier of the tagged article).

In the event the identity of the article is confirmed by the comparison in step 2212, the transaction between the sender and recipient of the tagged article is concluded. However, if the identity of the article is not confirmed (e.g., the comparison of the previously determined tag information and the newer tag information does not yield a match), then the recipient and sender of the tagged article can take further steps to resolve the discrepancy. The steps can include, for example, return of the tagged article to the sender. In either scenario, the process shown in flow chart 2200 terminates at step 2214.

At steps 2204 and 2208 in flow chart 2200, the dendritic tag applied to the article is scanned to obtain tag information. The scanning step can be performed in a variety of locations, including on a manufacturing or assembly line, in a packing facility, on a shipping and/or receiving dock, in a warehouse, in a retail location, and in a buyer's home. As such, a variety of different devices can be used to scan and determine tag information. For example, in some embodiments, a dedicated scanning device is used. The scanning device can be an automated device that automatically scans tagged articles as they move through a manufacturing or warehouse facility. Alternatively, the scanning device can be a portable, handheld device.

Figure 29:
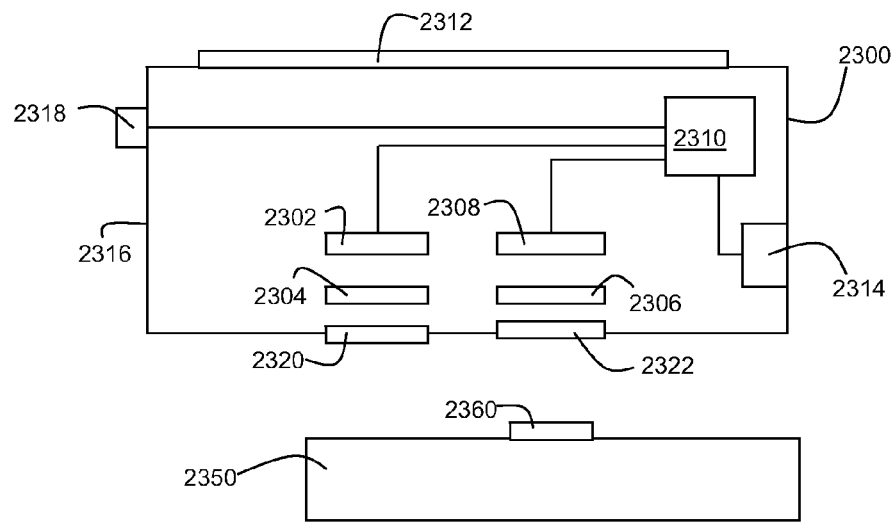
FIG. 29 is a schematic diagram of a scanning device for scanning a tagged article and determining tag information.

FIG. 29 is a schematic diagram of an embodiment of a scanning device 2300 for scanning a tagged article and determining tag information. In FIG. 29, an article 2350 with a dendritic tag 2360 applied thereto is positioned in proximity to scanning device 2300. Device 2300 includes an optional radiation source 2302, optional illumination optics 2304, optional imaging optics 2306, a detector 2308, an electronic processor 2310, and a receiver/transmitter 2314. These components are enclosed within housing 2316. Device 2300 can optionally include a display 2312. An activation switch 2318 is optionally mounted to housing 2316. Radiation source 2302, detector 2308, receiver/transmitter 2314, display 2312, and switch 2318 are connected to electronic processor 2310. Not shown in FIG. 29 is a power source (e.g., an AC power connection, or a portable power source such as a battery) that provides electrical power to the components of device 2300.

Scanning of tag 2360 is typically initiated when a user of device 2300 activates switch 2318. In embodiments where device 2300 is an automated scanner, initiation of a scan can occur, for example, when article 2350 passes through a specific location on a manufacturing or assembly line, triggering an external switch connected to electronic processor 2310.

When a scan is initiated, electronic processor directs radiation source 2302, if present in device 2300, to illuminate article 2350 (and tag 2360) with light through aperture 2320. Light reflected from tag 2360 (i.e., illumination light and/or ambient light) enters housing 2316 through aperture 2322, and is collimated and imaged by imaging optics 2306 onto an active surface of detector 2308. Detector 2308 captures an image of tag 2360 which is then transferred to electronic processor 2310. Electronic processor 2310 can optionally analyze the tag image to extract tag information. The image and/or the extracted tag information is transferred to a database by electronic processor 2310 using transmitter/receiver 2314.

When display 2312 is present in device 2300, electronic processor 2310 can also display a variety of messages on display 2312 to advise the user of device 2300 of the progress of the scanning operation. Messages can advise the user, for example, that a scan has been initiated, that the tag image has been acquired, and that tag information extracted from the image is being transferred to a database. As will be explained in greater detail subsequently, display 2312 can also be used to display messages alerting the user that previously scanned tag information is being obtained from a database, that the previously scanned tag information is being compared to more recently scanned tag information, and the results of the comparison to determine authenticity of the tagged article.

Radiation source 2302 can typically include any one or more of a variety of light sources such as, for example, incandescent, fluorescent, LED-based, and/or laser-based sources. Detector 2308 can include one or more imaging detectors, such as detectors based on a charge-coupled device (CCD) and/or detectors based on a complementary metal-oxide semiconductor (CMOS) array. Transmitter/receiver 2314 typically features components, including signal modulation and demodulation components, that permit communication of information, e.g., in packet form, over one or more wired or wireless networks or interfaces including, for example, WiFi networks, Bluetooth® networks, local area networks, wide area networks, the internet, cellular data networks, and direct wired connections to other devices.

In some embodiments, dendritic tags applied to articles can be scanned using mobile telephones. For example, an application running on a mobile telephone's electronic processor can use the telephone's built-in camera to acquire an image of a tag attached to an article. The telephone's electronic processor can optionally analyze the image to extract tag information, and then transfer the tag information and/or the image to a database over a wireless cellular data network using the telephone's built-in transceiver.

Because dendritic structures have considerable structural detail and complexity that can be used as unique identifying information, the standard camera in a mobile telephone may not be able to capture images with sufficient resolution to provide tag information of sufficient quality for purposes of authenticating tags. In certain embodiments, an enhanced imaging module can be used together with a mobile telephone to yield images with enhanced resolution.

Figure 30:
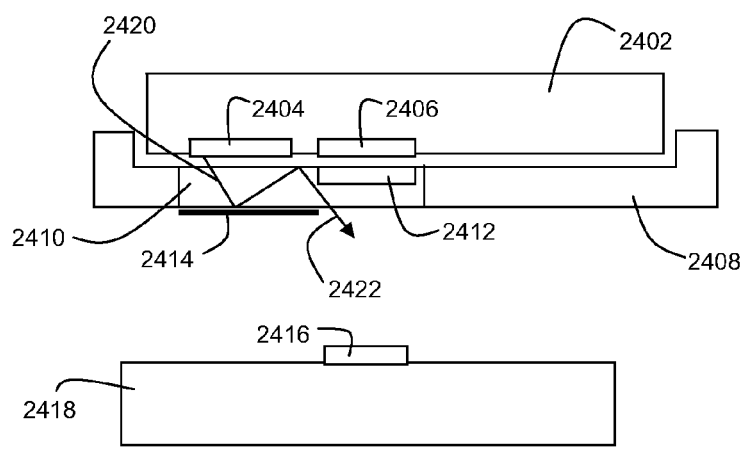
FIG. 30 is a schematic diagram of a detachable imaging module connected to a mobile telephone.

FIG. 30 is a schematic diagram showing a detachable imaging module 2408 connected to a mobile telephone 2402 for scanning tagged articles. Mobile telephone 2402 includes an image sensor 2406 and, optionally, a flash unit 2404. Module 2408 can connect to mobile telephone 2402 using a variety of mechanisms. In some embodiments, for example, module 2408 snaps onto the housing of mobile telephone 2402; the interference fit ensures that module 2408 remains in position relative to telephone 2402 while tagged articles are scanned. In certain embodiments, module 2408 can be attached to the mobile telephone 2402 using clips, temporary adhesives, and/or magnets.

Module 2408 includes a lens 2412 and, optionally, a waveguide 2410. Lens 2412 is positioned within module 2408 so that when module 2408 is connected to mobile telephone 2402, lens 2412 aligns with image sensor 2406. In this manner, lens 2412 can provide enhanced imaging of objects (i.e., enhanced relative to images that would be obtained using only the mobile telephone's image sensor 2406 and internal optics). Although lens 2412 is depicted as a single optical element in FIG. 30, more generally lens 2412 can include one or more optical elements. For example, in some embodiments, lens 2412 can be a compound lens that includes two or more optical elements. Each of the one or more optical elements of lens 2412 can be formed from a variety of materials including various amorphous optical glasses (e.g., fused silica), various crystalline materials (e.g., quartz, calcium fluoride), and various plastic materials (e.g., polycarbonates, acrylics).

Module 2408 also optionally includes a waveguide 2410. Waveguide 2410 is positioned within module 2408 so that when module 2408 is connected to mobile telephone 2402, illumination light generated by the mobile telephone's flash unit 2404 (if present) is coupled into waveguide 2412 and directed to be incident on an object to be imaged. Waveguide 2410 can be formed from a variety of optical materials including, for example, any of the materials disclosed above in connection with lens 2412.

Although the foregoing optical elements are part of module 2408 in FIG. 30, in some embodiments, some or all of the optical elements can be built into the mobile telephone housing. For example, lens 2412 and/or waveguide 2410 can be integrated within the housing of mobile telephone 2402.

In some embodiments, certain exterior surfaces of waveguide 2410 can be coated with reflective optical materials to enhance the confinement and guiding of light from flash unit 2404 within the waveguide. For example, in FIG. 30, a reflective coating 2414 is applied to a portion of the downward-facing surface of waveguide 2410. The uncoated surfaces of waveguide 2410 can function as apertures through which light can be coupled into waveguide 2410 (e.g., light 2420 generated by flash unit 2404) or coupled out of waveguide 2410 (e.g., light 2422 that is incident on dendritic tag 2416 applied to article 2418). In general, a variety of reflective materials can be used to coat surfaces of waveguide 2410. Suitable examples include, but are not limited to, metallic materials such as aluminum, silver, gold, and nickel, and reflective dielectric multilayer materials.

Although waveguide 2410 is rectangular in shape in FIG. 30, more generally, waveguide 2410 can have a variety of shapes. In some embodiments, for example, waveguide 2410 can be tapered laterally in the direction toward lens 2412 (i.e., in the direction from left to right in FIG. 30). Tapering waveguide 2410 in this manner can produce brighter illumination over a smaller spatial region by confining the guided light rays spatially. Enhanced illumination can be useful, for example, when imaging tagged articles in environments where ambient light is low.

Scanning of dendritic tag 2416 is typically initiated by a user of mobile telephone 2402. In some embodiments, the user can acquire one or more images of dendritic tag 2416 using the mobile telephone's software. That is, by connecting module 2408 to mobile telephone 2402 and then activating the telephone's image capture software, images of sufficient quality for dendritic tag analysis can be obtained. Alternatively, in some embodiments, a specialized application can be provided on mobile telephone 2402. By activating an on-screen control provided by the application, the user can initiate image capture by sensor 2406. Images of tag 2416 obtained using either of the foregoing methods can be stored in mobile telephone 2402 (i.e., in a memory unit of the telephone and/or in an on-board storage unit, such as a flash memory device) for further processing.

In some embodiments, imaging of dendritic tag 2416 can be facilitated by providing an optical element such as a lens on the surface of tag 2416. FIG. 31A is a schematic diagram of an article 2418 that includes a dendritic tag 2416. Dendritic tag 2416 includes a dendritic structure 2430 enveloped in a protective layer 2432. To facilitate imaging of dendritic structure 2430, a lens 2434 is formed in protective layer 2432. Lens 2434 can include a variety of different types of lenses including, for example, curved lenses (i.e., concave and/or convex lenses) and Fresnel lenses.

In general, lens 2434 is integrally formed in protective layer 2432. Various techniques can be used to form lens 2434. In some embodiments, for example, lens 2434 can be molded into protective layer 2432 as protective layer 2432 is applied over dendritic structure 2430. Lens 2434 can be molded, for example, using a form, having the inverse shape of the lens, which is pressed into the protective layer material prior to hardening so that the material takes on the shape of the lens. In certain embodiments, lens 2434 can be formed in protective layer 2432 after the protective layer has been applied over dendritic structure 2430. Various methods can be used to form lens 2434 including, for example, mechanical cutting and/or grinding of protective layer 2432, ion etching of protective layer 2432, liquid-phase etching of protective layer 2432, and/or laser ablation of protective layer 2432. Computer-based machining systems that include three-axis robotic positioning systems can be used to accurately etch, cut, or grind protective layer 2432 using the foregoing methods.

In some embodiments, to facilitate imaging of dendritic structures, a lens can be applied to the protecting layer that encapsulates the dendritic structure in a dendritic tag. FIG. 31B is a schematic diagram showing an article 2418 that includes a tag 2416. Dendritic tag 2416 includes a dendritic structure 2416 and a protective layer 2432. Further, lens 2436 is applied to a surface of tag 2416. Lens 2436 can include a variety of different types of lenses including, for example, curved lenses (i.e., concave and/or convex lenses) and Fresnel lenses. Various methods can be used to attach lens 2436 to protective layer 2432. In some embodiments, for example, lens 2436 is glued to protective layer 2432 using an adhesive material. The adhesive material can, for example, be an optical adhesive.

In certain embodiments, dendritic structures can be "imaged" electronically. For example, a capacitive array detector with a protective coating that functions as a dielectric layer between the array detector and the dendritic structure can readily be used to map the surface relief of the dendritic structure. Using such methods, features that are "higher" (e.g., extend further in a direction perpendicular to the general plane of the dendritic structure) have higher capacitance values, as they are closer to the capacitive array. Examples of methods for capacitive reading of dendritic structures are described above.

In some embodiments, dendritic tags can be used to secure articles against tampering. Tampering can include, for example, attempts at altering the contents of a package, improperly modifying an article, and reverse-engineering an article. The dendritic tags disclosed herein can make these actions difficult, prohibitively expensive, and difficult, so that attempts to do so are effectively discouraged.

In anti-tampering applications, a dendritic tag is applied to secure an article and scanned into a secure database, as discussed above, so a one-to-one mapping exists in the database between the specific structure of the tag and the article. The tag is applied to the article in the form of a seal over an opening in the article's housing or packaging so that unauthorized access to the interior of the article, e.g., disassembly of the article, will damage the tag. When the tag is re-scanned for purposes of identification, the damage to the tag will have altered its structure in a manner that prevents successful identification. Further, the complex, three-dimensional structure of the tag ensures that it cannot easily or economically be duplicated. Thus, tampering with the article cannot be masked by fraudulent copying of the dendritic tag seal. At the same time, authorized maintenance performed on the article can be accompanied by replacement of the tag with a new tag, which is scanned into the database and associated with the article, replacing the record of the old tag.

Dendritic tags can be placed in a variety of ways to enhance anti-tampering protection, depending upon the nature of the article to be secured. For example, for articles that include a casing or housing, tags can be positioned across a break or seam in the casing (either externally or internally) so that opening of casing, e.g., by removing an access panel, will break, damage, or distort the tag. For fasteners such as screws, bolts, and rivets that are installed in an article, tags can be positioned on the head of the fastener so that significant force cannot be applied to the fastener without damaging the applied tags. The tags can also be applied such that they bridge the fastener head to a surface, so that removal of the fastener would break the tag.

In some embodiments, where the article includes a socket (e.g., an electrical and/or data socket such as a USB port), the tags can be applied across the socket either internally or externally to secure the socket. If a member, such as a connector, is inserted into the socket, the tag will be damaged. Similarly, a tag can be applied to bridge the socket and an inserted connector so that if the connector is removed, the tag will be damaged. In certain embodiments, where the article includes a valve, a switch, or a similar control device, tags can be applied to the control device so that if the setting of the device is changed, the applied tag will be damaged.

As discussed above, in some embodiments, dendritic structures in tags can be fabricated so that they are degraded by exposure to light, heat, or various chemical substances. These properties can be applied to secure tagged articles against tampering. For example, silver dendritic structures, when exposed to light, typically partially dissolve into electrolyte films, which results in significant distortion of the structures. A dendritic tag with a silver dendritic structure can therefore be applied to secure a critical component of an article against tampering, e.g., by positioning the tag inside the critical component so that opening the component's housing would expose the tag to light. Scanning of the exposed tag would reveal the distorted dendritic pattern, indicating possible tampering with the component.

In certain embodiments, a dendritic tag applied to secure an article can be chemically sensitized so that it reacts with substances that are commonly used to etch through coatings or housings of the article. If the region of the article where the tag is applied can be evacuated, the tag can be sensitized to react in air. Reaction of the tag in air or to etching substances will distort the tag's dendritic structure, indicating possible tampering with the article.

In some embodiments, a dendritic tag applied to secure an article can be fabricated in a manner such that when heated, the tag distorts, causing disruption to its dendritic structure. For example, the dendritic structure can be supported by a material (e.g., a plastic material) which exhibits hysteresis upon heating, and does not return to its original size and shape. Distortion of the tag, such as when the article is heated to cause damage or obtain access thereto, is indicated by the disruption to the tag's dendritic structure.

In certain embodiments, the dendritic tags disclosed herein can be used to track and secure a wide variety of foodstuffs, both manufactured and harvested. Spoilage and contamination of food, and food poisoning via ingestion of spoiled and/or contaminated food, are worldwide problems that can affect large numbers of people in relatively concentrated geographic regions when delivery of such foodstuffs occurs. For purposes of tracking food inventory to its source, existing RFID tags are relatively costly, which precludes tagging each food item. Instead, tagging generally occurs at the pallet or shipment level. As a consequence, the granularity of tracking is relatively coarse; individually packed items typically cannot be tracked.

The cost of RFID tags and their accompanying tag-reading technology has delayed deployment for purposes of food tracking. At present, only a few major producers or suppliers have incorporated the technology into their supply chains. This patchwork deployment allows spoiled and contaminated foodstuffs to be offered for sale, and makes tracking such items difficult, since many will originate from suppliers who have not implemented reliable tracking technologies.

In contrast, the dendritic tags disclosed herein can be used to track and secure a wide variety of food items at low cost, using methods that are easy, straightforward, and reliable to implement. Using the tags disclosed herein to track such items increases the speed and efficiency of tracking, and also provides tracking results of significantly higher granularity than other methods, even allowing tracking of individually packed items and/or individual items within packages. As the tags are highly economical to produce and unique, then can be attached to individual food items, to subsets of items in a batch, and/or to packaging.

Using readily available devices (e.g., a smartphone-based scanner, or a dedicated handheld scanner), food inspectors, suppliers, wholesalers, and even consumers can scan the tags applied to food items to obtain information about the items stored in database records. The information can include recall notices, information about the origin, date of manufacture, date of packaging, freshness, and even health-related information such as warnings about consuming the food items together with incompatible items such as certain medications. A software application implemented on the smartphone or handheld scanner can be linked to the database to retrieve and display the information to the operator of the smartphone or scanner.

In certain embodiments, "expiring" dendritic tags can be fabricated to provide additional information to food handlers, sellers, and consumers. For example, through judicious choice of materials, dendritic tags that are destroyed by similar biochemical environments that cause food spoilage can be fabricated. Thus, when the food items to which the tags are applied begin to spoil due to their biochemical environment, the same environment causes the tags applied to such items to degrade so that they can no longer be successfully scanned and used for identification. A food seller, handler, or consumer scanning such a tag can rapidly determine that the food associated with the tag has spoiled due to the apparent degradation of the tag.

As discussed above, certain fabrication methods can be used to prepare dendritic tags that expire on their own. For example, tags that include a mild corrosive material can eventually expire as the corrosive material penetrates its blister pack and dissolves at least a portion of the dendritic structure in the tag. These dendritic tags expire on their own after a certain time period, which can be selected during fabrication by choosing the amount and concentration of the corrosive material and the nature of the blister pack or other material that encapsulates the corrosive material. Such tags can be applied to food items to serve as a "freshness" indicator, with their expiration periods chosen to correspond to the expected period after which the tagged food items are no longer ideal for consumption.

Figure 41:
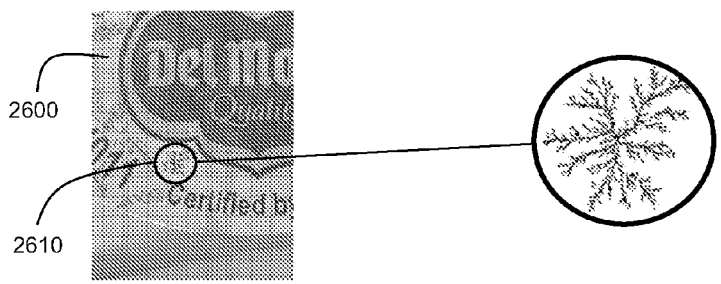
FIG. 41 is a schematic diagram of a dendritic tag applied to a product label.

In some embodiments, a dendritic tag can be applied to a food item by directly incorporating dendritic structures into the Price Look Up (PLU) sticker attached to the food item. FIG. 41 shows a PLU sticker 2600 with a dendritic structure 2610 applied. Methods for growing dendritic structures directly on paper and other porous substrates, as disclosed previously, can be used to incorporate the dendritic structures into PLU stickers. PLU stickers are numbered, and assigned and administered globally by the International Federation for Produce Standards (IFPS), which maintains a database of PLU sticker information. Records in the PLU database can be augmented by, or linked to, additional information relating to specific food items that bear PLU labels with dendritic structures applied. Thus, while originally intended to speed checkout and provide better inventory control for supermarkets, PLU codes in combination with dendritic tags can also be used to provide enhanced tracking of individual food items and greater quality accountability at low cost. Further, while PLU codes alone only cover classifications of food items (e.g., conventionally grown apples vs. organically grown apples), combining PLU labels with dendritic tags yields item-specific identifiers that allow individual food items to be identified, checked, and traced back to their point of manufacture or harvesting.

In certain embodiments, dendritic tags can be applied directly to food product labels. The dendritic structures can be fabricated directly on the labels, using the label material (typically paper) as a substrate in the fabrication process, as discussed above. Alternatively, dendritic tags can be fabricated separately and then applied to food product labels using the methods discussed above. FIG. 41 shows an example of a food label 2600 with a dendritic tag 2610 applied to the label.

By appropriate selection of materials, fabricated dendritic tags can even be safe for consumption by humans and animals, so that dendritic tags can be applied directly to food items (e.g., produce, including fruits and vegetables, and various meat products) and consumed when the food items are consumed. As an example, dendritic tags that include dendritic structures formed from silver are consumable; the amount of silver in such a structure is small and non-toxic, and may even have beneficial anti-bacterial properties. Once applied to food products, dendritic tags can be scanned using the optical and/or electronic methods described is other sections of this disclosure.

An important advantage of dendritic tags relative to other tracking technologies is radiation hardness. Cobalt-60 is frequently used for gamma-ray irradiation of a variety of food and other products for sterilization purposes, including red meat, poultry, spices, cosmetic ingredients, and medical devices. Cobalt-60 sources typically produce high energy gamma photons (e.g., 1.17 MeV and 1.33 MeV) that ionize the irradiated material, liberating electrons that disrupt the molecular structures and DNA of living organisms such as bacteria, causing cell death. Typical dose ranges for various sterilization applications are as follows:

| | |
|---|---|
| Disinfestation treatment of fruits and vegetables for export | 0.1-0.5 kGy |
| Pathogen reduction in meat and poultry | 1-3 kGy |
| Sanitation of spices | 5-15 kGy |

Certain conventional electronic tracking technologies are moderately to severely damaged by ionizing gamma ray radiation at the dose ranges listed above. In particular, many RFID chips are damaged by such radiation. Although certain RFID chips are available that are purposefully fabricated to withstand such doses, these special chips are significantly more expensive than conventional chips. In contrast, the dendritic tags disclosed herein are essentially impervious to gamma ray irradiation, as they are not biological in nature and do not contain electronic circuit components. As a result, such tags are highly compatible with food sterilization processes involving gamma ray irradiation, and can be applied directly to food items and/or packaging before irradiation without suffering degradation during sterilization.

In some embodiments, the dendritic tags disclosed herein are used to counteract tampering and counterfeiting in the pharmaceutical industry, and the ensure quality control. While both of these problems are significant at present, counterfeiting is the most prevalent problem. Counterfeit and/or sub-standard medicines can have severe medical repercussions, including death, particularly since many medicines are administered to vulnerable individuals who have existing health problems. Proposed technologies for tracking individual drugs and packages in the pharmaceutical industry include edible microscopic silica-based barcodes. However, such barcodes are challenging to manufacture and handle, and require specialized scanning technology.

Figure 42:
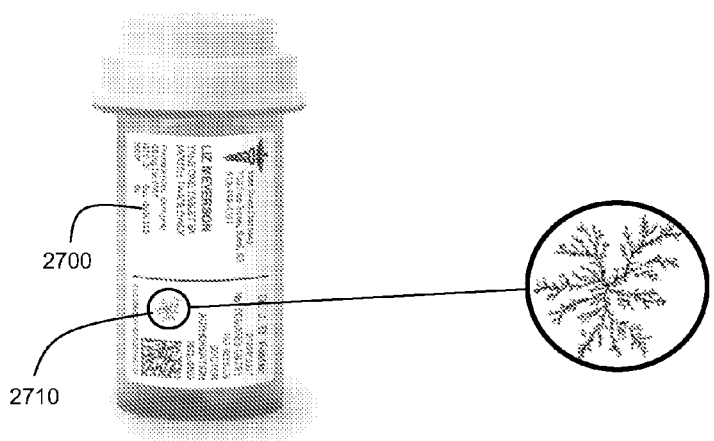
FIG. 42 is a schematic diagram of a dendritic tag applied to a container of a pharmaceutical product.

The dendritic tags disclosed herein can be applied to a wide variety of pharmaceutical products and medical devices and used for identification so that such products and devices can be tracked from their origin, and tampering and counterfeiting can be curtailed. In some embodiments, as shown in FIG. 42 for example, a label 2700 applied to a drug container can include a dendritic tag 2710 that can be fabricated directly on label 2700, or fabricated separately and applied to label 2700. Such tags can be applied to pharmacy-dispensed packaging, to original packaging at manufacture, to shipping containers, and to a variety of labels applied to the products at intermediate points from the point of manufacture to the point of consumption. In certain embodiments, consumable dendritic tags, disclosed above for use with food items, can be applied to individual pills, capsules, and vials so that individual units of pharmaceutical products can be identified.

As described above in connection with other applications, the application of dendritic tags to pharmaceutical products (e.g., drugs, cosmetics) and medical devices allows such products and devices to be tracked throughout their product cycle by shippers, handlers, and consumers to prevent tampering, counterfeiting, and the consumption or use of expired or substandard pharmaceuticals and medical devices. Dendritic tags are applied to such products at the point of manufacture and their information entered into a secure database. Shippers, handlers, and consumers can scan the applied tags and connect to the database to verify the identity of the tagged pharmaceuticals and medical devices, and to retrieve other stored information about the tagged products.

When the dendritic tags are applied to medical devices such as syringes, pacemakers, stents, valves, and other implants, the hardness of the dendritic tags to Cobalt-60 gamma ray irradiation provides an important advantage, as discussed above. Gamma rays generated by Cobalt-60 sources are used to sterilize many different medical devices. Doses used to sterilize medical devices are typically much higher than those used to sterilize food items; some examples are shown below:

| Sterilization of pharmaceuticals, cosmetics | 5-15 kGy |
| Sterilization of medical devices | 25-35 kGy |

Because they are non-biological and do not contain electronic components, the dendritic tags disclosed herein remain largely unaffected even by these higher radiation doses. As a result, they are well suited for tracking articles such as medical devices that are subject to sterilization procedures.

In addition to applying dendritic tags to a wide variety of products for identification and tracking purposes, dendritic tags can also be integrated into product container seals and/or closures to prevent tampering with the product inside the container. By integrating the tags into the seals and/or closures, tampering with the product by opening or removing the seals/closures damages the dendritic tags. The damage to the tags is revealed when the tags are scanned, and the product can be rejected as compromised.

Figure 43:
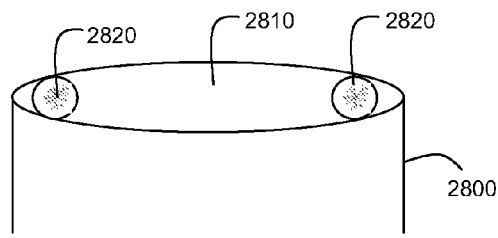
FIG. 43 is a schematic diagram of a dendritic tag applied to a container seal.

One or more dendritic tags can be used for tamper prevention. FIG. 43 is a schematic cross-sectional diagram showing a product container 2800 with a seal 2810 covering the opening into the container. Two dendritic tags 2820 are positioned at the peripheral edges of seal 2810 where it is attached to the opening of container 2800. Opening container 2800 by mechanical removal of a portion of seal 2810 will lead to damaging of tags 2820, which damage is revealed when the tags are scanned. Moreover, because the dendritic structures in the tags have three-dimensional structure as discussed above, producing a duplicate tag by counterfeit methods to mask the tampering would be very difficult.

In some embodiments, by judicious choice of materials, dendritic tags can be fabricated that are degraded by one or more of exposure to heat, exposure to light, and exposure to certain chemical substances. As an example, dendritic structures formed of silver can partially dissolve into an electrolyte film when exposed to light, thereby significantly distorting their structure. Such light-sensitive dendritic tags can be incorporated into packaging materials for products such that scanning of the tags, upon opening of the packaging materials under suitable conditions (e.g., in the absence of light), can reveal whether the packaging has been opened prematurely, as premature opening will have led to damage to the dendritic structure in the tags. Such light-sensitive tags can also be used as product quality indicators for products that cannot withstand prolonged exposure to light. Damage to light-sensitive dendritic structures in the tags would suggest that the tagged products had been exposed to light at some point.

Heat-sensitive dendritic tags, which are fabricated from materials that deform when heated above a certain temperature threshold, can be used in a similar fashion. In particular, such tags can be applied to prevent the use of heating methods to tamper with product packaging, as the applied heat will damage the dendritic structures in the tags. Further, for products that are heat-sensitive, the applied tags can reveal when the products have been exposed to potentially damaging temperatures, even if the exposure was accidental in nature and not due to tampering.

Dendritic tags that are degraded by exposure to certain chemicals can also be used for both anti-tampering and product quality applications. In some embodiments, for example, dendritic tags that are chemically sensitized to react with a variety of substances, including solvents used to dissolve product packaging adhesives, can be applied to packing materials. The use of such substances damages the dendritic structures within the tags, which is readily observed upon scanning the tags. Products with tags that are damaged can be flagged as potentially having suffered tampering. For even greater security in some applications, dendritic tags that are sensitive to one or more components of air can be fabricated and applied to the interior of air-tight product containers, which can be evacuated or filled with inert gas prior to shipping. Opening such a container prematurely (i.e., tampering with such a container) will expose the tags to air, causing a chemical reaction that damages the dendritic structures in the tags. Such damage is readily observed when the tags are scanned.

Moreover, for products that are air sensitive or sensitive to other chemicals, dendritic tags with the same chemical sensitivity can be applied, e.g., on the inside of product packaging. If damage to the tags is revealed by scanning, the product can be flagged as possibly being damaged due to chemical exposure.

An important application for dendritic tags involves enhancing the security of a variety of identification and security access cards, including driver's licenses, government and/or military identification, employee identification, student identification, building and/or room access cards, computer access cards, passports, birth certificates, software access restrictions, and similar trusted identification and access cards, documents, and barriers.

Current security access technologies range from simple keys to electronic key cards for physical access, and password schemes and fingerprint scanners for computer access. Conventional mechanical keys are easy to duplicate and are subject to loss and theft. Key cards, although they implement a variety of different technologies (e.g., magnetic stripe encoding, RFID and/or NFC chips) can also be duplicated or read using a variety of widely available technologies (e.g., magnetic stripe data is easily scanned, and data from RFID and/or NFC chips can be hijacked during transfer using appropriate scanners). Passwords used to access physical locations and computer systems can be stolen via keystroke logging software, and if too simple, can be discovered using a variety of brute force attacks. Moreover, passwords are easily disseminated among multiple individuals, making access restrictions more difficult to monitor and necessitating frequent password changes which are inconvenient. Fingerprint scanners can be relatively simple to defeat and, as they implement optical scanning technology, may require more frequent maintenance and calibration as components of the system age.

The dendritic tags disclosed herein provide an alternative or a supplement to the various technologies discussed above for enhancing security in a wide variety of applications. Dendritic tags are easy to read and yet are difficult to duplicate due to their inherent complexity, which is due to natural stochastic electrochemical growth processes. Branching fractal dendritic structures are inherently complex from millimeter to sub-micron length scales and are also three-dimensional in nature. These complex shapes coupled with a tough protective layer over the relatively fragile structures make them difficult to dismantle and copy economically.

The dendritic structure in each tag defines a "code" through its specific physical structure that is unique to the tag. When stored in encrypted form in a database, the code can uniquely identify the article to which the tag is attached, which allows access restrictions to be implemented. Scanning the tags does not involve the generation of detectable RF signals, insulating the tags from electronic eavesdropping.

The tags are inexpensive to produce and can be applied at minimal cost to a wide variety of articles. Dendritic tags can be very small (e.g., a few millimeters in diameter), and therefore consist of very little material. Moreover, the tags can be mass produced using roll-to-roll techniques at minimal unit cost. Although dedicated scanners can be used to read the tags, they can also be readily scanned using conventional smartphones either in unmodified or modified form, making use of the smartphone's inherent communication capabilities to securely access remote databases. Tags that have been damaged or lost can have their records easily purged from databases, making future attempts to use, duplicate, or transfer the tag all but impossible. Further, they can be replaced by newer tags which can be scanned and readily entered into databases as replacements.

In addition to documents and identification/access cards, wristbands, and other similar key replacements, dendritic tags can be applied to a wide variety of personal items such as watches, wallets, mobile phones, jewelry (e.g., rings, bracelets, pendants), credit cards, and business cards. Due to their small size (e.g., a few millimeters in diameter), they are unobtrusive, and yet can be readily scanned. Moreover, coating materials used to protect the dendritic structures in the tags render the tags mechanically robust and resistant to damage and environment-induced degradation. If damage to a tag does occur, it can be replaced rapidly and at low cost with another tag.

As discussed above, dendritic tags can be fabricated on a wide variety of substrates, including various paper and plastic substrates. In particular, dendritic structures adhere well to porous materials such as paper, and can be directly applied to paper documents during printing of the documents. Thus, the methods disclosed herein can be used to fabricate dendritic structures directly on a wide variety of different types of identification cards and documents. Alternatively, or in addition, the fabrication methods disclosed herein for dendritic tags can be used to prepare tags which can then be applied to cards and documents. Single or multiple dendritic structures can be applied, where multiple structures/tags can provide even greater security in certain circumstances. Further, dendritic tags can be grown directly on, or applied to, other items of identification such as wristbands, key fobs, and labels, and to personal items such as watches, wallets, and jewelry.

Cards and documents with dendritic tags are scanned when the bearer passes through an entrance or checkpoint. In addition to the information that is typically read from such cards and documents (e.g., the bearer's identity, photograph, fingerprints, etc.), the cards and documents are scanned (e.g., using a scanner of the type disclosed herein, which can also be mounted to a doorway frame or integrated into a tabletop scanning unit) and the identity of the cards and documents are checked by verifying information derived from the images of the dendritic structures against database records.

Dendritic tags used for such purposes significantly enhance the security of cards and documents. Because the dendritic structures in the tags are three-dimensional in nature, fabricating accurate copies of the structures is very difficult. As a result, duplication and/or counterfeiting of such cards and documents is much more difficult than for conventional cards and documents, which typically employ anti-counterfeiting technologies such as holograms that are comparatively much easier to fabricate fraudulently.

In addition to cards and documents that relate to the identity of the bearer, dendritic tags can also be used to secure a variety of other documents against tampering and counterfeiting. For example, as discussed above, currency, bearer bonds, cheques, contracts, and other types of commerce-related documents and legal documents can be tagged, so that attempts to alter or copy such documents can be detected by scanning the applied tags.

Access schemes based on identification via dendritic tags can be implemented in a variety of ways. In some embodiments, for example, a user (e.g., a person who has been granted access to a physical location, to a piece of equipment or software) can be issued multiple tags. The issued tags are uncommitted, e.g., they have not been associated in an encrypted and secured database with the user.

To "activate" his access, the user affixes one or more of the tags to an access card or personal object. For example, if the user habitually wears a watch, a dendritic tag can be applied to a portion of the watch that is easy to scan. As another example, the user can apply a dendritic tag to a credit card or other card-based item of identification, or to a dedicated access card, which can implement other security features as well (e.g., photo identification, a password code). Multiple tags can be applied, e.g., to provide access to different physical locations or systems. Alternatively, single tags can be used as universal access keys to all locations and systems to which a user has been granted access.

After application, the tag (or multiple tags) is initially scanned and information associated with the tag is entered into a secure database. The information can include the date on which the tag was scanned, the location at which the tag was scanned, the article to which the tag was applied, a variety of information about the user (e.g., name, photographic identification, access restrictions and permissions). The information can include an image of the tag. The information can also include one or more features derived from analysis of images of the tag, as will be discussed in greater detail subsequently. The analysis can be performed by a device operated by the user and information about the features entered into the database. Alternatively, the user can transmit one or more images of the tag to a remote computing device (e.g., the same device that hosts the database), and the remote device can perform the analysis to obtain feature information, and enter the feature information into the database.

After the information about the tag is entered into the database and the record associated with the tag is activated, the object to which the tag is attached can be used as an access device (e.g., a key) to gain access to secured locations, secured equipment and/or software, to lock and unlock doors, to arm and disarm security systems, and for a variety of other security-related applications. The tag can be scanned during such applications using a mobile telephone, for example, or using a dedicated scanner, which can be housed in a physically secure location. Identification of the user bearing the article to which the tag is attached can be performed in one or more steps, for exampling by using passwords, PINs, pre-selected verification images, single-use time-limited access codes generated securely and transmitted to the user. In some embodiments, these additional identification steps can be performed only once, e.g., upon initial activation of the dendritic tag. Alternatively, in certain embodiments, the steps can be performed periodically, or even each time the tagged article is scanned. In general, the nature and extent of the additional security measures implemented can be selected upon consideration of factors such as the level of security desired and user convenience.

The dendritic tag (or tags) applied to the article is scanned when access to a location or to a piece of equipment or software is required, or another security-related event occurs. Information derived from the scan (e.g., features derived from analysis of one or more images of the tag) is compared to secure database records to identify the bearer of the article with the tag. If a match is found and the bearer's security permissions are appropriate, access is granted (e.g., a "unlock" signal is sent to a door or to equipment, or software access is permitted). Dedicated scanners can communicate with remote secured databases via wired and/or wireless communication interfaces to transmit information, unlock codes, and other signals. When a mobile telephone is used to scan the dendritic tag, communication between the phone and a remote device (e.g., a remote server that hosts the database) can occur using wireless network protocols (e.g., via WiFi networks) and/or using mobile telephone networks. In some embodiments, a version of the secured database can be hosted directly on the scanner or mobile telephone; this hosted version can be automatically updated by periodic synchronization with a remote computing device. Communication between the scanner or mobile telephone and the mechanism that secures the location or equipment (e.g., a lock) can occur via encrypted wireless connections on networks such as Bluetooth® and/or WiFi networks, for example.

In some embodiments, databases can also store a variety of settings associated with each dendritic tag. Because each tag record is associated with a particular user, various user preferences can be stored within the tag's secured record. Such preferences can include, for example, temperature and/or lighting levels in rooms the user is permitted to gain access, and various software settings within software programs the user can operate. In certain embodiments, the database records can also include tracking information such as the date, time, and location at which the tag is scanned and security access requested. This information can be used to provide detailed reports on the user's attempts to gain access.

If a dendritic tag applied to an article is damaged, lost, or stolen, or if the tag is to be updated (e.g., to provide enhanced security or to grant the user a different set of security permissions), the record associated with the old tag can be purged from the database, a new tag can be applied to the article (or to a different article), and the new tag can be scanned and its information entered into the database. Once the secure record associated with the tag is activated (e.g., following the steps described above), the newly tagged article can be used for secure access in the same manner as before.

Dendritic Tag Authentication and Identification

Dendritic structures of various types can be used in tags for identification and authentication of articles. For example, general types of dendritic structures that can be used include: radial, in which trunks of the dendritic structure extend from a central growth point; parallel, in which multiple trunks extend approximately in parallel from a common plane or surface; and multiple, in which the dendritic structure includes several radial and/or parallel structures. FIGS. 32A-C show examples of radial, parallel, and multiple dendritic structures, respectively.

Each of the structures shown in FIGS. 32A-C features multiple trunks, each of which in turn has its own pattern of branches that form a unique fractal pattern in the plane of FIGS. 32A-C. In addition, each dendritic structure is three-dimensional, with fractal structure in the dimension perpendicular to the plane of FIGS. 32A-C. The fractal pattern in the plane of FIGS. 32A-C typically resembles classical dendrites with a tree-like geometry. In the perpendicular dimension, the fractal structure can be dendritic, or may more closely resemble a terrain-like (e.g., mountain-like) form. FIGS. 33A and 33B show scanning electron micrographs of dendritic structures with tree-like and terrain-like fractal structure in the perpendicular direction, respectively.

In general, dendritic structures that are grown in a liquid electrolyte solution which overlies an electrode and supplies ions from above the electrode will have a tree-like fractal structure in the perpendicular direction, extending into the liquid electrolyte. In contrast, dendritic structures that are grown on a solid electrolyte will have a terrain-like fractal structure in the perpendicular direction, as ions are supplied from below the growing structure and build-up the structure from its base. The fractal nature of both tree-like and terrain-like geometries ensures that the general shapes of both types of dendritic structures does not vary with scale, so that the structures appear invariant in both low and high magnification images.

The height of features extending in the perpendicular direction for both tree-like and terrain-like dendritic structures is influenced by growth conditions such as the applied potential difference, the applied current, and the growth time. For terrain-like dendritic structures, the height of features extending in the perpendicular direction can also be influenced via the selection of specific solid electrolyte compositions. For example, using a germanium-rich chalcogenide glass doped with silver for the solid electrolyte yields dendritic structures with features that extend further in the perpendicular direction than using a chalcogen-rich material for the solid electrolyte.

Figure 34A:
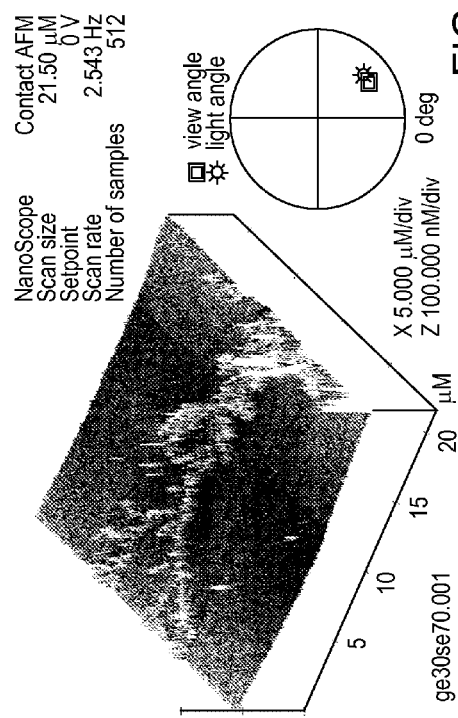
FIGS. 34A-34B are electron micrographs of dendritic structures grown on different solid electrolytes.
Figure 34B:
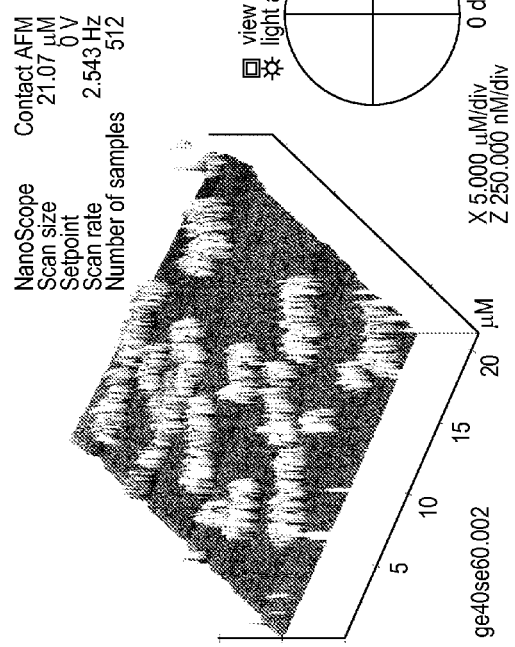

FIGS. 34A and 34B show electron micrographs of dendritic structures grown on different solid electrolytes. The dendritic structure of FIG. 34A was grown on a chalcogen-rich solid electrolyte. The maximum height of features extending in the perpendicular direction in FIG. 34A is approximately 20 nm. The dendritic structure of FIG. 34B was grown on a germanium-rich solid electrolyte, and the maximum height of features extending in the perpendicular direction is approximately 100 nm. Increased growth in the perpendicular direction is commonly observed in solid electrolytes in which the metal-rich phases are distinct and separate in the solid electrolyte. This tends to occur in chalcogen-poor materials, e.g., $Ge_xSe_{1-x}$, where $x<0.33$ (e.g., $0.33<x<0.5$).

After a dendritic tag that includes at least one dendritic structure has been applied to an article, the dendritic tag can subsequently be used to identify the article. Identification can be desirable, for example, after the article has exchanged hands, been stored in a storage facility, or otherwise remained un-inspected for a period of time.

Figure 35:
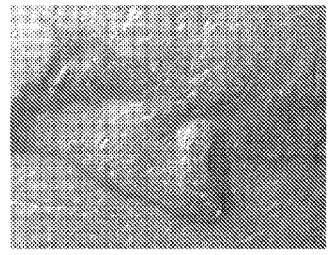
FIG. 35 is a flow chart showing a series of steps for identifying an article tagged with a dendritic tag.

FIG. 35 is a flow chart 2500 showing a series of steps for identifying an article tagged with a dendritic tag. In the first step 2502, one or more images of the dendritic tag are acquired. The images can be acquired using a variety of image capturing devices including, for example, a dedicated scanning device as shown in FIG. 29, and/or a mobile telephone with or without an imaging module, as shown in FIG. 30.

Next, in step 2504, the dendritic tag is authenticated. In the context of this disclosure, authentication refers to the process of verifying that the dendritic tag is an actual dendritic tag and not a copy or replica of a tag. As discussed above, dendritic structures have three-dimensional fractal structure. In contrast, many two-dimensional copies or replicas have only two-dimensional structure. This difference in dimensionality can be used to authenticate tags featuring dendritic structures.

In particular, to verify that a structure is indeed a dendritic structure, multiple images of the structure can be obtained using low angle illumination from different angles. A dendritic structure—which includes features that extend in the perpendicular direction—reflects light from its different facets in the perpendicular direction. Accordingly, "bright" regions in the multiple images will change as a function of the angle of illumination.

Figure 36:
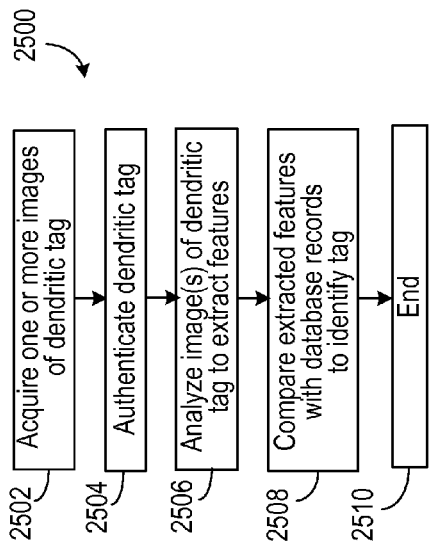
FIG. 36 is an image of a United States quarter illuminated with ambient fluorescent light and the flash unit of a mobile telephone.

This technique is demonstrated in FIG. 36, which shows an image of a United States quarter illuminated with ambient fluorescent light and the flash unit of a mobile telephone. The telephone's image sensor was used to obtain the image in FIG. 36 by imaging with a lens of module 2408 attached to the telephone. The image shows a portion of the relief of George Washington on the surface of the quarter. The mobile telephone's flash unit was positioned to the left of the relief in FIG. 36; as a result, the left-facing relief elements are highlighted by the illumination.

Using similar illumination and image capture techniques for dendritic tags, images of the dendritic structures therein can be obtained from multiple illumination angles. In some embodiments, color filters can be used to filter the illumination light so that the illumination light is distinguishable from ambient light in images of the dendritic tags. By filtering the illumination light (e.g., light generated from an illumination source such as a flash unit of a mobile telephone), only the edges of the dendritic structure that face the illumination source are illuminated with the filtered light, and therefore appear in a different color than other features in the image. In addition to, or as an alternative to, obtaining multiple images from different illumination directions, the device used to image the dendritic tag can also record video of the dendritic tag illuminated from different directions, showing a varying pattern of illumination as the illumination direction changes.

Analysis of the images can be performed to determine whether different features of the structures are highlighted as the illumination direction varies by determining which regions appear brightest in each of the images. In some embodiments, for example, as the reflected light changes with illumination angle, a three-dimensional representation of the outer facets of the dendritic feature can be constructed to convert intensity and position of the reflected light to the angle, height, and position of the reflecting surfaces to verify that the features of the dendritic structure are indeed three-dimensional in nature, and not two-dimensional. If the angles and heights of the reflecting surfaces all lie within a thin planar region, the likelihood that the structure is a copy rather than a true dendritic structure is increased. The distribution of angles and/or heights can be compared to a threshold value or distribution to determine whether a particular dendritic structure contained in the tag is authentic or not.

Alternatively, in some embodiments, the observed changes in reflected light angles and positions as a function of illumination direction are sufficient to establish that a dendritic structure is three-dimensional. The distribution of reflected light angles and/or positions can be compared to a threshold value or distribution for purposes of establishing an authentication of the dendritic structure contained in the tag.

In either of the methods disclosed above, image processing is typically be performed in the device that captures the images. In some embodiments, however, some or all of the image processing functions can be performed by a remote computing device (e.g., a remote server) by transmitting some or all of the acquired images at various illumination directions and/or angles to the remote device. Alternatively, or in addition, video of the changing light reflection as a function of illumination angle and/or direction can be transmitted to the remote computing device and used to authenticate or reject the dendritic tag.

Figure 44A:
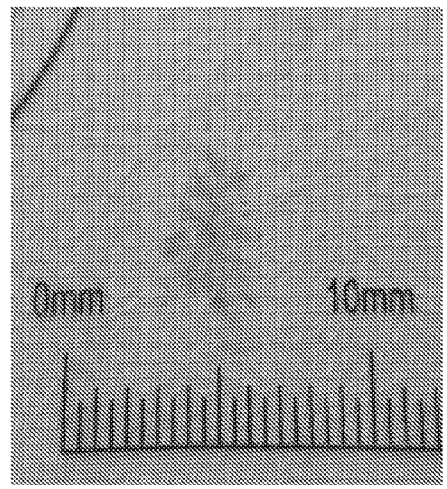
FIG. 44A is an image of a dendritic structure formed of silver that was grown on a paper substrate.
Figure 44B:
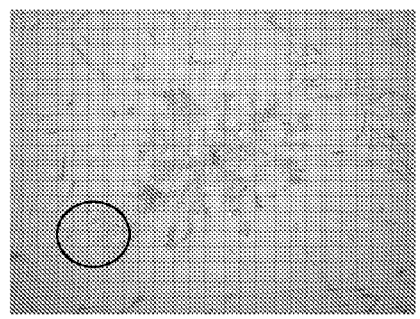
FIG. 44B is an image of the dendritic structure of FIG. 44A under perpendicular illumination in an optical microscope.
Figure 44C:
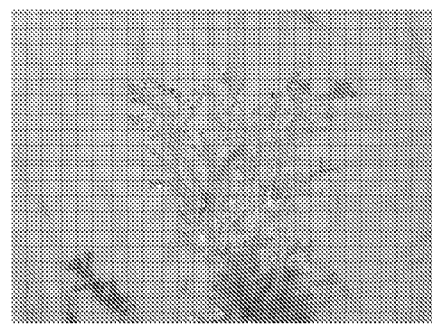
FIG. 44C is an image corresponding to an enlarged portion of the image in FIG. 44B.
Figure 45A:
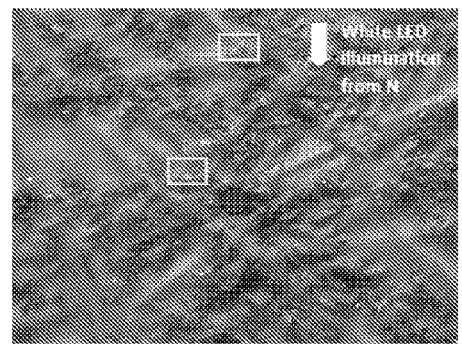
FIGS. 45A-45D are images showing reflected light from the dendritic structure of FIG. 44B, illuminated from different directions.
Figure 45B:
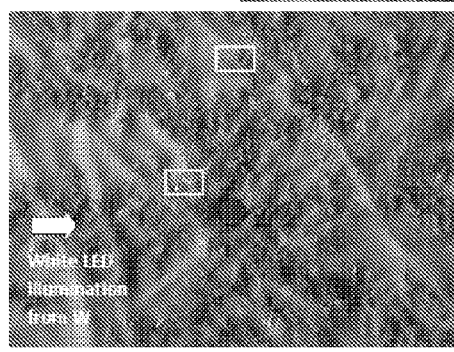
Figure 45C:
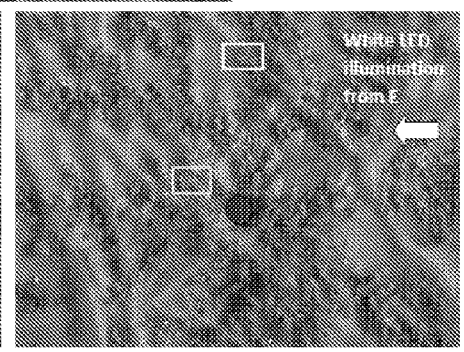
Figure 45D:
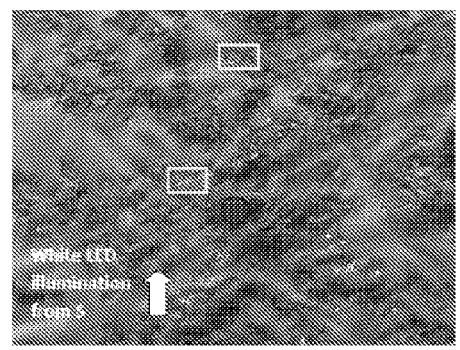
Figure 47A:
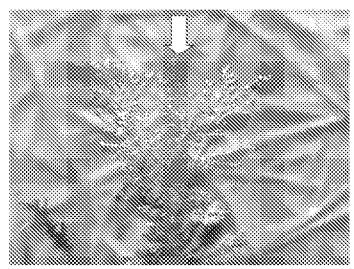
FIG. 47A is an image of reflected light from a dendritic structure illuminated from a direction corresponding to the top of the image.
Figure 47B:
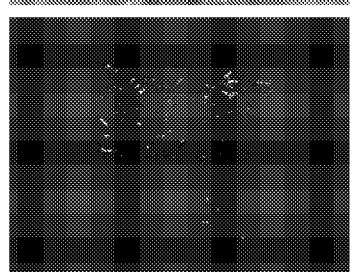
FIG. 47B corresponds to the image of FIG. 47A adjusted for contrast and brightness to reduce scattered light contributions to the image.
Figure 47C:
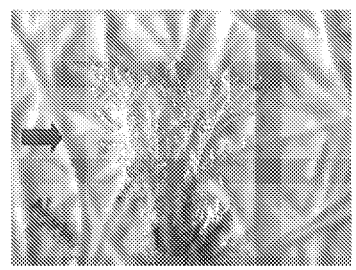
FIG. 47C is an image of reflected light from the dendritic structure of FIG. 47A, illuminated from a direction corresponding to the left side of the image.
Figure 47D:
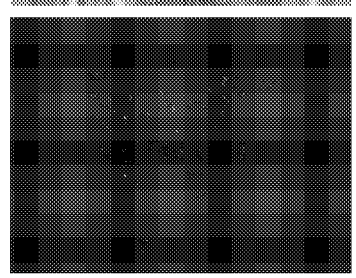
FIG. 47D corresponds to the image of FIG. 47C adjusted for contrast and brightness to reduce scattered light contributions to the image.

FIG. 44A shows an image of a dendritic structure formed of silver that was grown on a paper substrate. Although the dendritic structure in FIG. 44A appears to be flat in a two-dimensional image, the dendritic structure is actually three-dimensional. As described above, the three-dimensional features of the dendritic structure can be used to authenticate the structure as a real dendritic structure, and not a two-dimensional copy of such a structure. FIG. 44B shows an image of the dendritic structure of FIG. 44A under perpendicular illumination (i.e., normal to the paper surface) in an optical microscope. An enlarged image of a portion of the structure is shown in FIG. 44C.

FIGS. 45A-D are images showing reflected light from the dendritic structure shown in FIG. 44B, illuminated with white light from a LED source from the top, left side, right side, and bottom, respectively, relative to the orientation shown in FIG. 44B. In each of FIGS. 45A-D, the circled region corresponds to the growth origin of the dendritic structure, and the rectangles enclose the high points of the dendritic structure, measured in a direction normal to the paper surface.

The images in FIGS. 45A-D were processed using contrast filters and by decreasing the overall brightness to yield the corresponding images shown in FIGS. 46A-D, which each include a series of small reflected light points or regions. The reflected light patterns shown in FIGS. 46A-D effectively include reflected light from only the highest points in the dendritic structure. Comparing the images, it is evident that different patterns of reflected light are observed, depending upon the illumination direction. These differing patterns of reflected light from different illumination directions are characteristic of a three-dimensional dendritic structure, and confirm that what is being imaged is a true dendritic structure and not a two-dimensional copy.

The differing patterns of reflected light for specific dendritic structures are shown further in the images shown in FIGS. 47A-D. The dendritic structure in FIGS. 47A and 47C was illuminated with white light from the top direction and from the left hand direction, respectively. and the reflected light images in FIGS. 47B and 47D were obtained, respectively. Each of the images in FIGS. 47B and 47D were adjusted in contrast and brightness to remove contributions corresponding to scattering from the substrate. The reflected light patterns in FIGS. 47B and 47D differ significantly, which is characteristic of a three-dimensional dendritic structure.

In certain embodiments, reflected light images obtained by illuminating the dendritic structures with different colors of light can provide additional information that can be used to authenticate the structures. For example, when the device used to illuminate the structures includes a tunable laser-based source, reflected light images corresponding to both different illumination directions and different illumination wavelengths can be obtained. Even when illumination occurs from a common direction, when the illumination light is of a different wavelength, reflected light images of certain dendritic structures may appear different, and these differences indicate that what is being imaged is a true three-dimensional dendritic structure, not a two-dimensional copy.

In some embodiments, the three-dimensional nature of the dendritic structure can be further confirmed by comparing the differing patterns of reflected light to database records that include patterns of reflected light, as a function of illumination direction, for authentic dendritic tags. For example, the measured reflected light patterns can be decomposed to identify "sources" of reflected light in each image, each source having a position, a size, and an integrated intensity. Some or all of these attributes of the identified sources can then be compared to similar information derived from database records to determine whether the observed reflected light images match a particular database record, thereby authenticating the tag from which the images were measured. As described above, the database records can also include patterns of reflected light that correspond to illumination with different wavelengths of light, and this information can also be used together with, or as an alternative to, information derived from images corresponding to different illumination directions to authenticate specific dendritic structures.

Using the foregoing methods, a dendritic tag applied to an article can be either authenticated as genuine, or rejected as a likely counterfeit copy or replica. Returning to FIG. 35, if the dendritic tag attached to the article is authenticated, then in step 2506, the image(s) of the dendritic tag are analyzed to extract features of the dendritic structure in the tag. In general, each of the analysis steps disclosed herein can be performed by the device used to acquire the tag image(s), or by a remote computing device (e.g., a server), after the image(s) has/have been transmitted to the remote device from the image capture device.

As a first step in the analysis, a captured image is typically adjusted to filter extraneous features and produce a line segment representation of the dendritic structure. The adjustment can take a variety of forms. In some embodiments, the image is adjusted by altering the contrast and/or brightness of a grayscale version of the image so that a thinned representation of the dendritic structure is produced. One or more reference patterns printed on the dendritic tag can be used for this purpose. For example, the contrast and/or brightness of the image can be altered so that two adjacent reference patterns on the tag have a particular separation between them. The contrast and/or brightness of all images of the same dendritic tag can then be adjusted so that in each image, the separation between the two reference patterns is the same. Alternatively, or in addition, in some embodiments edge detection algorithms can be used on a captured image to highlight the edges of the dendritic patterns and the thinned (line) version of the image is produced by positioning lines of a single thickness at the mean positions between paired edges. Lines may also be positioned at the mean positions between paired edges, where the thickness of the lines depends on the spacing between the edges. During the production of thinned or line segment images from the original acquired images, curved segments can be replaced with sequences of straight lines to facilitate faster image analysis and digitized image comparison.

Line segments in the thinned image are not necessarily straight, but will typically begin and end on minutiae, which are branching points or terminations that appear in the pattern defined by the dendritic structure. A variety of different dendritic pattern coding schemes for the analysis of the images can be used; a coding scheme is used to identify minutiae by position and type in an image of the dendritic structure. An example of a coding scheme for minutiae types is shown in Table 1.

TABLE 1

| Designation | Type | Description |
|---|---|---|
| C | Center or Origin | Center or Origin of dendritic structure and origin of all trunks (position of growth cathode) |
| N | N-branch | $N^{th}$ branching point, bifurcation, or angular bend after start point in a trunk |
| T | Termination | End point of any non-continuing line segment |
| I | Isolation | Isolated point or start (i.e., closest to Center or Origin) of isolated line segment or branch |
| Z | High Z | Element that appears brighter due to larger height in perpendicular direction than average |

In addition to the minutiae types above, fiducials can be printed on a dendritic tag. Fiducials can be used for a number of important functions. In some embodiments, fiducials can be used to indicate directions from which tags can be illuminated to obtained reflected light images of the dendritic structure(s) therein, as described above, to authenticate the tags. The fiducials provide indicators for users who scan the tags as part of a supply chain, for example, to ensure that the images that are obtained correspond to images that were used to generate database information that was stored for the tags, and that is used later to authenticate and/or identify the tags.

In certain embodiments, fiducials are used as points of reference for the analysis of the dendritic pattern. As an example, for radial tags with a central growth point, the Center minutiae point can be the fiducial. Further, S vectors associated with the line segments of the dendritic pattern can be obtained through analysis. An S vector corresponds to a number set that defines the length and angle of a line segment that extends between two minutiae points (M points).

Figure 37A:
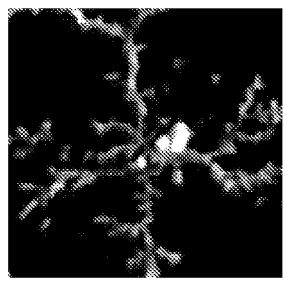
FIG. 37A is a contrast-adjusted image of a dendritic structure.
Figure 37B:
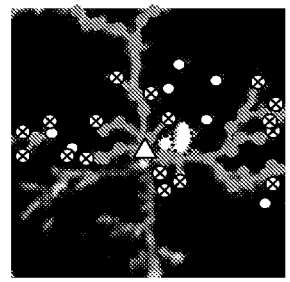
FIG. 37B is an image of the dendritic structure of FIG. 37A, with identified features of the dendritic structure overlaid on the image.
Figure 37C:
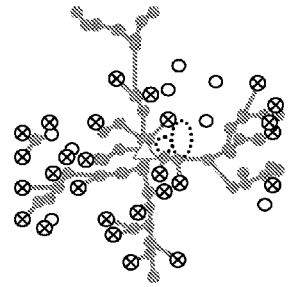
FIG. 37C is a schematic diagram showing features identified for the dendritic structure of FIG. 37A.

FIGS. 37A-37C show steps in the analysis of an image of a portion of a dendritic structure. In FIG. 37A, the contrast of the image has been adjusted to thin the image, reducing the representation of the dendritic structure to an apparent line pattern. In FIG. 37B, a partial analysis of the thinned image has been performed to identify minutiae points and line segments according to the coding scheme disclosed above. Line segments are overlaid on the image. Identified minutiae points are overlaid on the image as follows: Centers or Origins, open triangles; N branches, solid circles; Terminations, crossed circles; Isolations, open circles; and High Z points, dotted circles.

FIG. 37C shows the complete pattern of M points and line segments (S vectors) after analysis of the dendritic structure from FIG. 37A is complete. As shown in this figure, the dendritic structure has been reduced to a collection of features through the analysis, and further operations—such as identification of the dendritic structure—can be based on the set of identified features, rather than on the full image of the dendritic structure.

A variety of different analysis techniques can be used to perform the feature recognition shown in FIG. 37C. In some embodiments, for example, the scale-invariant feature transformation (SIFT) can be used. This technique transforms an image into a collection of vectors, each of which is invariant to translation, scaling, and rotation, and to a certain extent illumination changes and localized distortion. Scale-invariant feature transformations are disclosed, for example, in Lowe, David G., "Object recognition from local scale-invariant features," Proceedings of the International Conference on Computer Vision 2, pp. 1150-1157 (1999), the entire contents of which are incorporated herein by reference.

SIFT methods are similar to object recognition mechanisms of the primate brain as described, for example, in T. Serre et al., "A Theory of Object Recognition: Computations and Circuits in the Feedforward Path of the Ventral Stream in Primate Visual Cortex," Computer Science and Artificial Intelligence Laboratory Technical Report, MIT-CSAIL-TR-2005-082, Dec. 19, 2005, the entire contents of which are incorporated herein by reference. Image recognition algorithms of this type can be applied to raw images (e.g., without adjustment to thin the images) and are typically robust, particularly when training images are used. As such, these methods are well suited for identification of features in images of dendritic structures, which can be distorted by physical damage to the tag that includes the structure, and/or by imperfect imaging conditions.

Figure 38A:
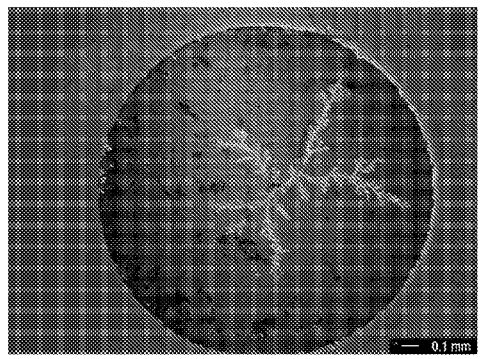
FIG. 38A an image of a dendritic structure that is used to train an algorithm for dendritic structure feature recognition.
Figure 38B:
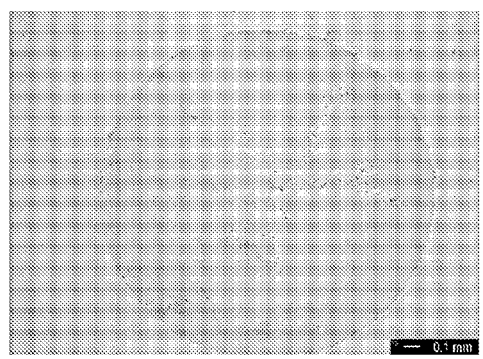
FIG. 38B is an image of a dendritic structure, with features of the structure identified by a trained algorithm overlaid on the image.

FIG. 38A shows an image of a dendritic structure that is used to train a SIFT algorithm for dendritic structure feature recognition. Key training features in FIG. 38A have been identified to the algorithm by tagging with crosses. In FIG. 38B, the trained SIFT algorithm operates on a new version of the training image to identify features in the image corresponding to various types of M points. Specifically, in FIG. 38B, 108 points corresponding to features of the dendritic structure were automatically identified.

Returning to FIG. 35, after the set of features corresponding to the dendritic tag has been identified in step 2506, the set of features is compared to records in a database in step 2508 to identify the tag (and the article to which the tag is attached). Typically, this step is performed by a remote computing device to which the dendritic image(s) or extracted set of features have been transmitted. The remote computing device may also host the database, or be configured to access the database over a secured connection.

If the set of features obtained through analysis in step 2506 is sufficiently accurate, than a unique match to only one database record will occur, uniquely identifying the tag. As discussed above, the database records are typically generated when dendritic tags are applied to articles and scanned, prior to manufacture, shipment, or storage of the tagged articles. Database records are maintained in secure storage to prevent unauthorized access and alteration, and therefore function as an analogue of a fingerprint database for tagged articles.

In general, comparison between the set of features obtained by analysis of images of a particular dendritic tag and database records will yield a number of potential matches. Various methods can be used to determine which of these potential matches is correct, and whether the match is sufficiently precise to properly identify the tag and the article to which it is attached. In the following paragraphs, one example of a method for comparing the set of features obtained from the dendritic images to database records is disclosed, although it should be appreciated that other methods can also be used.

In some embodiments, a hierarchical comparison can be performed between the set of features obtained by image analysis for a dendritic tag and database records to identify the tag. For example, the comparison begins from the center or origin of the dendritic pattern, and then extends in successive steps outward from the center or origin, i.e., from high dimensional features such as trunks and major branches to low dimensional features such as minor branches and twigs. For each successive feature, only database records that also contain such a feature (as well as all of the other higher-dimensional features identified for the tag) are further considered as possible matches. That is, at the beginning of the comparison, all of the database records are considered to be possible matches to the dendritic tag. As each successive feature of the tag is analyzed, the possible list of matching database records can be reduced by eliminating records that do not include the collective list of features analyzed to that point. Thus, analyses of each successive feature typically reduces the number of records that can correspond to a possible match (so that each successive analysis reduces the number of database records that are examined).

For example, a radial dendritic structure may have several trunks originating from the center. The angles between these trunks can be determined and used as the first several "levels" in the hierarchical comparison tree (i.e., only stored records which include this set of angles would be retained for consideration at subsequent levels in the comparison tree). The next several levels in the tree can be based on features such as the distance from the center of each trunk to the first major branch. Subsequent levels can be based on features such as the angles of these branches to their respective trunks. The foregoing provides examples of features which can be used to implement different levels of the comparison tree, but more generally, any of the features extracted from the captured images can be used, in any order.

In some embodiments, "box counting" methods can be used to generate a unique identifier for a dendritic structure that can then be compared to information in stored records for purposes of identification. Box counting methods are typically used to determine the fractal dimension of a dendritic structure, and are hierarchical in nature. In this approach, an image of the dendritic structure is divided into square boxes arranged in a grid pattern. The grid pattern can be aligned to fiducial marks applied to the tag that contains the structure.

Each box is then examined to determine whether or not it contains a portion of the dendritic structure. The output for this examination step is binary: each box is assigned a value of zero if the box includes no portion of the dendritic structure, and a value of 1 if the box includes a portion of the structure. Typically, in an initial scan, a fine-scale grid is used to digitize the image. Then, in subsequent pattern matching operations, a coarse-scale grid is used initially, and then the analysis is repeated with progressively finer-scale grids, e.g., halving the length of the box for each analysis step, to produce a unique data set to represent the dendritic structure.

The analysis corresponding to the coarsest-scale is used to reject all the stored patterns that do not match. Subsequent finer-scale grids are used to do the same, rejecting all non-matching patterns to reduce the time it takes to complete the matching process. Thus, box counting methods implement a hierarchical analysis, just as the feature-based methods discussed above.

The rate at which comparisons to stored patterns can be performed can be significantly increased in some embodiments by eliminating regions that correspond to no dendritic structure from further consideration as finer-scale grids are used. The selective elimination of such regions from further consideration is based upon the observation that if a particular region contains no dendritic structure at a coarse scale, then that region (and portions thereof) will also contain no dendritic structure at finer scales. Accordingly, such regions can be eliminated from further consideration at successively finer scales, which can significantly reduce analysis time at later levels of the hierarchical analysis scheme.

The comparison between identified features of the tag and database records, or the binary box counting analysis and database records, proceeds until all the non-conforming records are rejected and only one possible match remains. Since the dendritic structures are fractal in nature, this process is primarily limited by the magnification of the image acquisition optics; the higher the magnification used, the greater the number of features (and therefore, levels in the hierarchical comparison tree) as smaller and smaller features toward the ends of each branch can be included in the analysis. In general, the information density from the analysis increases according to the fractal dimension of the dendritic structure.

If the comparison results in no matches between the feature set corresponding to the tag and the database records, in certain embodiments the comparison between the feature set and the database records can be repeated, with relaxed measurement tolerances to obtain a match. In some embodiments, the device used to perform the comparison can prompt the user to re-scan the dendritic tag to obtain a new set of images, which can then be used to repeat the feature set analysis and comparison to database records. The new set of images can also be used to reduce measurement and/or acquisition errors in the original set of tag images, e.g., by combining the images to reduce noise and/or aberrations. As an example, the dendritic nature of the patterns allows defects in the acquired images to be rejected, as the line segments should be continuous and branching so that gaps and isolated truncated points can be ignored during the feature set analysis and subsequent comparison to database records. Captured image blurring can be compensated by the thinning process described above (e.g., by replacing the acquired image with line segments). Scale or magnification distortions can be overcome using Scale Invariant Feature Transform methods, as described above.

If the comparison is repeated and no matches are once again found between the feature set corresponding to the tag and the database records, the device can issue a warning (e.g., a visual and/or auditory message or alert) that the tag could not be properly identified, and may not be genuine.

If the comparison produces more than one possible match between the tag's feature set and the database records, then in some embodiments, the comparison can be repeated with tighter measurement tolerances to produce a more accurate match. In certain embodiments, the device used to perform the comparison can prompt the user to re-scan the dendritic tag to obtain a new set of images, which can then be used to repeat the feature set analysis and comparison to database records. The new images can also be combined with the previous images to reduce measurement and/or acquisition errors; the combined image information can then be used for the second comparison.

If multiple potential matches remain following the second comparison (and, possibly, additional subsequent comparisons), further information can be used to distinguish among the potential matches. In some embodiments, for example, contextual information can be used. Dendritic tags can be applied to a wide variety of different articles, and database records can include information relating not only to the features of the dendritic structures in the tags, but also to the articles to which the tags are applied. This contextual information can be used to distinguish among potential matches.

For example, suppose that two database records correspond to potential matches for a dendritic tag, but the first record includes information indicating that it corresponds to a tag applied to one type of article such as a pharmaceutical product, while the second record includes information indicating that it corresponds to a tag applied to a different type of article such as a meat product. If the tag that is being identified is attached to a pharmaceutical product, this contextual information can be used to readily identify the first record as a match, and to reject the second record.

In addition, information obtained from reflected light images can also be used to distinguish among multiple possible database records. As described above, reflected light images that correspond to different illumination directions and/or different illumination wavelengths produce distinctive reflected light patterns from dendritic structures. Information derived from images of these patterns (and/or the images themselves) can be stored in database records and used to distinguish among records having feature sets that nominally each correspond to the feature set of a dendritic tag that is subject to identification.

In the foregoing discussion, contextual and reflected light information are used to distinguish among possible database record matches after the hierarchical comparison has been performed. More generally, however, this additional information can be incorporated at any level into the hierarchical comparison to filter out possible matches from among the database records. For example, in some embodiments, this additional information can be used at the first level, or at one of the first five levels, of the hierarchical comparison. In certain embodiments, using contextual and/or reflected light information early in the hierarchical comparison can significantly reduce the number of database records that are considered at subsequent levels.

Following the comparison in step 2508, the tag is either identified as genuine, or identification is deemed impossible, and the procedure ends at step 2510. In either case, a message can be delivered to the user of the imaging device (e.g., the dedicated scanner shown in FIG. 29 or a mobile telephone) via a display screen. The user may be given the option of re-scanning the dendritic tag to attempt identification again.

In some embodiments, the set of features associated with analyzed image(s) of the dendritic tag can be stored in the database and marked as a record corresponding to an unknown and/or potential counterfeit article. Various criteria can be used for determining whether marking of the set of features should occur in the database. For example, the failure to produce any matches in the early levels of the hierarchical comparison is much less likely to be due to measurement/digitization errors and so is more likely to indicate a counterfeit tag, whereas such a failure in the advanced levels of the comparison could be due to measurement errors. Thus, records can be marked according to the first level at which no match between the tag's feature set and the database records occurs, with a threshold level value (e.g., 2 or 3) to establish whether the record is marked as a likely counterfeit. Records can be marked with a variety of information, including the date and/or location of the most recent comparison to other database records, the first level at which no match occurred between the tag's feature set and the other records, and the likely or suspected reason for the failure to match any records. By marking the record corresponding to the extracted feature set as corresponding to an unknown and/or potential counterfeit article, subsequent scans of the same tag can rapidly alert the user of the scanning device that the tagged article is suspect.

To enhance tracking of potential counterfeit tagged articles, in some embodiments, database records associated with tagged articles can include information about the number of times a tagged article has been successfully identified. For example, for tags that are applied to articles that are expected to be identified only once (i.e., upon receipt of a shipment), multiple identification of the tags may indicate improper, and even fraudulent, re-use of the tags. Accordingly, database records can include information about the number of times a tag has been successfully identified to assist in tracking such potential improper re-use. In some embodiments, database records can even be expunged following the first (or more generally, the $n^{th}$) successful identification, particularly where the records are associated with articles that are expected to identified only once (or more generally, only n times). Expunging such records can prevent improper re-use of the tags, as once the records are expunged, it would no longer be possible to identify the tagged articles.

In certain embodiments, database records can also include other information to assist in the identification and tracking of tagged articles. For example, the records can include location information about where identification of specific tags occurred and/or was attempted. This information can be transmitted from the device used to scan the tags (e.g., a dedicated device with a GPS transceiver, or a mobile telephone with an on-board GPS chip). Analysis of the location information can reveal information such as locations where attempts to fraudulently re-use or tamper with tags are particularly prevalent, which can assist in identifying potential problems along a supply chain, for example. Other information that can be stored includes information relating to how many times specific tags were scanned prior to a sale, which can be used to analyze purchaser preferences. If the tags are applied to identification or access cards, the information stored in the tag's database record can include the location and/or time at which the tag was scanned. This information can be used to track access to secured locations, for example.

Hardware and Software Implementation

The algorithmic and method steps disclosed herein in connection with controlling voltages and other fabrication parameters, obtaining images of dendritic tags, analyzing the images, authenticating and identifying articles to which such tags are attached, and controlling various aspects and operating parameters of devices that obtain tag images and devices that utilize such tags, can be implemented in computer programs using standard programming techniques. Such programs are designed to execute on control units, programmable computers, and/or specifically designed integrated circuits, each comprising an electronic processor, a data storage system (including memory and/or storage elements), at least one input device, and least one output device, such as a display or printer. The program code is applied to input data to perform the functions described herein and generate output information, which is applied to one or more output devices, such as a user interface that includes a display device. Each such computer program can be implemented in a high-level procedural or object-oriented programming language, or an assembly or machine language. Furthermore, the language can be a compiled or interpreted language. Each such computer program can be stored on a tangible, computer readable storage medium (e.g., CD ROM or magnetic diskette) that, when read by a computer or other device, can cause the processor to perform the analysis and control functions described herein.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A method for generating a unique identifier, the method comprising:
   providing a dendritic structure comprising a plurality of members extending away from a common point of the dendritic structure to form a stochastically branched arrangement of the members;
   reading the dendritic structure to provide a signal; and
   generating a unique identifier from the signal.

2. The method of claim 1, wherein the dendritic structure is a dendritic metal structure.

3. The method of claim 2, wherein the dendritic metal structure is formed by a method comprising:
   providing an ion conductor, and two or more electrodes in contact with the ion conductor; and
   applying a bias voltage across the electrodes,
   wherein one of the electrodes forms an anode and another one of the electrodes forms a cathode; and
   wherein the bias voltage is sufficient to grow the dendritic metal structure in or on the ion conductor extending from the cathode.

4. The method of claim 3, wherein the dendritic metal structure incorporates a metallic component of the anode.

5. The method of claim 3, wherein the ion conductor is in contact with a substrate.

6. The method of claim 1, wherein the dendritic structure is disposed on a substrate comprising at least one of glass, plastic, metal, paper, fabric, an electrical insulator, and a semiconductor.

7. The method of claim 1, wherein the dendritic structure is disposed on a substrate that comprises a flexible material.

8. The method of claim 1, wherein the dendritic structure is supported on a substrate, and wherein a barrier layer is disposed between the dendritic structure and the substrate.

9. The method of claim 1, wherein the dendritic structure is in contact with an ion conductor during the reading of the dendritic structure.

10. The method of claim 1, wherein reading the dendritic structure comprises optically reading the dendritic structure using a camera or an array of photodetectors capable of recognizing the dendritic structure with light.

11. The method of claim 1, wherein reading the dendritic structure is performed electrically.

12. The method of claim 11, wherein the dendritic structure is read by capacitance, the method comprising:
   contacting the dendritic structure with a plurality of sensors, and
   measuring capacitance at each sensor.

13. The method of claim 11, wherein the dendritic structure is read by resistance, the method comprising:
   electrically contacting the dendritic structure with a plurality of sensors, and
   measuring resistance at each sensor.

14. The method of claim 1, wherein reading the dendritic structure is performed using X-ray fluorescence spectroscopy.

15. The method of claim 1, wherein reading the dendritic structure is performed using a radio frequency identification scheme, the method further comprising:
   illuminating the dendritic structure with radio waves of different frequencies; and
   detecting one or more frequencies of the reflected radio waves.

16. The method of claim 1, wherein generating a unique identifier comprises:
   applying a numerical method to the signal provided by the reading of the dendritic structure; and
   generating a unique identifier from the numerical method.

17. A method for generating a unique identifier, the method comprising:
   providing a dendritic structure comprising a plurality of members extending away from a common point of the dendritic structure to form a stochastically branched arrangement of the members;
   reading the dendritic structure electrically to provide a signal; and
   generating a unique identifier from the signal.

18. The method of claim 1, wherein the unique identifier is used to mark an object.

19. The method of claim 18, wherein the identification of the object is used to track a location of the object.

20. A method, comprising:
   reading a dendritic structure that forms part of an object to provide a signal, the dendritic structure comprising a plurality of members extending away from a common point of the dendritic structure to form a stochastically branched arrangement of the members;
   generating a unique identifier from the signal; and
   performing at least one of:
      identifying the object using the unique identifier;
      authenticating the object using the unique identifier;
      using the unique identifier as a key in the encryption of data; and
      using the unique identifier as a key to access encrypted data.

* * * * *

UNITED STATES PATENT AND TRADEMARK OFFICE
CERTIFICATE OF CORRECTION

PATENT NO. : 9,773,141 B2
APPLICATION NO. : 14/775413
DATED : September 26, 2017
INVENTOR(S) : Michael N. Kozicki Page 1 of 1

It is certified that error appears in the above-identified patent and that said Letters Patent is hereby corrected as shown below:

In the Claims

Claim 11, Column 85, Line 3, delete "The method of claim 1, wherein reading the dendritic structure is performed electrically." and insert -- The method of claim 1, wherein the unique identifier is a number, a binary number, a text string, a set of analog values, or an image of the dendritic structure. --.

Signed and Sealed this
Eighth Day of October, 2024

Katherine Kelly Vidal
*Director of the United States Patent and Trademark Office*